United States Patent
Kim

(10) Patent No.: US 9,801,171 B2
(45) Date of Patent: Oct. 24, 2017

(54) TRANSMISSION METHOD AND RECEPTION METHOD OF DOWNLINK SIGNAL AND CHANNEL, TERMINAL THEREOF, AND BASE STATION THEREOF

(71) Applicant: INDUSTRY-UNIVERSITY COOPERATION FOUNDATION HANYANG UNIVERSITY, Seoul (KR)

(72) Inventor: Sun Woo Kim, Seoul (KR)

(73) Assignee: INDUSTRY-UNIVERSITY COOPERATION FOUNDATION HANYANG UNIVERSITY, Seoul (KR)

(*) Notice: Subject to any disclaimer, the term of this patent is extended or adjusted under 35 U.S.C. 154(b) by 195 days.

(21) Appl. No.: 14/433,004

(22) PCT Filed: Oct. 2, 2013

(86) PCT No.: PCT/KR2013/008835
§ 371 (c)(1),
(2) Date: Jul. 7, 2015

(87) PCT Pub. No.: WO2014/054887
PCT Pub. Date: Apr. 10, 2014

(65) Prior Publication Data
US 2015/0304994 A1    Oct. 22, 2015

(30) Foreign Application Priority Data

Oct. 2, 2012 (KR) .......... 10-2012-0109710
Oct. 12, 2012 (KR) .......... 10-2012-0113306
Dec. 11, 2012 (KR) .......... 10-2012-0143438

(51) Int. Cl.
*H04W 72/04* (2009.01)
*H04L 5/00* (2006.01)
(Continued)

(52) U.S. Cl.
CPC ......... *H04W 72/042* (2013.01); *H04L 5/0048* (2013.01); *H04L 5/0094* (2013.01);
(Continued)

(58) Field of Classification Search
CPC ...... H04W 72/042; H04L 5/0048; H04L 5/14; H04L 27/2601; H04L 5/0094; H04L 5/1469; H04L 5/0035
See application file for complete search history.

(56) References Cited

U.S. PATENT DOCUMENTS 9,510,335 B2* 11/2016 Ko ................. H04L 1/0061
2012/0113869 A1* 5/2012 Gaal ............... H04L 5/0091
370/255

(Continued)

FOREIGN PATENT DOCUMENTS

KR    10-2011-0126034 A    11/2011
KR    10-2012-0000482 A    1/2012
(Continued)

OTHER PUBLICATIONS

'eREG and eCCE definitions and mappings for ePDCCH ', R1-123250, 3GPP TSG RAN WG1 Meeting #70, Qingdao, China, Aug. 13-17, 2012.
(Continued)

*Primary Examiner* — Ajay Cattungal

(57) ABSTRACT

The present invention relates to a method for transmitting and receiving downlink signal and channel, a terminal therefor and a base station therefor, the method comprising a method for a terminal to transceiver an aperiodic sounding reference signal comprising the steps of: receiving, via a higher layer signaling, two or more parameters for determining a time-frequency resource with which aperiodic sounding signal is transmitted; receiving, via PDCCH and/or EPDCCH, an index designating a parameter set comprising
(Continued)

a part of the parameters; receiving, via PDCCH and/or EPDCCH, a signal triggering the aperiodic sounding reference signal; and transmitting the aperiodic sounding reference signal by frequency-hopping to a part of the frequency region within the overall frequency range of interest, frequency hopping being by means of the time-frequency resource corresponding to the parameter received via the higher layer signaling and the parameter included in the parameter set received via the PDCCH and/or the EPDCCH.

10 Claims, 28 Drawing Sheets

(51) Int. Cl.
   *H04L 5/14*      (2006.01)
   *H04L 27/26*     (2006.01)
(52) U.S. Cl.
   CPC ............ *H04L 5/14* (2013.01); *H04L 27/2601* (2013.01); *H04L 5/0035* (2013.01); *H04L 5/1469* (2013.01)

(56) References Cited

U.S. PATENT DOCUMENTS

| | | | | |
|---|---|---|---|---|
| 2012/0113967 A1* | 5/2012 | Smith | ................ | H04B 1/7143 370/338 |
| 2012/0170497 A1* | 7/2012 | Zhang | ................ | H04W 76/048 370/311 |
| 2012/0182957 A1* | 7/2012 | Noh | ................ | H04L 5/0048 370/329 |
| 2012/0250520 A1* | 10/2012 | Chen | ................ | H04L 5/001 370/241 |
| 2012/0257582 A1* | 10/2012 | Damnjanovic | ......... | H04L 5/001 370/329 |
| 2012/0307744 A1* | 12/2012 | Charbit | ............. | H04W 72/1205 370/329 |
| 2012/0307869 A1* | 12/2012 | Charbit | ................. | H04B 1/715 375/132 |
| 2013/0039233 A1* | 2/2013 | Dai | ................ | H04W 24/10 370/280 |
| 2013/0194931 A1* | 8/2013 | Lee | ................ | H04L 5/0053 370/241 |
| 2014/0078987 A1* | 3/2014 | Park | ................ | H04W 72/042 370/329 |
| 2014/0328305 A1* | 11/2014 | Kim | ................ | H04L 1/0072 370/329 |

FOREIGN PATENT DOCUMENTS

| | | |
|---|---|---|
| KR | 10-2012-0016520 A | 2/2012 |
| KR | 10-2012-0080492 A | 7/2012 |

OTHER PUBLICATIONS

International search report for PCT/KR2013/008835 filed on Oct. 2, 2013.

* cited by examiner

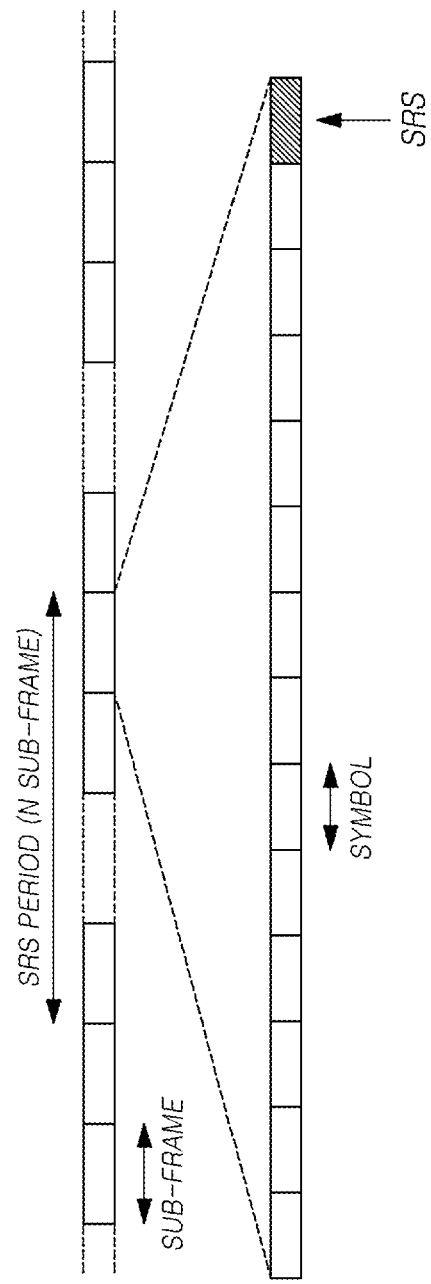

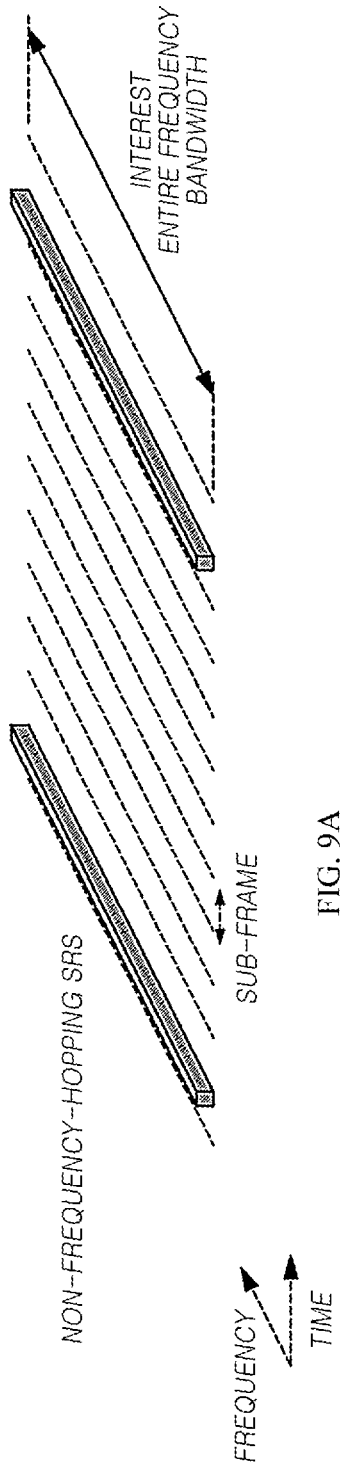
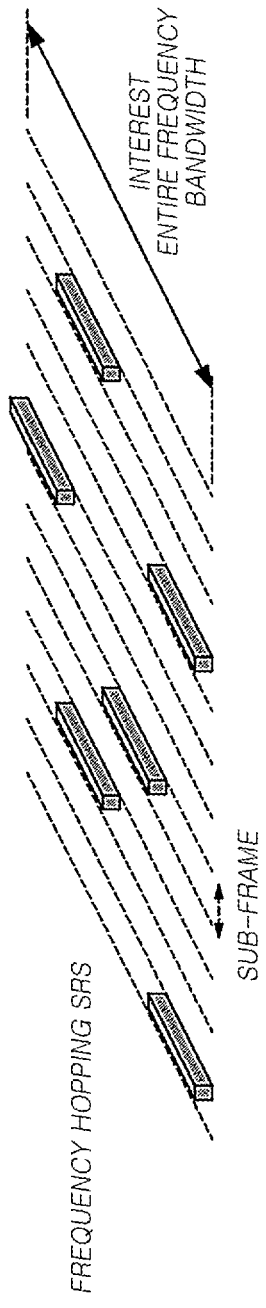
FIG. 9A
FIG. 9B

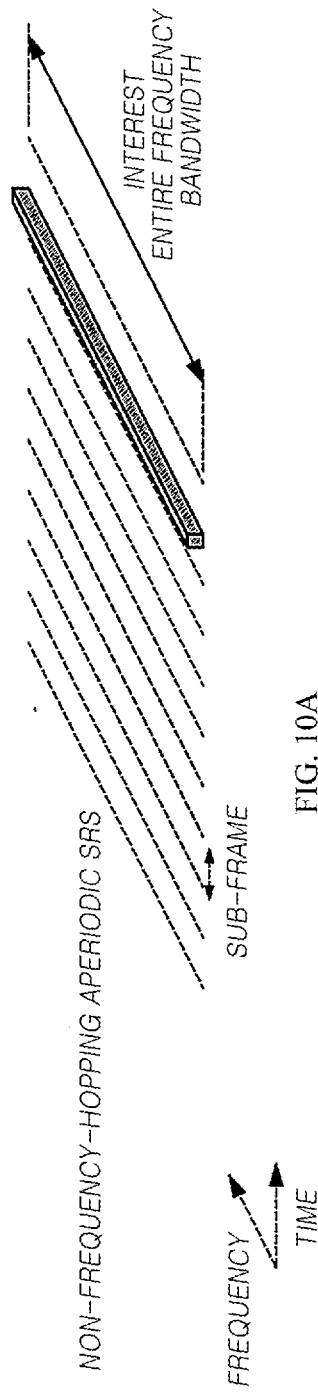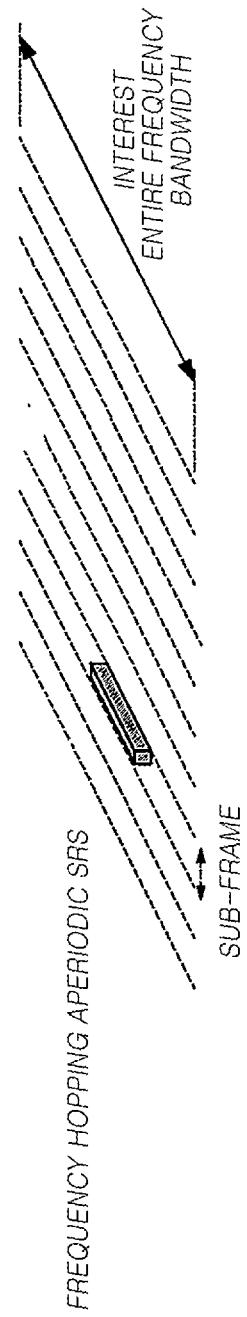
FIG. 10A
FIG. 10B

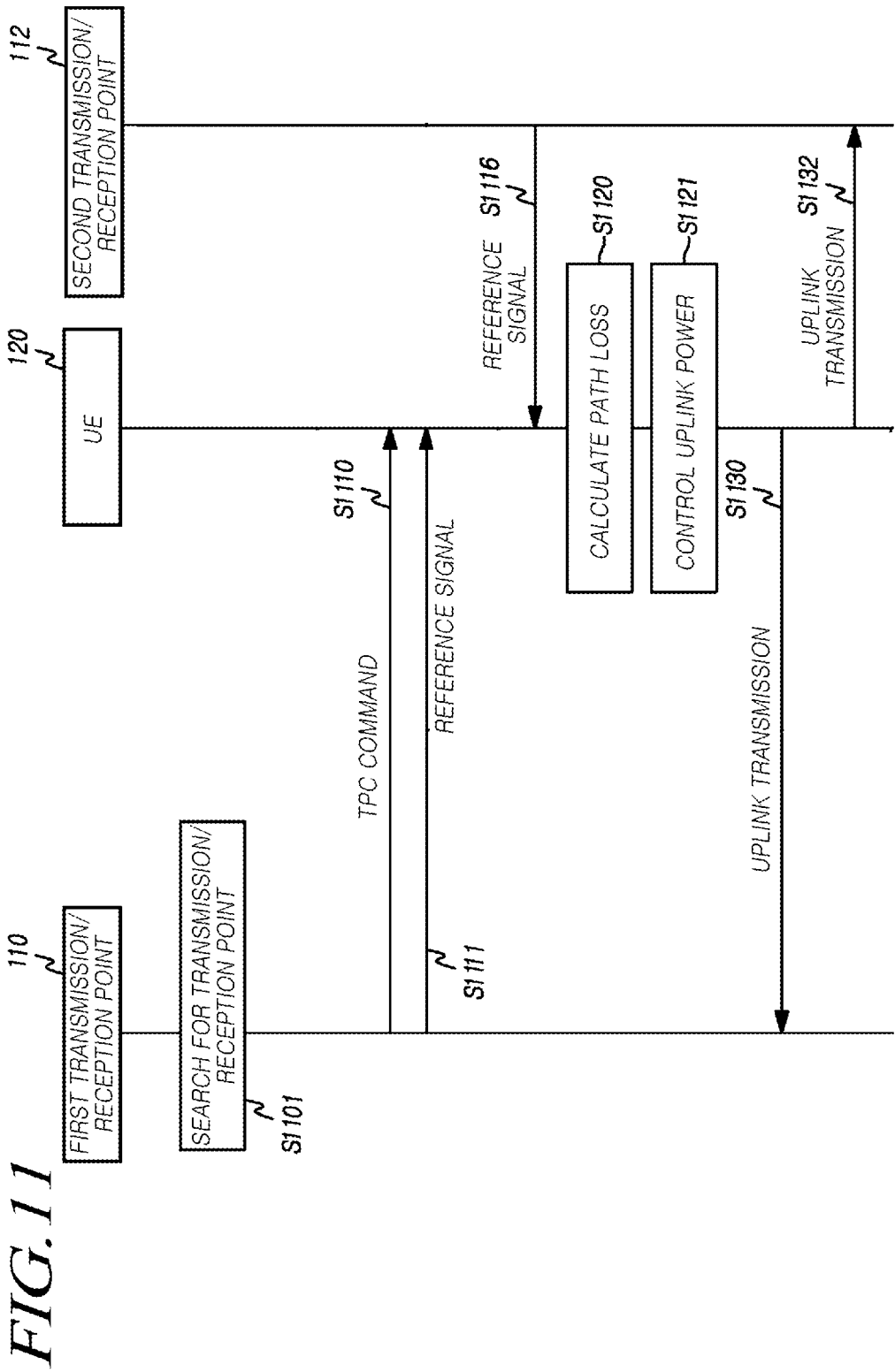

TRANSMISSION METHOD AND RECEPTION METHOD OF DOWNLINK SIGNAL AND CHANNEL, TERMINAL THEREOF, AND BASE STATION THEREOF

TECHNICAL FIELD

The present invention relates to a transmission method and reception method of a downlink signal and channel, a UE thereof, and a base station thereof. Particularly, the present invention relates to a transmission/reception method of a control channel, a transmission/reception method of aperiodic sounding reference signal, and an apparatus thereof, which increase a capacity of a multi-user control channel in a wireless multi-antenna system.

BACKGROUND ART

With the development of a communication system, consumers such as companies and individuals use highly various wireless UEs. In current mobile communication systems such as Long Term Evolution (LTE), LTE-Advanced (LTE-A), etc. of the 3GPP family, the development of a technology capable of transmitting high capacity data in accordance with a wired communication network, which corresponds to a high speed and high capacity communication system capable of transmitting/receiving various types of data such as video, wireless data, etc. is required. A method of efficiently transmitting data through a plurality of component carriers may be used as one method of transmitting high capacity data.

In such a system, a time-frequency resource can be divided into a region to which a control channel (e.g., a Physical Downlink Control CHannel (PDCCH)) is transmitted and a region to which a data channel (e.g., a Physical Downlink Shard CHannel (PDSCH)) is transmitted.

In order to improve performance of a wireless communication system, technologies such as Multiple-Input Multiple-Output (MIMO), Coordinated Multi-Point Transmission/Reception (COMP), etc. have been considered. More pieces of control information may be required to use such a technology. However, a limited control region may not be enough to include all control channels.

Further, a coordination communication or Coordinated Multi-Point transmission/reception (CoMP) system in which two or more transmission/reception points transmit a signal in a cooperating scheme has been developed.

In particular, an uplink CoMP, in which a UE performs uplink transmission not to a serving cell but to another reception point, has been developed.

In addition, a transmission method and reception method of an aperiodic sounding reference signal has been discussed continuously.

DETAILED DESCRIPTION OF THE INVENTION

Technical Problem

The present invention provides a transmission method and reception method of an aperiodic sounding reference signal, a UE thereof, and a base station thereof, which can transmit a narrow-banded aperiodic sounding reference signal while hopping the signal in a frequency region, so as to cover the entire frequency band.

Further, the present invention provides an apparatus and a method which can efficiently transmit control information to a UE in a wireless communication system.

Technical Solution

The present invention provides a transmission method and reception method of an aperiodic sounding reference signal, a UE thereof, and a base station thereof, which hop a narrow-banded aperiodic sounding reference signal in a frequency region.

In accordance with an aspect of the prevent invention, a method of transmitting an aperiodic sounding reference signal of a UE is provided. The method includes: receiving, through higher layer signaling, two or more parameters for determining a time-frequency resource with which an aperiodic sounding signal is transmitted; receiving, through at least one of a PDCCH and an EPDCCH, an index designating a parameter set including a part of the parameters; receiving, through at least one a PDCCH and an EPDCCH, a signal triggering the aperiodic sounding reference signal; and transmitting the aperiodic sounding reference signal by frequency-hopping to a part of a frequency region within an entire frequency bandwidth of interest, by means of the time-frequency resource according to the parameter received through the higher layer signaling and the parameter included in the parameter set received through at least one of the PDCCH and the EPDCCH.

In accordance with another aspect of the present invention, a UE is provided. The UE includes a reception unit for receiving, through higher layer signaling, two or more parameters for determining a time-frequency resource with which an aperiodic sounding signal is transmitted, receiving, through at least one of a PDCCH and an EPDCCH, an index designating a parameter set including a part of the parameters, and receiving, through at least one a PDCCH and an EPDCCH, a signal triggering the aperiodic sounding reference signal; and a transmission unit for transmitting the aperiodic sounding reference signal by frequency-hopping to a part of a frequency region within an entire frequency bandwidth of interest, by means of the time-frequency resource according to the parameter received through the higher layer signaling and the parameter included in the parameter set received through at least one of the PDCCH and the EPDCCH.

In accordance with yet another aspect of the present invention, a method of receiving an aperiodic sounding reference signal by a base station is provided. The method includes: transmitting, through higher layer signaling, two or more parameters for determining a time-frequency resource with which an aperiodic sounding reference signal is transmitted; transmitting, through at least one of a PDCCH and an EPDCCH, an index which designates a parameter set including a part of the parameters; transmitting, through at least one of the PDCCH and the EPDCCH, a signal which triggers the aperiodic sounding reference signal; and receiving the aperiodic sounding reference signal by frequency-hopping to a part of a frequency region within an entire frequency bandwidth of interest, by means of the time-frequency resource according to the parameter received through the higher layer signaling and the parameter included in the parameter set received through at least one of the PDCCH and the EPDCCH.

In accordance with yet another aspect of the present invention, a base station is provided. The base station includes: a transmission unit for transmitting, through higher layer signaling, two or more parameters for determining a time-frequency resource with which an aperiodic sounding reference signal is transmitted, transmitting, through at least one of a PDCCH and an EPDCCH, an index which designates a parameter set including a part of the parameters, and transmitting, through at least one of the PDCCH and the EPDCCH, a signal which triggers the aperiodic sounding reference signal; and a reception unit for receiving the aperiodic sounding reference signal by frequency-hopping to a part of a frequency region within an entire frequency bandwidth of interest, by means of the time-frequency resource according to the parameter received through the higher layer signaling and the parameter included in the parameter set received through at least one of the PDCCH and the EPDCCH.

The present invention provides a method and apparatus for allocating a control channel when the control channel is expanded in a data region, in a wireless communication system.

In accordance with yet another embodiment, a method of transmitting a control channel located in a data region by a base station, a method of receiving the same, a base station therefor, and a UE therefor are provided. The method includes: sequentially mapping an index of an Enhanced Resource Element Group (EREG) to resource elements except for resource elements for a DeModulation Reference Signal (DM-RS) in a time order on the basis of a frequency priority in each physical resource block pair for each subframe, forming one ECCE using 4 or 8 EREGs from one physical resource block pair or two or more physical resource block pairs, and allocating a downlink control channel located in the data region, which is configured by at least one ECCE; and transmitting the downlink control channel located in the data region, to a base station.

At this time, the index of the EREG corresponds to EREG#0 to 15, when the ECCE is configured by 4 EREGs, the EREGs are grouped into an EREG group #0 {EREG#0, 4, 8, 12}, an EREG group #1 {EREG#1, 5, 9, 13}, an EREG group #2 {EREG#2, 6, 10, 14}, and an EREG group #3 {EREG#3, 7, 11, 15}, and one ECCE is configured by one of the EREG groups #0 to #3, and when the ECCE is configured by 8 EREGs, the EREGs are grouped into an EREG group #0 {EREG#0, 2, 4, 6, 8, 10, 12, 14} and an EREG group #1 {EREG#1, 3, 5, 7, 9, 11, 13, 15}, and one ECCE is configured by one of the EREG groups #0 to #1.

In accordance with yet another embodiment, a method of indicating a resource configuring an EPDCCH set of control information allocated to a data region is provided. The method includes: indicating a value of N in N PRB pairs constituting the EPDCCH set, to a specific UE; and transmitting, to the specific UE, a combination index r in the following equation, which corresponds to PRB indexes ($\{k_i\}_{i=0}^{N-1}$ $1 \leq k_i \leq N_{RB}^{DL}$, $k_i < k_{i+1}$) of the N PRB pairs constituting the EPDCCH set.

$$r = \sum_{i=0}^{N-1} \binom{N_{RB}^{DL} - k_i}{N - i}$$

In the above equation, $N_{RB}^{DL}$ is the number of PRB pairs relating to a downlink bandwidth, and $$"\binom{x}{y} = \begin{cases} \binom{x}{y} & x \geq y \\ 0 & x < y \end{cases}"$$

is an extended binomial coefficient and causes a unique level $$"r \in \left\{0, \ldots, \binom{N_{RB}^{DL}}{N} - 1\right\}".$$

In accordance with yet another aspect, the present invention provides a base station which performs the aforementioned method of indicating a resource constituting an EPDCCH set of control information allocated to a data region.

Advantageous Effects

According to the above-described present invention, a transmission method and reception method of an aperiodic sounding reference signal, a UE thereof, and a base station thereof transmit a narrow-banded aperiodic sounding reference signal while hopping the signal in a frequency region, and thus, can cover the entire frequency band.

Further, according to the present invention, in a wireless communication system, the base station can efficiently transmit control information to the UE.

BRIEF DESCRIPTION OF THE DRAWINGS

FIG. 8 illustrates a location of a symbol of an SRS allocated by a UE;

FIGS. 9A and 9B illustrate an SRS which does not perform frequency hopping and an SRS which performs frequency hopping;

FIGS. 10A and 10B illustrate an aperiodic SRS which does not perform frequency hopping and an aperiodic SRS which performs frequency hopping according to yet another embodiment;

FIG. 11 is a flowchart illustrating an uplink electric power control method according to yet another embodiment;

MODE FOR CARRYING OUT THE INVENTION

Figure 1:
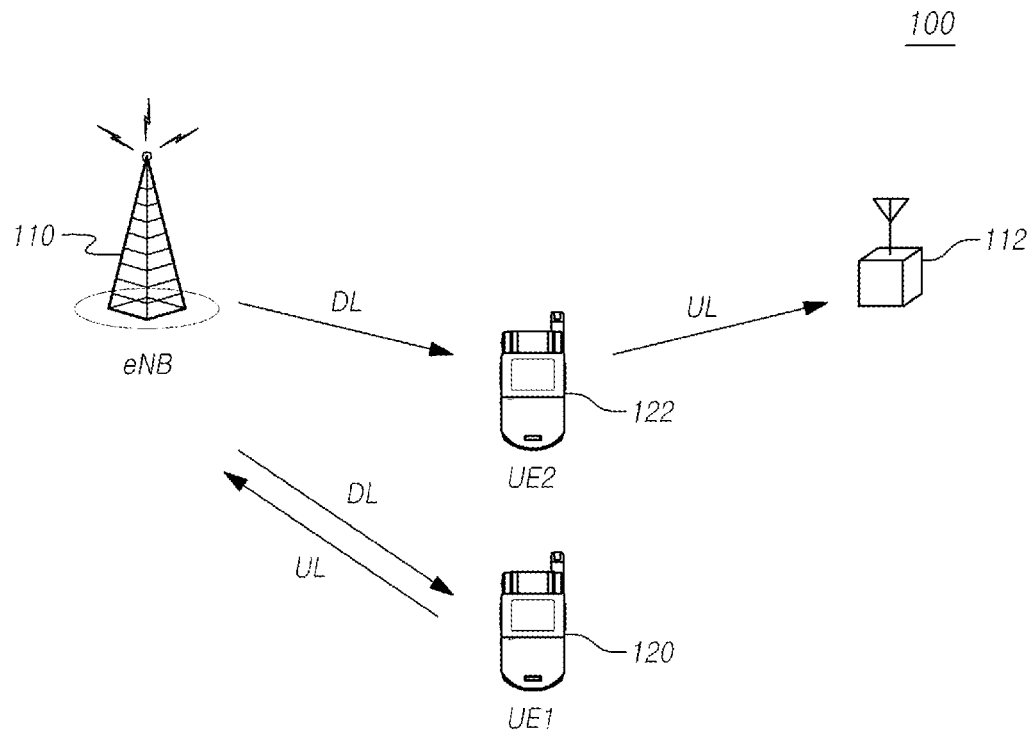
FIG. 1 illustrates an example of a wireless communication system to which embodiments are applied.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

The wireless communication system may be widely installed so as to provide various communication services, such as a voice service, packet data, and the like. The wireless communication system may include a User Equipment (UE) and a Transmission/Reception (T/R) point. Throughout the specifications, the user equipment may be an inclusive concept indicating a user terminal utilized in wireless communication, including a UE (User Equipment) in WCDMA, LTE, HSPA, and the like, and an MS (Mobile station), a UT (User Terminal), an SS (Subscriber Station), a wireless device, and the like in GSM.

The T/R point, may generally refer to a station where communication with the user equipment is performed, and may also be referred to as a Base Station (BS), a cell, a Node-B, an eNB (evolved Node-B), a Sector, a Site, a BTS (Base Transceiver System), an Access Point, a Relay Node, an RRH (Remote Radio Head), a RU (Radio Unit), an antenna, and the like.

That is, the T/R point, the base station, or the cell may be construed as an inclusive concept indicating a function or a portion of an area covered by a BSC (Base Station Controller) in CDMA, a NodeB in WCDMA, an eNB or a sector (site) in LTE, and the like, and the concept may include various coverage areas, such as a megacell, a macrocell, a macrocell, a picocell, a femtocell, a communication range of a relay node, an RRH (Remote Radio Head), and RU (Radio Unit), and the like.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. The wireless communication system may utilize varied multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like. An embodiment of the present invention may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present invention may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format indicator CHannel), a PHICH (Physical Hybrid ARQ Indicator CHannel), a PUCCH (Physical Uplink Control CHannel), and the like, and may be configured as a data channel, such as a PDSCH (Physical Downlink Shared CHannel), a PUSCH (Physical Uplink Shared CHannel), and the like, so as to transmit data.

In the specifications, a cell may refer to the coverage of a signal transmitted from a transmission point or a Transmission/Reception (T/R) point, a component carrier having the coverage of the signal transmitted from the T/R point, or the T/R point itself. In the specifications, the T/R point refers to a transmission point that transmits a signal, a reception point that receives a signal, or a combination thereof (transmission/reception point).

Wireless Communication System

FIG. 1 illustrates an example of a wireless communication system to which embodiments are applied.

Referring to FIG. 1, a wireless communication system 100 to which embodiments are applied may be a Coordinated Multi-Point transmission/reception (CoMP system), a coordinated multi-antenna transmission system, or a coordinated multi-cell communication system, in which a signal is transmitted while two or more transmission/reception points cooperate with each other. The CoMP system 100 may include at least two transmission/reception points 110 and 112 and at least two UEs 120 and 122.

The transmission/reception point may be a base station or a macro cell (or macro node; 110; hereinafter, referred to as "eNB") and at least one pico cell (112; hereinafter, referred to as "RRH") which is wiredly controlled while being connected to the eNB 110 by an optical cable or an optical fiber and has high transmission power or low transmission power within a macro cell region. The eNB 110 and the RRH 112 may have the same cell ID or different cell IDs.

Hereinafter, downlink implies communication or a communication path from the transmission/reception points 110 and 112 to the UE 120, and uplink implies communication or a communication path from the UE 120 to the transmission/reception points 110 and 112. In the downlink, the transmitter may be a part of the transmission/reception points 110 and 112, and the receiver may be a part of the UEs 120 and 122. In the uplink, the transmitter may be a part of the UE 120, and the receiver may be a part of the transmission/reception points 110 and 112.

Hereinafter, a situation in which a signal is transmitted/received through a channel such as a PUCCH, PUSCH, PDCCH, PDSCH, etc. may be written as the phrase "a PUCCH, a PUSCH, a PDCCH, and a PDSCH are transmitted/received".

The eNB 110, which is one of the transmission/reception points 110 and 112, can perform downlink transmission to the UEs 120 and 122. The eNB 110 can transmit a Physical Downlink Shared CHannel (PDSCH), which is a main physical channel for unicast transmission, and a Physical Downlink Control CHannel (PDCCH) for transmitting downlink control information on scheduling required for receiving the PDSCH and scheduling approval information for transmission in an uplink data channel (e.g., a Physical Uplink Shared CHannel (PUSCH)). Hereinafter, the fact that a signal is transmitted/received through each channel is written in a form that the corresponding channel is transmitted/received.

The first UE 120 (UE1) can transmit an uplink signal to the eNB 110. The second UE 122 (UE2) can transmit an uplink signal to the RRH 112 which is one of the transmission/reception points 110 and 112. At this time, the UE1 120 can transmit an uplink signal to the RRH 112, and the UE2 122 can transmit an uplink signal to the eNB 110. Further, the number of UEs may be two or more. However, it will be illustratively described in the following embodiments that the number of UEs is 2, one UE transmits an uplink signal to the eNB 110, and another UE transmits an uplink signal to the RRH 112.

Meanwhile, in the LTE communication system corresponding to one of current wireless communication schemes, a DeModulation Reference Signal (DM-RS) and a Sounding Reference Signal (SRS) are defined in an uplink, and 3 types of Reference Signals (RSs), such as a Cell-specific Reference Signal (CRS), a Multicast/Broadcast over Single Frequency Network Reference Signal (MBSFN-RS), and a UE-specific Reference Signal, are defined in a downlink.

In a wireless communication system, a UE transmits an Uplink DeModulation Reference Signal (UL DM-RS) to each slot in order to identify channel information for demodulation of a data channel at a time of uplink transmission. In a case of the UL DM-RS associated with a PUSCH, a reference signal is transmitted to each slot with regard to one symbol, and in the UP DM-RS associated with a PUCCH, a reference signal is transmitted to each slot with regard to up to 3 symbols.

Coordinated Multi-Point Transmission/Reception (CoMP)

Figure 2:
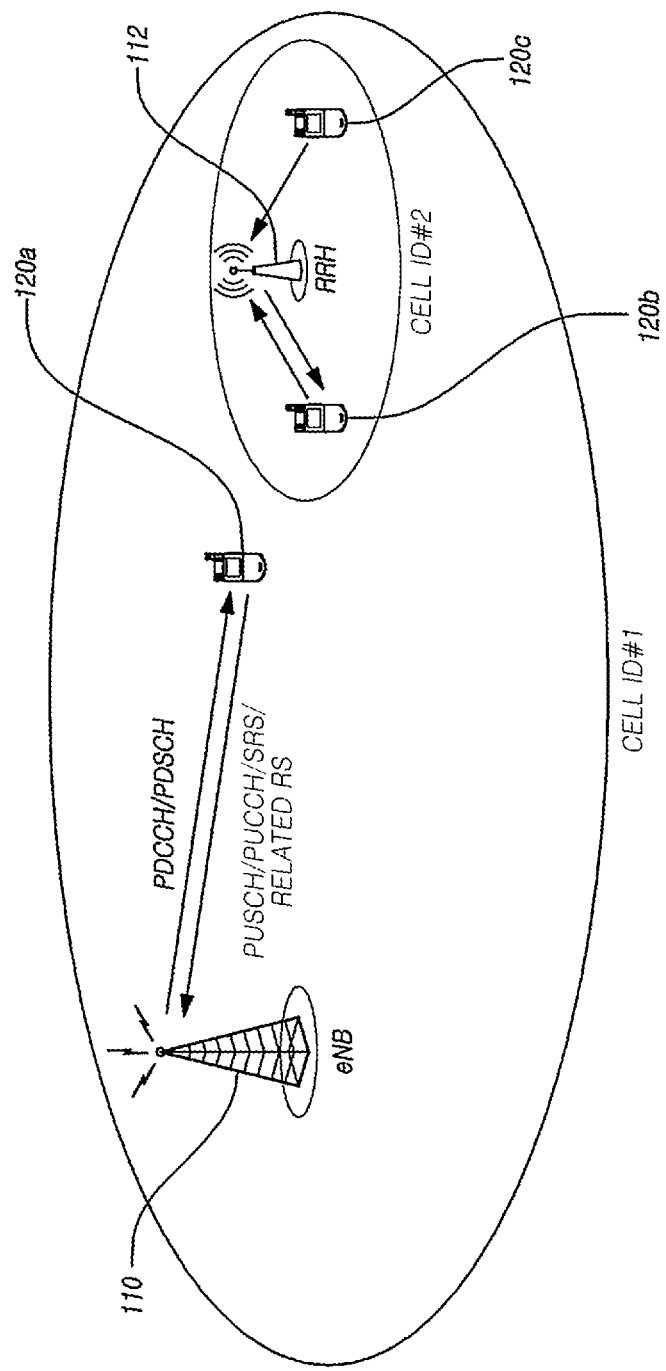
FIG. 2 illustrates a general uplink/downlink data transmission method in an implementation situation of a CoMP scenario in which transmission/reception points use different cell IDs and a heterogeneous network.
Figure 3:
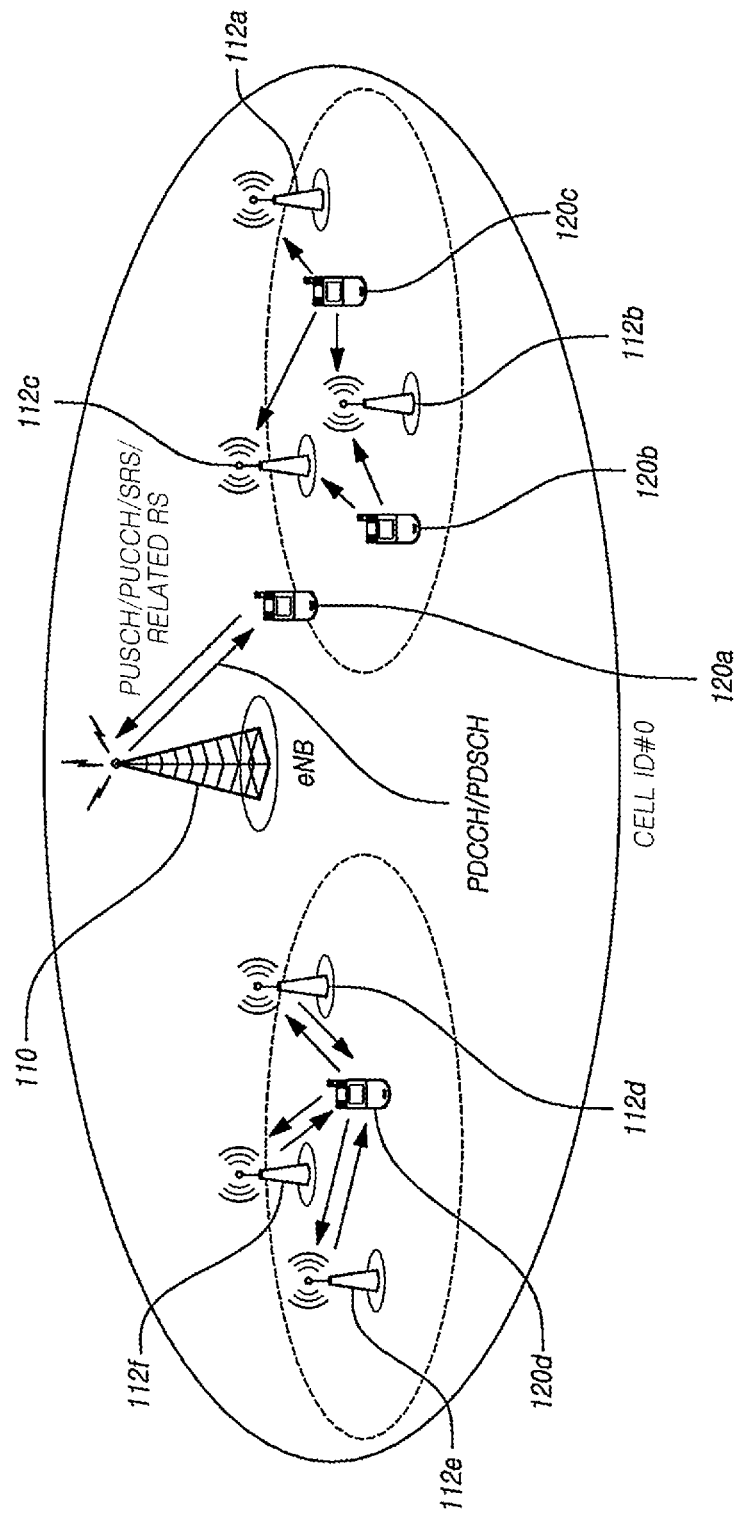
FIG. 3 illustrates an uplink/downlink data transmission method in an implementation situation of a CoMP scenario in which transmission/reception points use the same cell ID.

FIG. 2 illustrates a general uplink/downlink data transmission method in an implementation situation of a CoMP scenario in which transmission/reception points use different Cell IDs and a heterogeneous network. FIG. 3 illustrates an uplink/downlink data transmission method in an implementation situation of a CoMP scenario in which transmission/reception points use the same cell ID.

Referring to FIG. 2, the wireless communication system 100, to which embodiments are applied, may be a CoMP system, in which a CoMP scenario in which the eNB 110 and the RRH 112 have different cell IDs and a heterogeneous network are implemented. Referring to FIG. 3, the wireless communication system 100 to which embodiments are applied may be a CoMP system, in which a CoMP scenario in which the eNB 110 and the RRHs 112a, 112b, 112c, 112d, 112e, and 112f have the same cell ID is implemented.

In the CoMP system illustrated in FIGS. 2 and 3, in the DM-RS for demodulating PUSCH data, in the wireless communication system 100, the UE receives parameters for generating a reference signal to be transmitted by the UE, e.g., information on a sequence group index, a sequence index, a cyclic shift index, and an Orthogonal Cover Code (OCC) index, from a transmission/reception point to which the corresponding UE belongs, e.g., the eNB 110 as a serving transmission/reception point. At this time, when a plurality of UEs are illustrated in the drawing, reference numerals of the UEs may correspond to 120a, 120b, 120c, etc., and when one UE is illustrated in the drawing, a reference numeral of the UE may be 120.

In an uplink SRS, in the wireless communication system 100, the corresponding transmission/reception point transmits, to the UE 120a, as an RRC parameter, parameters for generating an SRS which a UE transmits from a predetermined transmission/reception point or a predetermined cell to another UE, e.g., a cell specific SRS bandwidth of the SRS, a transmission comb (which designates a location of a frequency allocated in a 2 sub-carrier spacing interval to be, e.g., 0 (even subcarriers) or 1 (odd subcarriers)), a UE-specific SRS bandwidth, hopping related configuration parameters, a frequency domain position, a periodicity, a sub-frame configuration (which designates which sub-frame is to transmit an SRS), an antenna configuration (which designates the number of antennas which transmit an SRS; the number of antenna ports), a base sequence index (an SRS sequence index for generating the corresponding SRS is determined according to a sequence group number u used in a PUCCH and a sequence number v determined according to a sequence hopping configuration), a cyclic shift index (as a reference signal used during generation of the SRS), etc. Further, the UE 120a receives the corresponding information and transmits an uplink SRS.

Additionally, an aperiodic SRS is defined together with a periodic SRS. A predetermined transmission/reception point transmits, to the UE 120a, as an RRC parameter, various types of parameters used for generating the corresponding aperiodic SRS to be transmitted by the UE, e.g., a UE-specific SRS bandwidth of an aperiodic SRS, a transmission comb, a frequency domain position, a period, a sub-frame configuration, an antenna configuration, a base sequence index, a cyclic shift index, etc., Which is similar to the periodic SRS.

Additionally, in order to transmit an aperiodic SRS, a predetermined transmission/reception point dynamically triggers transmission of the aperiodic SRS to the UE 120a through a PDCCH, and the corresponding UE 120a receives triggering by the PDCCH and RRC parameters, and transmits an uplink aperiodic SRS.

According to the above-described uplink/downlink data transmission method, with regard to a reference signal transmitted by the UE belonging to a predetermined transmission/reception point, only the corresponding transmission/reception point can receive the reference signal transmitted from the UE 120a. Further, since other predetermined transmission/reception points cannot identify information for generating a reference signal transmitted by the corresponding UE 120a, the other predetermined transmission/reception points cannot receive the corresponding reference signal. The reception herein does not imply that the reference signal is received as interference but implies that the corresponding reference signal is received as a desired signal in accordance with an object of a signal transmitted by the UE.

Further, the present invention provides a method and apparatus for distinguishing an uplink channel (e.g., a PUSCH, a PUCCH, a SRS, and an uplink related RS) which a UE belonging to a predetermined transmission/reception point transmits to the corresponding transmission/reception point and an uplink channel transmitted not to the corresponding transmission/reception point but to another transmission/reception point. The distinguishing between the corresponding channels may be distinguishing between the same channel types (i.e., between SRSs, between PUSCHs, between PUCCHs, and between related RSs) or distinguishing between different channel types (i.e., between an SRS and a PUSCH, between a PUCCH and a PUSCH, and between a PUCCH and an SRS).

Figure 4:
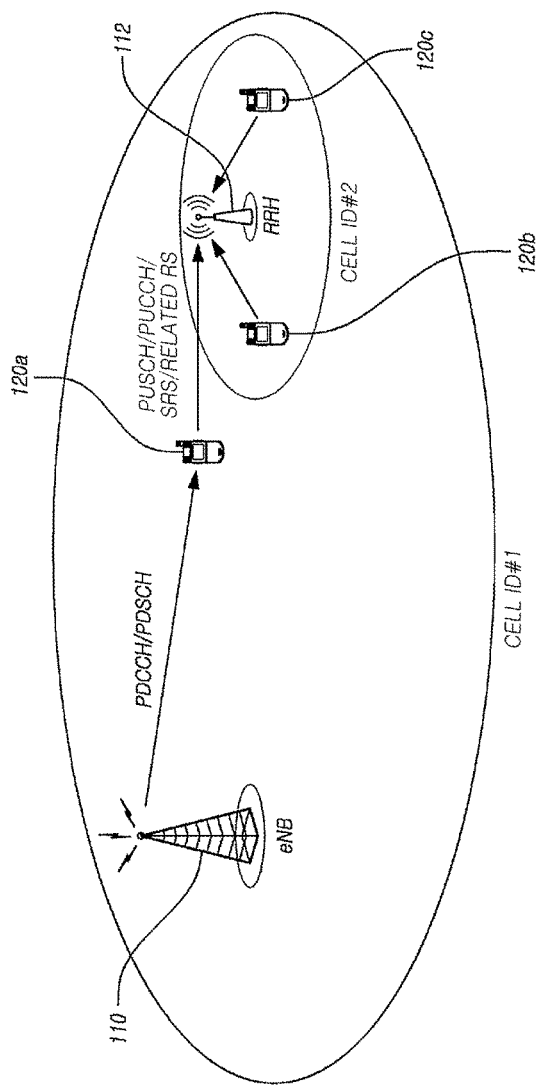
FIG. 4 illustrates an uplink/downlink data transmission method according to an embodiment in a CoMP implementation situation in which transmission/reception points in FIG. 2 use different cells (Cell ID #1 and Cell ID #2)

FIG. 4 illustrates an uplink/downlink data transmission method according to an embodiment in a CoMP implementation situation in which transmission/reception points in FIG. 2 use different cells (Cell ID #1 and Cell ID #2).

Referring to FIG. 4, a PDCCH and a PDSCH can be received from a transmission/reception point, e.g., the eNB 110 (the same as above), to which the corresponding UE 120a belongs and at least one of uplink channels, e.g., a PUSCH, a PUCCH, an uplink related RS (uplink DM-RS), and an SRS can be transmitted to a transmission/reception point, e.g., the RRH 112 (the same as above), having high geometry and high channel quality with respect to the corresponding UE 120.

Figure 5:
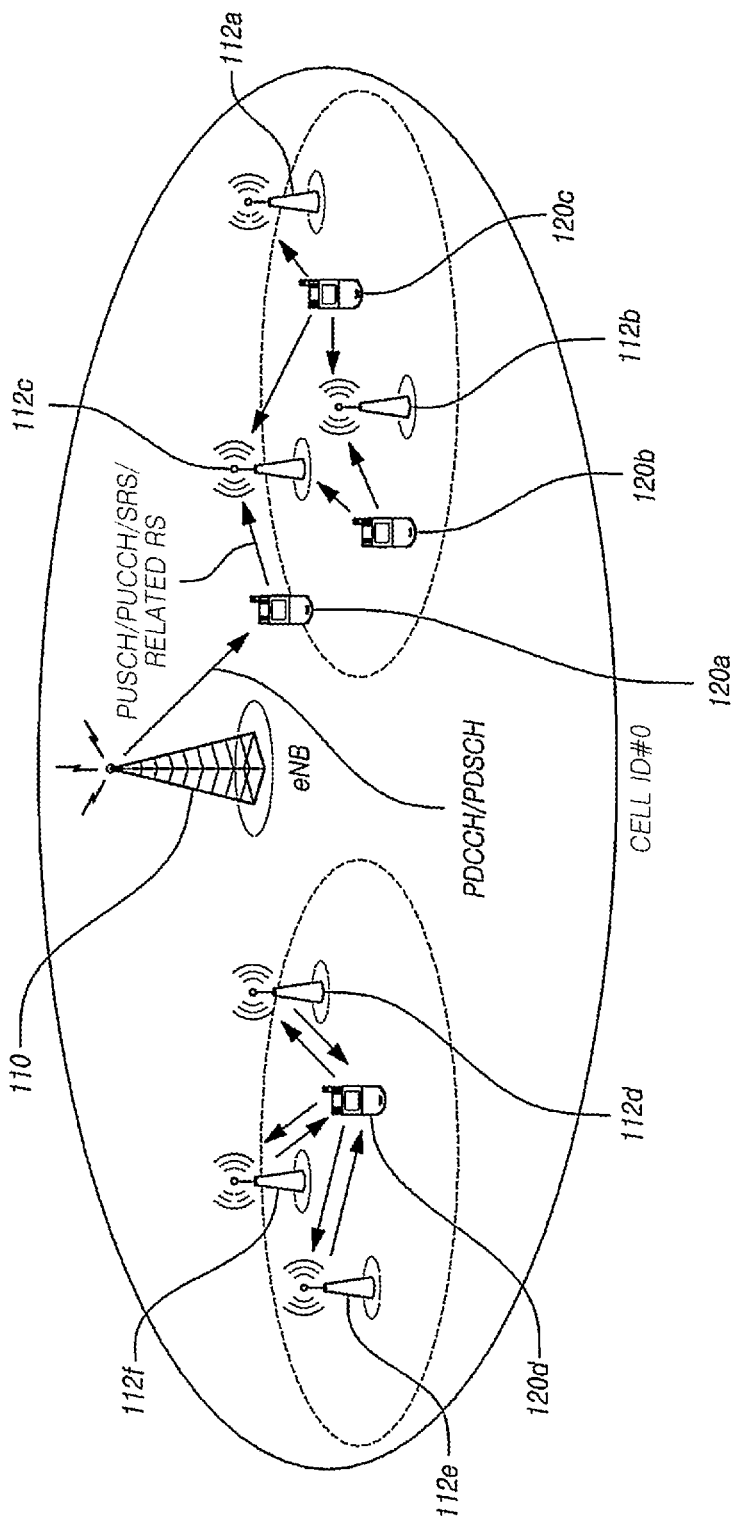
FIG. 5 illustrates an uplink/downlink data transmission method according to embodiments in a CoMP implementation situation in which the transmission/reception points in FIG. 3 use the same cell ID (Cell ID #0)

FIG. 5 illustrates an uplink/downlink data transmission method according to embodiments in a CoMP implementation situation in which the transmission/reception points in FIG. 3 use the same cell ID (Cell ID #0).

Referring to FIG. 5, a PDCCH and a PDSCH can be received from a transmission/reception point, e.g., the eNB 110, to which the corresponding UE 120a belongs and at least one of uplink channels, e.g., a PUSCH, a PUCCH, an uplink related RS (uplink DM-RS), and an SRS can be transmitted to a transmission/reception point, e.g., a specific RRH 112, having high geometry and high channel quality with respect to the corresponding UE.

Sounding Reference Signal (SRS)

Embodiment 1

Generate SRS Sequence

Figure 6:
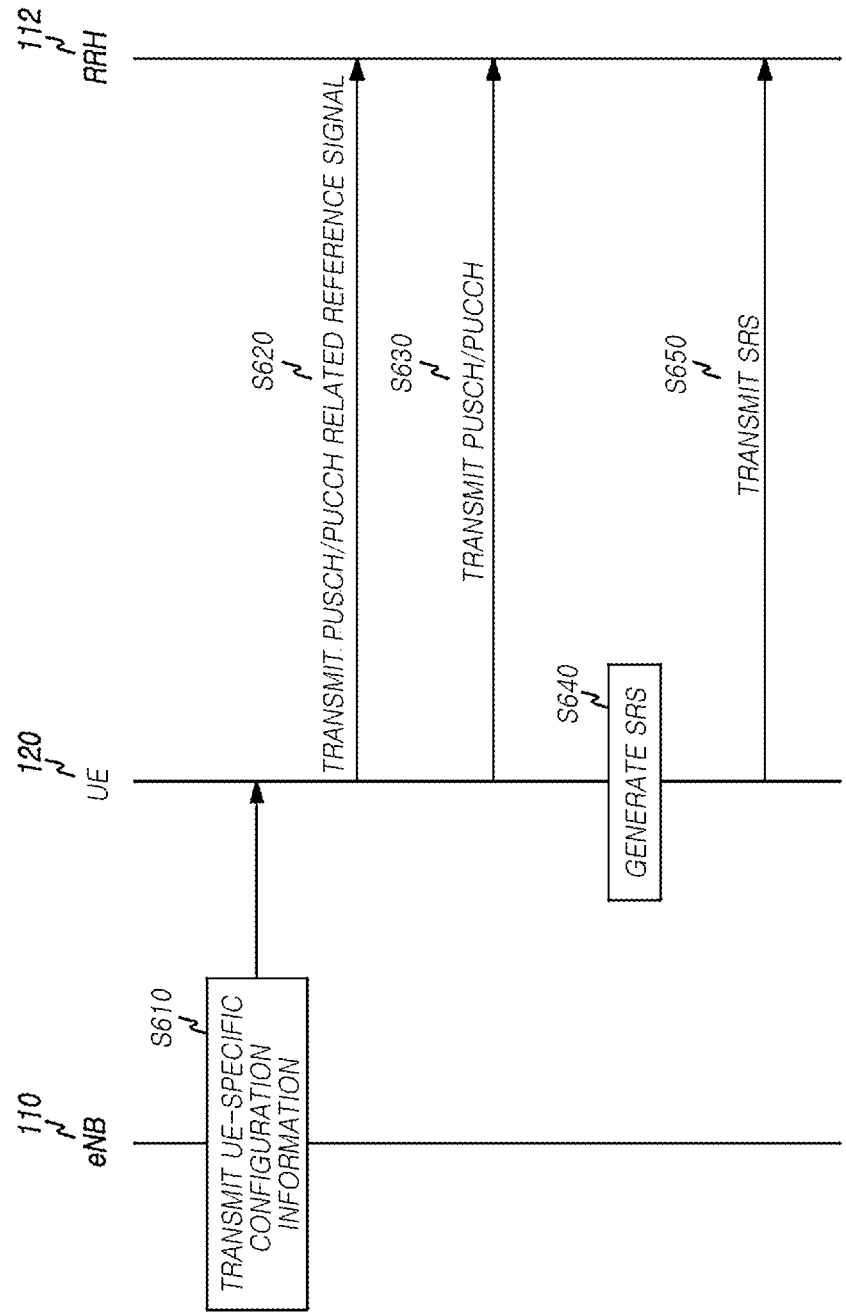
FIG. 6 is a signal flow diagram illustrating a method of transmitting an SRS according to an embodiment.

FIG. 6 is a signal flow diagram illustrating a method of transmitting an SRS according to an embodiment.

Referring to FIG. 6, the eNB 110, which is one of the transmission/reception points, transmits UE-specific configuration information for uplink transmission to the UE 120 belonging to the eNB 110 (S610). In operation S610, the UE 120 receives the UE-specific configuration information for uplink transmission.

The UE-specific configuration information for uplink transmission includes a UE-specific parameter by which the UE 120 belonging to the eNB 110 is UE-specifically configured for uplink transmission.

In detail, a PUSCH, a reference signal (PUSCH DM-RS) associated with the PUSCH, a PUCCH, and a reference signal (PUCCH DM-RS) associated with the PUCCH are independent of each other, a sequence independent of a PUCCH and PUSCH sequence is generated as an SRS sequence, and uplink transmission to a transmission/reception point can be performed independently of these sequences.

For example, when sequences of the PUSCH and the reference signal (PUSCH DM-RS) associated with the PUSCH are generated, a virtual cell ID ($n_{ID}^{PUSCH}$) independent of a Physical Cell ID (PCID) may be used, and when sequences of the PUCCH and the reference signal (PUCCH DM-RS) associated with the PUCCH are generated, a virtual cell ID ($n_{ID}^{PUCCH}$) independent of a cell ID may be used. The UE-specific parameter, which is configured UE-specifically, may include the virtual cell IDs ($n_{ID}^{PUSCH}$ and $n_{ID}^{PUCCH}$) which is independent of the cell ID when the sequences of the PUSCH, the reference signal (PUSCH DM-RS) associated with the PUSCH, the PUCCH, and the reference signal (PUCCH DM-RS) associated with the PUCCH are generated. In contrast, when the sequences of the PUSCH, the reference signal (PUSCH DM-RS) associated with the PUSCH, the PUCCH, and the reference signal (PUCCH DM-RS) associated with the PUCCH are generated, a physical cell ID (PCID=$N_{ID}^{cell}$) may be used, which is equal to the existing scheme. At this time, when a sequences of the PUCCH and the reference signal (PUCCH DM-RS) associated with the PUCCH are generated, the virtual cell ID ($n_{ID}^{PUCCH}$) independent of the cell ID is independent of parameters of a configuration of a UE-specific PUSCH DM-RS. Meanwhile, when the sequences of the PUSCH, the reference signal (PUSCH DM-RS) associated with the PUSCH, the PUCCH, and the reference signal associated with the PUCCH are generated, ranges of the virtual cell IDs ($n_{ID}^{PUSCH}$ and $n_{ID}^{PUCCH}$) independent of the cell ID is 0 to 503.

Identically, the virtual cell ID ($n_{ID}^{PUSCH}$) for the PUSCH and the reference signal (PUSCH DM-RS) associated with the PUSCH may be used when the sequences of the PUSCH as well as the reference signal (PUSCH DM-RS) associated with the PUSCH are generated. The virtual cell ID ($n_{ID}^{PUCCH}$) for the PUCCH and the reference signal (PUCCH DM-RS) associated with the PUCCH may be used when the sequence of the PUCCH as well as the reference signal (PUCCH DM-RS) associated with the PUCCCH.

Meanwhile, when a resource of the PUCCH is allocated, with regard to a PDCCH-triggered dynamic A/N resource of a UE, which is implemented by the virtual cell ID $n_{ID}^{PUCCH}$ for the PUCCH, in a case of the FDD, a HARQ A/N resource index may be determined according to "$n_{(1)}$PUCCH=nCCE+$N^{(1)}$PUCCH_CoMP". At this time, $N^{(1)}$PUCCH_CoMP may be UE-specifically implemented by a higher layer. In other words, the HARQ A/N resource index $n_{(1)}$PUCCH may be determined by $N^{(1)}$PUCCH_CoMP UE-specifically implemented by a higher layer together with an index of the first Control Channel Element (CCE) of downlink control allocation in consideration of uplink CoMP as illustrated in FIGS. 4 and 5.

A UE-specific parameter UE-specifically configured for uplink transmission may include two RRC parameter sets ({VCID$^{SRS}$(n), $D_{SS}^{SRS}$(n)}, n=0, 1) independent of the PUSCH and/or the PUCCH in order to generate a UE-specific SRS sequence.

{VCID$^{SRS}$(0), $D_{SS}^{SRS}$(0)} may be implemented for a trigger type 0 (periodic SRS) and a trigger type 1 (aperiodic SRS) by uplink related DCI formats, e.g., DCI format 0/4. {VCID$^{SRS}$(1), $D_{SS}^{SRS}$(1)} may be implemented for the trigger type 1 (aperiodic SRS) by downlink related DCI formats, e.g., a DCI format 1A/2B/2C with respect to the TDD, and a DCI format 1A with respect to the FDD. As described below, VCID$^{SRS}$ (n) may be used instead of cell ID ($N_{ID}^{cell}$) for group hopping, and VCID$^{SRS}$(n) and $D_{SS}^{SRS}$(n) may be used instead of $N_{ID}^{cell}$ and $D_{SS}$ for sequence hopping. At this time, the range of VCID$^{SRS}$(n) is 0 to 503, and the range of $D_{SS}^{SRS}$(n) is 0 to 29. Meanwhile, not the two PPC parameter sets ({VCID$^{SRS}$(n), $D_{SS}^{SRS}$(n)}, n=0, 1) but a cell ID cell ($N_{ID}^{cell}$) may be used for the SRS group hopping and the sequence hopping.

Hereinafter, for the convenience of the description, cell IDs of the uplink reference signals (the PUCCH DM-RS, the PUSCH DM-RS, and the SRS) are disclosed as a reference signal ID ($n_{ID}^{RS}$). In particular, the cell ID of the SRS may be cell "VCID$^{SRS}$(n); n=0, 1" or a cell ID ($N_{ID}^{cell}$).

The eNB 110 may dynamically transmit UE-specific configuration information including a UE-specific parameter for uplink transmission to the UE 120 through a PDCCH/EPDCCH, or may semi-statically or previously configure the UE-specific configuration information through an RRC to indicate whether the configuration is used or not through the PDCCH/EPDCCH.

When the PUSCH, the reference signal (PUSCH DM-RS) associated with the PUSCH, the PUCCH, and the reference signal associated with the PUCCH are generated, the UE 120 can generate the PUSCH, the reference signal (PUSCH DM-RS) associated with the PUSCH, the PUCCH, and the reference signal associated with the PUCCH using the virtual cell IDs independent of the cell ID.

(1) Base Sequence Generation

For example, a base sequence ($\bar{r}_{u,v}$(n)) of the PUCCH DM-RS is generated. This base sequence is differently generated depending on a sequence group number u and a base sequence number v in a group. The virtual cell ID ($n_{ID}^{PUCCH}$) of the PUCCH DM-RS may be used instead of the cell ID ($n_{ID}^{cell}$) in order to determine the sequence group number u and the base sequence number v in a group. Equally, when the base sequence of the PUSCH DM-RS is generated, the virtual cell ID ($n_{ID}^{PUSCH}$) of the PUSCH DM-RS may be used instead of the cell ID ($n_{ID}^{cell}$) in order to determine the sequence group number u and the base sequence number v in a group.

In detail, when the reference signal (PUCCH DM-RS) associated with the PUCCH is transmitted, if the virtual cell ID ($n_{ID}^{PUCCH}$) is not implemented by a higher layer, when the base sequence of the PUCCH DM-RS is generated using the cell ID ($n_{ID}^{cell}$), the sequence group number u and the base sequence number v in a group may be determined. However, when the virtual cell ID ($n_{ID}^{PUCCH}$) is implemented by a higher layer, if the base sequence of the PUCCH DM-RS is generated using the virtual cell ID ($n_{ID}^{PUCCH}$), the sequence group number u and the base sequence number v in a group may be determined.

Equally, when the reference signal (PUSCH DM-RS) associated with the PUSCH is transmitted, if the virtual cell ID ($n_{ID}^{PUSCH}$) is not implemented by a higher layer or a temporary C-RNTI is used to transmit the latest uplink related DCI for a transmission block associated with the corresponding PUSCH transmission, when the base sequence of the PUSCH DM-RS is generated using the cell ID ($n_{ID}^{cell}$), the sequence group number u and the base sequence number v in a group may be determined. Otherwise, when the base sequence of the PUSCH DM-RS is generated using the virtual cell ID ($n_{ID}^{PUSCH}$), the sequence group number u and the base sequence number v in a group may be determined.

Meanwhile, when the cell ID is configured to be $n_{ID}^{PUCCH}$, the cell ID may be changed from the virtual cell ID ($n_{ID}^{PUCCH}$) to cell the cell ID ($n_{ID}^{cell}$), but the change may not be allowed in order to reduce the complexity. When the cell ID is configured to be $n_{ID}^{PUSCH}$, the cell ID may be changed from the virtual cell ID ($n_{ID}^{PUSCH}$) to the cell ID ($n_{ID}^{cell}$), but the change may not be allowed in order to reduce the complexity.

Meanwhile, when the reference signal (PUCCH DM-RS) associated with the PUCCH is transmitted, the common virtual cell ID may be used for all PUCCH formats or virtual cell IDs may be used for each of the PUCCH format or independently of a part of the PUCCH formats.

The UE 120 allocates the PUCCH DM-RS, which is generated by a base sequence, a cyclic shift, and an orthogonal code (or an orthogonal cover code), to an allocated wireless resource, transmits the allocated PUCCH DM-RS to a transmission/reception point, e.g., the RRH 112, which is indicated by the virtual cell ID of the PUCCH DM-RS, allocates the generated PUSCH DM-RS to the allocated wireless resource, and transmits the allocated PUSCH DM-RS to a transmission/reception point, e.g., the RRH 112, which is indicated by the virtual cell ID of the PUSCH DM-RS (S620).

In addition, the UE 120 transmits the PUCCH to the same frequency bandwidth as the bandwidth allocated to the PUCCH DM-RS, and transmits the PUSCH to the same frequency bandwidth as the bandwidth allocated to the PUSCH DM-RS (S630). Among transmission/reception points, only a transmission/reception point, which can receive the PUCCH DM-RS, receives the PUCCH using the received PUCCH DM-RS, and only a transmission/reception point, which can receive a PUSCH DM-RS, receives the PUSCH using the received PUSCH DM-RS.

The UE 120 generates an SRS using the UE-specific configuration information including the two RRC parameter sets ({VCID$^{SRS}$(n), $D_{SS}^{SRS}$(n)}, n=0, 1) independent of the PUSCH and/or the PUCCH (S640). In operation S640, a process of generating an SRS will be described below in detail.

(2) SRS Sequence Generation

The SRS sequence is generated by cyclic-shifting the base sequence ($\bar{r}_{u,v}(n)$) based on the Zadoff-Chu sequence and using the length based on a resource block used for SRS transmission ($M_{sc}^{RS}$=the number of used RBs×the number of sub-carriers within the RB/2) as in Equations (1) and (2).

[Equation 1]

$$r_{SRS}^{(\tilde{p})}(n) = r_{u,v}^{(\alpha_{\tilde{p}})}(n) \quad (1)$$

[Equation 2]

$$r_{u,v}^{(\alpha_{\tilde{p}})}(n) = e^{j\alpha_{\tilde{p}} n} \bar{r}_{u,v}(n), \begin{cases} 0 \leq n < M_{sc}^{RS} \\ M_{sc}^{RS} = mN_{sc}^{RB} \\ 1 \leq m \leq N_{RB}^{max,UL} \\ M_{sc}^{RS}: \text{Number of sub-carriers allocated to frequency axis for RS sequence} \end{cases} \quad (2)$$

Reference signal (RS) sequence — Cyclic shift (CS) — Base sequence

The base sequence is differently generated according to the sequence group number u, the base sequence number v in a group, and the length n of the sequence.

In the sequence group hopping, 30 sequence groups are hopped to each slot regardless of the number of RBs allocated to the UE.

In detail, the sequence group number in a slot $n_s$ is determined by a group hopping pattern $f_{gh}(n_s)$ and a sequence shift pattern $f_{ss}$ by Equation (3) as follows.

[Equation 3]

$$u = (f_{gh}(n_s) + f_{ss}) \bmod 30 \quad (3)$$

The PUCCH, the PUSCH, and the SRS may have the same sequence group hopping pattern $f_{gh}(n_s)$ or may have different sequence group hopping patterns $f_{gh}(n_s)$. Meanwhile, the PUCCH, the PUSCH, and the SRS may have different sequence shift patterns $f_{ss}$.

The group hopping pattern $f_{gh}(n_s)$ is given with respect to the PUSCH, the PUCCH, and the SRS by Equation (4) as follows.

[Equation 4]

$$f_{gh}(n_g) = \begin{cases} 0 & \text{if group hopping is disabled} \\ \left( \sum_{i=0}^{7} c(8n_s + i) \cdot 2^i \right) \bmod 30 & \text{if group hopping is enabled} \end{cases} \quad (4)$$

C(i), which is a pseudo-random sequence, is initialized to be $$c_{init} = \left\lfloor \frac{n_{ID}^{RS}}{30} \right\rfloor$$

in each wireless frame using $n_{ID}^{RS}$ corresponding to the UE-specific parameter when the UEs 120 receives the reference signal ID ($n_{ID}^{RS}$) from the eNB 110.

The definition of the sequence shift pattern $f_{ss}$ may be different between the PUCCH, the PUSCH, and the SRS. The sequence shift pattern $f_{ss}^{SRS}$ for the SRS is given as $f_{ss}^{SRS} = n_{ID}^{RS} \bmod 30$.

The sequence hopping is applied only to reference signals having the length of 6 RBs or more ($M_{sc}^{RS} \geq 6N_{sc}^{RB}$). The base sequence number v in the base sequence group for reference signals having the length lower than 6 RBs ($M_{sc}^{RS} < 6N_{sc}^{RB}$) is given to be 0.

The base sequence number v in the base sequence group of the slot $n_s$ for the reference signals having the length of 6 RBs or more ($M_{sc}^{RS} \geq 6N_{sc}^{RB}$) is given by Equation (5).

[Equation 5]

$$v = \begin{cases} c(n_s) & \text{if group hopping is disabled and sequence hopping is enabled} \\ 0 & \text{otherwise} \end{cases} \quad (5)$$

C(i), which is a pseudo random sequence, is initialized as $$c_{init} = \left\lfloor \frac{n_{ID}^{RS}}{30} \right\rfloor \cdot 2^5 + (n_{ID}^{RS} + \Delta_{SS}) \bmod 30$$

in each wireless frame. At this time, $\Delta_{ss} \in \{0, 1, \ldots, 29\}$ si configured by a higher layer.

A cyclic shift value $\alpha_{\tilde{p}}$ may be differently generated for each UE and each antenna port by Equation (6).

[Equation 6]

$$\alpha_{\tilde{p}} = 2\pi \frac{n_{SRS}^{cs,\tilde{p}}}{8}$$

$$n_{SRS}^{cs,\tilde{p}} = \left( n_{SRS}^{cs} + \frac{8\tilde{p}}{N_{ap}} \right) \bmod 8$$

$$\tilde{p} \in \{0, 1, \ldots, n_{ap} - 1\} \quad (6)$$

8 types of values of 0 to 7 {0, 1, 2, 3, 4, 5, 6, 7} of $n_{SRS}^{cs}$, which is used when the cyclic shift value is calculated, are transmitted to higher layer signaling (e.g., the RRC), and the cyclic shift value for each antenna port is determined on the basis of the transmitted values of $n_{SRS}^{cs}$ as represented by Equation (6). In Equation (6), $\tilde{p}$ denotes an antenna port number index, and $N_{ap}$ denotes the number of SRS transmission antennas.

In step S640, an SRS sequence is generated from the base sequence in Equation (2) and $\alpha_{\tilde{p}}$ (Cyclic Shift value; CS) in Equation (6) by Equation (1).

Figure 7:
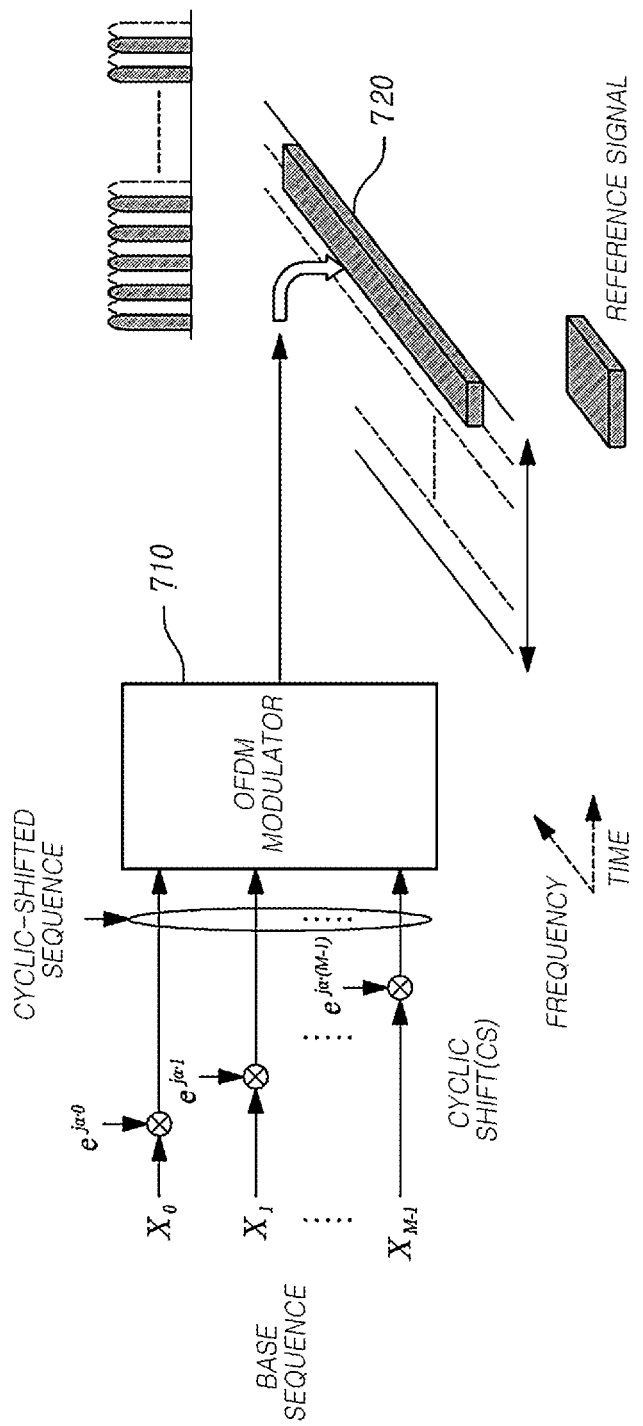
FIG. 7 is a block diagram illustrating a UE which transmits an uplink SRS according to another embodiment of the present invention.

FIG. 7 is a block diagram illustrating a UE which transmits an uplink SRS according to another embodiment of the present invention.

Step 3640, in which the SRS sequence is generated, is performed by an OFDM modulator 710 in FIG. 7. The UE 120 allocates the SRS generated in step S640 to a wireless resource, and transmits the allocated SRS to a transmission/reception point, e.g., the RRH 112, which is indicated by $n_{ID}^{RS}$ (S650).

In step S650, the SRS sequence generated by Equation (1) is mapped too the corresponding symbol of a sub-frame. Step S650 is performed through a resource element mapper 720 in FIG. 7.

(3) SRS Resource Allocation and SRS Configuration

FIG. 8 illustrates a location of a symbol of an SRS allocated by a UE. FIG. 9 illustrates an SRS which does not perform frequency hopping and an SRS which performs frequency hopping.

As illustrated in FIG. 8, the SRS is transmitted to the last symbol of the sub-frame. On a frequency region, the SRS transmission should cover a frequency bandwidth concerned with frequency region scheduling. As illustrated in FIG. 9A, sufficiently wide SRS transmission can be performed to estimate channel quality for a concerned entire frequency bandwidth by single SRS transmission. Meanwhile, as illustrated in FIG. 9B, a narrow-banded SRS is transmitted while hopping on a frequency region, so that such pieces of SRS transmission are combined to cover the entire frequency bandwidth.

As described above, the mapping of the SRS to the resource element is completed, a SC-FDMA symbol is generated through a SC-FDMA generator (not illustrated in FIG. 7) and an SRS signal is transmitted to a transmission/reception point.

A specific sub-frame from which an SRS is transmitted may be configured periodically or aperiodically.

For example, the SRS may be periodically transmitted from a sub-frame having a period and an offset specific to each UE, among cell-specific SRS transmittable sub-frames as defined in Table 1 (Frequency Division Duplex (FDD)) or Table (Time Division Duplex (TDD)) below. Such an SRS may be called a periodic SRS or a trigger type 0 SRS.

Otherwise, the SRS may be transmitted from a specific sub-frame which is aperiodically configured.

TABLE 1

| srs-subframeConfig | Binary | Configuration Period $T_{SFC}$ (subframes) | Transmission offset $\Delta_{SFC}$ (subframes) |
|---|---|---|---|
| 0 | 0000 | 1 | {0} |
| 1 | 0001 | 2 | {0} |
| 2 | 0010 | 2 | {1} |
| 3 | 0011 | 5 | {0} |
| 4 | 0100 | 5 | {1} |
| 5 | 0101 | 5 | {2} |
| 6 | 0110 | 5 | {3} |
| 7 | 0111 | 5 | {0, 1} |
| 8 | 1000 | 5 | {2, 3} |
| 9 | 1001 | 10 | {0} |
| 10 | 1010 | 10 | {1} |
| 11 | 1011 | 10 | {2} |
| 12 | 1100 | 10 | {3} |
| 13 | 1101 | 10 | {0, 1, 2, 3, 4, 6, 8} |
| 14 | 1110 | 10 | {0, 1, 2, 3, 4, 5, 6, 8} |
| 15 | 1111 | reserved | Reserved |

TABLE 2

| srs-subframeConfig | Binary | Configuration Period $T_{SFC}$ (subframes) | Transmission offset $\Delta_{SFC}$ (subframes) |
|---|---|---|---|
| 0 | 0000 | 5 | {1} |
| 1 | 0001 | 5 | {1, 2} |
| 2 | 0010 | 5 | {1, 3} |
| 3 | 0011 | 5 | {1, 4} |
| 4 | 0100 | 5 | {1, 2, 3} |
| 5 | 0101 | 5 | {1, 2, 4} |
| 6 | 0110 | 5 | {1, 3, 4} |
| 7 | 0111 | 5 | {1, 2, 3, 4} |
| 8 | 1000 | 10 | {1, 2, 6} |
| 9 | 1001 | 10 | {1, 3, 6} |
| 10 | 1010 | 10 | {1, 6, 7} |

TABLE 2-continued

| srs-subframeConfig | Binary | Configuration Period $T_{SFC}$ (subframes) | Transmission offset $\Delta_{SFC}$ (subframes) |
|---|---|---|---|
| 11 | 1011 | 10 | {1, 2, 6, 8} |
| 12 | 1100 | 10 | {1, 3, 6, 9} |
| 13 | 1101 | 10 | {1, 4, 6, 7} |
| 14 | 1110 | reserved | reserved |
| 15 | 1111 | reserved | Reserved |

In Table 1 and Table 2, the cell-specific SRS transmittable sub-frame defined in each of the FDD (frame structure type 1) and the TDD (frame structure type 2) are represented as a period $T_{SFC}$ and an offset $\Delta_{SFC}$, the number of all possible cases is 16 and information on the cases may be transmitted through 4-bit higher layer signaling (e.g., RRC signaling). For example, when a srs-SubframeConfig value is 7 (0111) in Table 1, the period $T_{SFC}$ is 5 and the offset $\Delta_{SFC}$ is {0, 1}, which implies that SRSs are transmitted from first and second sub-frames while configuring a sub-frame unit as a period.

The periodic SRS implies an SRS, which has a period and an offset specific to each UE and is periodically transmitted to the corresponding sub-frame, among the aforementioned cell-specific SRS transmittable sub-frames.

Hereinafter, Table 3 (FDD) and Table 4 (TDD) represent a specific period and a specific offset of the periodic SRS defined for each UE.

TABLE 3

| SRS Configuration Index $I_{SRS}$ | SRS periodicity $I_{SRS}$ (ms) | SRS sub-frame Offset $T_{offset}$ |
|---|---|---|
| 0-1 | 2 | $I_{SRS}$ |
| 2-6 | 5 | $I_{SRS}$ − 2 |
| 7-16 | 10 | $I_{SRS}$ − 7 |
| 17-36 | 20 | $I_{SRS}$ − 17 |
| 37-76 | 40 | $I_{SRS}$ − 37 |
| 77-156 | 80 | $I_{SRS}$ − 77 |
| 157-316 | 160 | $I_{SRS}$ − 157 |
| 317-636 | 320 | $I_{SRS}$ − 317 |
| 637-1023 | reserved | Reserved |

TABLE 4

| SRS Configuration Index $I_{SRS}$ | SRS periodicity $I_{SRS}$ (ms) | SRS sub-frame Offset $T_{offset}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$ − 10 |
| 15-24 | 10 | $I_{SRS}$ − 15 |
| 25-44 | 20 | $I_{SRS}$ − 25 |
| 45-84 | 40 | $I_{SRS}$ − 45 |
| 85-164 | 80 | $I_{SRS}$ − 85 |
| 165-324 | 160 | $I_{SRS}$ − 165 |
| 325-644 | 320 | $I_{SRS}$ − 325 |
| 645-1023 | reserved | Reserved |

In Table 3 and Table 4, sub-frames which are defined in the FDD and the TDD, respectively, and from which the periodic SRS specific to UE is transmitted, are represented as the period $T_{SRS}$ and the offset $T_{offset}$, and the number of possible cases is 1024 and can be transmitted by 10 bit higher layer signaling (e.g., RRC signaling). For example, in Table 3, when a value of ISRS is 3, the period $T_{SRS}$ is 5 and the offset $T_{offset}$ is 1, which implies that the periodic SRS for the UE is transmitted from the second sub-frame while configuring 5 sub-frame units as a period.

Further, information on a Resource Block (RB) to which an SRS is transmitted may be signaled. First, the number of cell-specific entirely-used resource blocks is signaled (at this time, the used resource block corresponds to specific resource blocks corresponding to the signaled number among resource blocks corresponding to the entire system BandWidth (BW). For example, when the system bandwidth is 50 resource blocks and the number of signaled resource blocks is 48, 48 resource blocks among the entirety of 50 resource blocks are used), and the number and the location of resource blocks used for each UE among resource blocks which are used while being cell-specified are signaled.

For example, Table 5 corresponds to a table used when the system bandwidth is 40 to 60 resource blocks.

Different tables may be defined according to system bandwidths. The number of entirely-used cell-specific resource blocks can be transmitted as a parameter value $C_{SRS}$. The number of resource blocks used for each UE among the cell-specific resource blocks can be defined as a parameter $B_{SRS}$. For example, in table 5, when $C_{SRS}$ is 1 and $B_{SRS}$ is 2, the number $m_{SRS,0}$ of cell-specific resource blocks used for the entire SRS transmission is 48 and the number $m_{SRS,2}$ of resource blocks used for a specific UE thereamong is 8. In addition, a parameter $n_{RRC}$ can be defined in order to represent the location of a resource block used for each UE. Such parameters $C_{SRS}$, $B_{SRS}$, and $n_{RRC}$ can be transmitted through higher layer signaling (e.g., the RRC).

TABLE 5

| SRS bandwidth configuration $C_{SRS}$ | SRS-bandwidth $B_{SRS}=0$ | | SRS-bandwidth $B_{SRS}=1$ | | SRS-bandwidth $B_{SRS}=2$ | | SRS-bandwidth $B_{SRS}=3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 0 | 48 | 1 | 24 | 2 | 12 | 2 | 4 | 3 |
| 1 | 48 | 1 | 16 | 3 | 8 | 2 | 4 | 2 |
| 2 | 40 | 1 | 20 | 2 | 4 | 5 | 4 | 1 |
| 3 | 36 | 1 | 12 | 3 | 4 | 3 | 4 | 1 |
| 4 | 32 | 1 | 16 | 2 | 8 | 2 | 4 | 2 |
| 5 | 24 | 1 | 4 | 6 | 4 | 1 | 4 | 1 |
| 6 | 20 | 1 | 4 | 5 | 4 | 1 | 4 | 1 |
| 7 | 16 | 1 | 4 | 4 | 4 | 1 | 4 | 1 |

Further, information on a sub-carrier to which an SRS is allocated can be signaled. A value of transmission comb (kTC) corresponding to the information on the sub-carrier to which an SRS is allocated is 0 or 1, and the value indicates whether the aforementioned sub-carrier for the SRS transmission sub-frame and the SRS transmission resource block, through which a SRS sequence is substantially mapped and transmitted, is an even sub-carrier or an odd sub-carrier. This value can be also transmitted to each UE through higher layer signaling (e.g., RRC signaling).

In short, in order to allow a UE to transmit a periodic SRS or a trigger type 0 SRS, parameters srs-SubframeConfig and $I_{SRS}$ for determining a sub-frame from which an SRS is transmitted, parameters $C_{SRS}$, $B_{SRS}$, and $n_{RRC}$ for determining a resource block to which an SRS is transmitted, a parameter $k_{TC}$ for determining a sub-carrier to which an SRS is allocated, a parameter $n_{SRS}^{cs}$ for determining a cyclic shift of an SRS, and the number of antenna ports can be transmitted from a transmission port to the UE through high layer signaling such as RRC signaling. In detail, these contents will be represented in Table 6.

TABLE 6

| Srs-SubframeConfig | $I_{SRS}$ | $C_{SRS}$ | $B_{SRS}$ | $n_{RRC}$ | $k_{TC}$ | $n_{SRS}^{cs}$ | The number of antenna ports |
|---|---|---|---|---|---|---|---|
| Designate through higher layer signaling (RRC signaling) | | | | | | | |

Meanwhile, the SRS can be transmitted from a specific sub-frame, in which an SRS is aperiodically configured, among the cell-specific SRS transmittable sub-frames determined by Table 1 or Table 2, and said SRS may be called an aperiodic SRS or a trigger type 1 SRS.

In this case, the SRS is aperiodically transmitted from the corresponding specific sub-frame, having a specific period and a specific offset which are defined for each UE as in Table 7 (FDD) or Table 8 (TDD), among the cell-specific SRS transmittable sub-frames. Here, the aperiodic transmission implies that some configurable cases are designated in advance and whenever the cases are needed, the SRS transmission is triggered through dynamic signaling such as a DCI. As described above, in a case of the periodic (trigger type 0) SRS, various kinds of signaling information for the SRS transmission (e.g., information on an SRS transmission sub-frame, information on an SRS transmission resource block, information on an SRS allocation sub-carrier, information on a cyclic shift value used when the SRS sequence is generated, information on the number of SRS transmission antennas, etc.) are directly transmitted through higher layer signaling (RRC signaling). However, in a case of the aperiodic (trigger type 1) SRS, values corresponding to some of the signaling information for the SRS transmission are not directly transmitted and some of them are designated as a parameter set through higher layer signaling (RRC signaling), and only when the SRS transmission is required, only a value indicating the parameter set is transmitted through dynamic signaling such as a DCI.

TABLE 7

| SRS Configuration Index $I_{SRS}$ | SRS Periodicity $T_{SRS,1}$ (ms) | SRS Subframe Offset $T_{offset,1}$ |
|---|---|---|
| 0-1 | 2 | $I_{SRS}$ |
| 2-6 | 5 | $I_{SRS} - 2$ |
| 7-16 | 10 | $I_{SRS} - 7$ |
| 17-31 | reserved | reserved |

TABLE 8

| SRS Configuration Index $I_{SRS}$ | SRS Periodicity $T_{SRS,1}$ (ms) | SRS Subframe Offset $T_{offset,1}$ |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS} - 10$ |

TABLE 8-continued

| SRS Configuration Index $I_{SRS}$ | SRS Periodicity $T_{SRS, 1}$ (ms) | SRS Subframe Offset $T_{offset, 1}$ |
|---|---|---|
| 15-24 | 10 | $I_{SRS} - 15$ |
| 25-31 | reserved | reserved |

In a case of the aperiodic SRS or the trigger type 1 SRS, parameters, which are included in the parameter set, may include the parameter $I_{SRS}$ used for determining a transmission sub-frame, the parameters $B_{SRS}$ and $n_{RRC}$ used for determining an SRS transmission resource block, the parameter $k_{TC}$ used for determining a sub-carrier to which an SRS is allocated, the parameter $n_{SRS}^{cs}$ used for determining a cyclic shift of an SRS, and the number of antenna ports. Meanwhile, the parameters srs-SubframeConfig and $C_{SRS}$ may not be included in the aforementioned parameter set. In summary, these contents are represented in Table 9.

TABLE 9

| Srs-SubframeConfig | CSRS | ISRS | BSRS | nRRC | kTC | $n_{SRS}^{cs}$ | The number of antenna ports |
|---|---|---|---|---|---|---|---|
| Designate by higher layer signaling (RRC) | | Designate parameter set through higher layer signaling (RRC) Indicate parameter set through dynamic signaling (DCI) | | | | | |

In a case of DCI format 0, a signal which triggers an aperiodic SRS has 1 bit, and a value transmitted therethrough is represented by Table 10 as follows. In a case of DCI format 4, a signal which triggers an aperiodic SRS has 2 bits, and a value transmitted therethrough is represented by Table 11.

TABLE 10

| Value of SRS request field (1bit case) | Description |
|---|---|
| "0" | No type 1 SRS trigger |
| "1" | The $1^{st}$ SRS parameter set configured by higher layers |

TABLE 11

| Value of SRS request field (2bits case) | Description |
|---|---|
| "00" | No type 1 SRS trigger |
| "01" | The $1^{st}$ SRS parameter set configureed by higher layers |
| "10" | The $2^{nd}$ SRS parameter set configured by higher layers |
| "11" | The $3^{rd}$ SRS parameter set configured by higher layers |

For example, in a case of DCI format 4, when a value of an SRS request field is "00", an aperiodic SRS or a type 1 SRS is not transmitted, and the value of the SRS request field is "01", "10", or "11", the aperiodic SRS or the type 1 SRS is transmitted according to a parameter among three parameters configured through the higher layer signaling (the RRC signaling).

In a CoMP cooperative set, as illustrated in FIG. 4, it is necessary that SRS configurations of all transmission/reception points having different cell IDs can be notified of to UEs, in which uplink CoMP is implemented, through the higher layer signaling.

The last symbol of the PUSCH should be rate-matched at simultaneous transmission of the PUSCH and the SRS, which is defined in Rel-8/9/10. However, when the SRS configurations between different RPs are not identical, the UE can rate-match all SRSs, or a part of a subset of SRSs. Meanwhile, static/semi-static/dynamic signaling can be additionally performed by the higher layer signaling, e.g., the RRC signaling or the PDCCH/EPDCCH signaling, for the corresponding UE.

Embodiment 2

Frequency Hopping of One Aperiodic SRS

A specific sub-frame, from which an SRS is transmitted, can be configured periodically or aperiodically.

As described above, in order to allow a UE to transmit a periodic SRS or a trigger type 0 SRS, parameters srs-SubframeConfig and $I_{SRS}$ for determining a sub-frame from which an SRS is transmitted, parameters $C_{SRS}$, $B_{SRS}$, and $n_{RRC}$ for determining a resource block to which an SRS is transmitted, a parameter $k_{TC}$ for determining a sub-carrier to which an SRS is allocated, a parameter $n_{SRS}^{cs}$ for determining a cyclic shift of an SRS, and the number of antenna ports can be transmitted from a transmission port to the UE through high layer signaling such as RRC signaling.

Meanwhile, an SRS can be transmitted from an aperiodically-configured specific sub-frame among cell-specific SRS transmittable sub-frame determined by Table 1 and Table 2, and can be called an aperiodic SRS or a trigger type 1 SRS.

In this case, the SRS is aperiodically transmitted from the corresponding specific sub-frame among the cell-specific SRS transmittable sub-frames configured in Table 1 or Table 2 while having a specific period and a specific offset defined for each UE as in Table 7 (FDD) or Table 8 (TDD). Here, the aperiodic transmission implies that some configurable cases are designated in advance and whenever the cases are needed, the SRS transmission is triggered through dynamic signaling such as a DCI.

In a case of the aperiodic SRS or the trigger type 1 SRS, parameters, which are included in the parameter set, may include the parameter $I_{SRS}$ used for determining a SRS transmission sub-frame, the parameters $B_{SRS}$ and $n_{RRC}$ used for determining an SRS transmission resource block, the parameter $k_{TC}$ used for determining a sub-carrier to which an SRS is allocated, the parameter $n_{SRS}^{cs}$ used for determining a cyclic shift of an SRS, and the number of antenna ports. Meanwhile, the parameters srs-SubframeConfig and $C_{SRS}$ may not be included in the above-mentioned parameter set.

FIG. 10 illustrates an aperiodic SRS which does not perform frequency hopping and an aperiodic SRS which performs frequency hopping according to yet another embodiment.

Referring to FIG. 10, aperiodic SRS transmission to the last symbol of a sub-frame on a frequency region should cover a frequency bandwidth concerned with frequency region scheduling.

As illustrated in FIG. 10A, sufficiently wide aperiodic SRS transmission can be performed such that single aperiodic SRS transmission can estimate channel quality for the entire concerning frequency bandwidth. Meanwhile, as illustrated in FIG. 10B, a narrow-banded aperiodic SRS is transmitted while hopping on a frequency region, so that such aperiodic SRS transmissions are combined, thereby covering the concerned entire frequency bandwidth.

Unlike FIG. 10B, the narrow-banded aperiodic SRS frequency hopping can also support one time of aperiodic transmission. At this time, the location of a frequency may be determined by a sub-frame index from which an aperiodic SRS is transmitted. Meanwhile, frequency hopping equations for a periodic SRS may be reused or may be newly defined. Meanwhile, a frequency hopping bandwidth srs-HoppingBandwidth-ap for an aperiodic SRS ($b_{hop}$ for aperiodic SRS) may be configured separately from a periodic SRS. The frequency hopping bandwidth srs-HoppingBandwidth-ap for an aperiodic SRS may be common to all RRC configuration sets or may be different with respect to RRC configuration sets. In the latter case, a frequency hopping bandwidth for an aperiodic SRS corresponding to SRS configuration sets by RRC signaling may be defined.

For example, the aperiodic SRS frequency hopping may be configured by a parameter $b_{hop} \in \{0, 1, 2, 3\}$ provided by a higher layer parameter srs-HoppingBandwidth-ap.

When frequency hopping of an aperiodic SRS is not enabled (e.g., $b_{hop} \geq B_{SRS}$), a frequency hopping index $n_b$ maintains a specific value and is defined by $n_b = \lfloor 4n_{RRC}/m_{SRS,b} \rfloor \mod N_b$. At this time, a parameter $n_{RRC}$ is given by a higher layer parameter freqDomainPosition-ap for aperiodic transmission. When the frequency hopping of an aperiodic SRS is enabled (e.g., $b_{hop} < B_{SRS}$), the frequency hopping index $n_b$ is defined by Equation (7) as follows.

[Equation 7]

$$n_b = \begin{cases} \lfloor 4n_{RRC}/m_{SRS,b} \rfloor \mod N_b & b \leq b_{hop} \\ \{F_b(n_{SRS}) + \lfloor 4n_{RRC}/m_{SRS,b} \rfloor\} \mod N_b & \text{otherwise} \end{cases} \quad (7)$$

At this time, $n_b$ is given by the same table as that of the periodic SRS for each uplink bandwidth $N_{RB}^{UL}$. $F_b(n_{SRS})$ is given by Equation (8) as follows.

[Equation 8]

$$F_b(n_{SRS}) = \begin{cases} (N_b/2) \left\lfloor \frac{n_{SRS} \mod \Pi_{b'=b_{hop}}^b N_{b'}}{\prod_{b'=b_{hop}}^{b-1} N_{b'}} \right\rfloor + \left\lfloor \frac{n_{SRS} \mod \Pi_{b'=b_{hop}}^b N_{b'}}{2 \prod_{b'=b_{hop}}^{b-1} N_{b'}} \right\rfloor & \text{if } N_b \text{ even} \\ \lfloor N_b/2 \rfloor \left\lfloor n_{SRS} / \prod_{b'=b_{hop}}^{b-1} N_{b'} \right\rfloor & \text{if } N_b \text{ odd} \end{cases} \quad (8)$$

At this time, $N_{b_{hop}} = 1$. Meanwhile, $n_{SRS}$ can be defined by Equation (9) as follows.

[Equation 9]

$$n_{SRS} = \begin{cases} 2N_{sp}n_f + 2(N_{sp} - 1) \lfloor \frac{n_s}{10} \rfloor + \lfloor \frac{T_{offset}}{T_{offset\_max}} \rfloor, & \text{for 2 ms SRS periodicity of frame structure type 2} \\ \lfloor (n_f \times 10 + \lfloor n_s/2 \rfloor)/T_{SRS} \rfloor, & \text{otherwise} \end{cases} \quad (9)$$

At this time, $T_{SRS}$ is a period of specific SRS transmission, $T_{offset}$ is an offset of an SRS sub-frame, and $T_{offset\_max}$ is the maximum value for a configuration of an offset of the SRS sub-frame.

As described above, when an aperiodic SRS which performs frequency hopping is completely mapped to a resource element, a SC-FDMA symbol is generated through the SC-FDMA generator (not illustrated in FIG. 7) and an SRS signal is transmitted to a transmission/reception point.

Embodiment 3

SRS Power Control

FIG. 11 is a flowchart illustrating an uplink power control method according to yet another embodiment.

Referring to FIGS. 1 and 11, a first transmission/reception point, e.g., the eNB 110, which corresponds to a serving cell, searches for at least one transmission/reception point, e.g., transmission/reception points, e.g., a second transmission/reception point, e.g., the RRH 122, which has a probability to transmit a PDSCH to the UE 120 (S1101).

At this time, a CoMP system according to another embodiment corresponds to the coordinated multi-cell communication system described with reference to FIG. 4, but is not limited thereto. Of course, the number of transmission/reception points participating in coordinated communication may be 4 as illustrated in FIGS. 4 and 5, but is not limited thereto, and may be 2 or 3 or 5 or more. However, for the convenience of the description, the transmission/reception points participating in coordinated communication are described as first to fourth transmission/reception points as illustrated in FIGS. 4 and 5.

In step 1101, the first transmission/reception point 110 can designate second to fourth transmission/reception points which execute downlink to the UE 120, and the second to fourth transmission/reception points, which execute downlink, may be changed by the first transmission/reception point 110 according to an environment change of the system.

Thus, the first transmission/reception point 110 searches for all transmission/reception points which have a probability to transmit a PDSCH to the UE 120 as well as a transmission/reception point which currently transmits a PDSCH to the UE 120, and then allocates at least one optimum transmission/reception point to the UE 120. Here, the allocation of the transmission/reception point implies that information, which is required for the UE 120 to receive a signal from each transmission/reception point, is notified of to the UE 120.

The first transmission/reception point 110 corresponding to a serving cell can transmit information on a CoMP set which performs cooperative communication to the UE 120 through a higher layer message, e.g., Radio Resource Control (RRC) signaling and a downlink control channel.

Next, the first transmission/reception point 110 transmits UE-specific reference signal configuration information of the discovered second to fourth transmission/reception points to the UE 120. The UE-specific reference signal may be, for example, a CSI-RS or a DM-RS.

When the UE-specific reference signal is the CSI-RS, the first transmission/reception point transmits, to the UE 120, CSI-RS transmission power information and CSI-RS configuration information of the discovered second and third transmission/reception points.

The CSI-RS transmission power information and the CSI-RS configuration information is stored in a table in the UE 120 or is configured in the system in advance and thus is known to the UE 120 in advance.

The aforementioned CSI-RS transmission power information and the CSI-RS configuration information may be transmitted in an RRC form as a higher layer. Otherwise, these two types of information may be transmitted in a system information form.

When the UE-specific reference signal is the DM-RS, in step S502, the first transmission/reception point 110 transmits, to the UE 120, DM-RS transmission power information and DM-RS configuration information of the discovered second and third transmission/reception points. The DM-RS transmission power information and the DM-RS configuration information are stored in a table in the UE 120.

The DM-RS is supplied for transmission of the PDSCH. In a wireless communication system, the DM0RS is pre-coded in a pre-coding matrix such as the PDSCH. The first transmission/reception point 110 maximally has 8 antenna ports, and thus, the number of layers used for the transmission of the PDSCH is maximally 8. Therefore, the first transmission/reception point 110 can use maximally 8 DM-RS ports at a time of the transmission of the PDSCH.

In a situation in which each transmission/reception point has the same cell ID, the UE can receive one or more Transmit Power Control (TPC) commands from the first transmission/reception point (S1110).

The TPC commands may be included in a response message for a preamble for a random access (PRACH) or may be transmitted through a PDCCH. The PDCCH has various formats according to Downlink Control Information (DCI), and has different transmitted TPC commands according to the formats.

As an example, the UE 120 can receive a PDCCH having various formats such as a format for downlink scheduling, a format for uplink scheduling, a TPC-dedicated format for a PUSCH, a TPC-dedicated format for a PUCCH, etc. Further, the TPC command may be used to determine transmission power for each of component carrier waves, transmission power for a component carrier wave group, or transmission power for the entire component carrier waves. Further, the TPC command may be used to determine transmission power for each of signals (e.g., PUSCH, PUCCH, etc.). The TPC command can be received through PDCCHs having various formats such as a format for downlink scheduling, a format for uplink scheduling, a TPC-dedicated format for a PUSCH, a TPC-dedicated format for a PUCCH, etc.

As described above, the TPC command may include $h_c(i)$ corresponding to the UE-specific SRS transmission power information for adjusting SRS transmission power used for SRS power control. At a time of the SRS power control, $h_c(i)$ may be substituted for $f_c(i)$ or may be added to $f_c(i)$. Accordingly, a transmission/reception point corresponding to a serving cell can control SRS transmission power independently of or additionally to PUSCH transmission power.

The UE 120 receives, from the first transmission/reception point 110, a cell-specific reference signal and/or a UE-specific reference signal, e.g., a CSI-RS and a DM-RS (S1111).

The UE 120 receives a UE-specific RS, e.g., a CSI-RS and a DM-RS, from transmission/reception points, which transmit a PDSCH, e.g., the second transmission/reception point 122 (S1112).

The UE 120 calculates a substantial path loss $PL_c^{eff}$ for a specific transmission/reception point on the basis of one or more reference signals among a CRS, a CSI-RS and a DM-RS (S1120).

In step S1120, the UE 120 can receive a CRS through the first transmission/reception point always corresponding to a serving cell and calculate a path loss from the first transmission/reception point 110 on the basis of the CRS.

In an environment in which at least one transmission/reception point has the same cell ID, since other transmission/reception points except for the first transmission/reception point 110 do not transmit a CRS, a path loss from the other transmission/reception points cannot be measured.

In step S1120, when the UE 120 has identified transmission power of the CSI-RS or the DM-RS of transmission/reception points, e.g., the second transmission/reception point 122, the UE 120 can measure reception power of the CSI-RS or the DM-RS to calculate a downlink path loss from the second transmission/reception point 122 which transmits a PDSCH.

In detail, the transmission/reception points including the first transmission/reception point corresponding to a serving cell may have a CSI-RS or a DM-RS, e.g., sequences, ports, mapping or sub-frames, which can be distinguished from other transmission/reception points, and information on the CSI-RS or the DM-RS can be notified of to the UE 120.

The UE can measure a path loss for at least one transmission/reception point on the basis of the CRS, the CSI-RS, or the DM-RS, and can perform uplink transmission power control on the basis of the measured result (S1130).

(1) PUCCH Transmission Power

When each UE transmits a PUCCH to a serving cell (c), transmission power $P_{PUCCH,c}(i)$ of the PUCCH in a sub-frame (i) may be determined by Equation (10) as follows.

[Equation 10]

$$P_{PUCCH}(i) = \min\begin{cases} P_{CMAX,t}(i) \\ P_{0\_PUCCH} + PL_4 + h(n_{CQI}, n_{HARQ}, n_{SR}) + \Delta_{F\_PUCCH}(F) + \Delta_{TzD}(F') + g(i) \end{cases} \quad (10)$$

In Equation (10), $P_{CMAX,c}(i)$ is maximum transmission power of a UE 120 in the sub-frame (i) with respect to the serving cell (c), and the PUCCH transmission power is restrained by the maximum transmission power of the UE 120.

$P_{0\_PUCCH}$ is a factor for reception power, which should be ensured for transmitting the PUCCH. $P_{0\_PUCCH}$ is a factor for reception power, which is required for obtaining a reception Signal-to-Interference and Noise Ratio (SINR) required by a transmission/reception point, and is determined by a PUCCH format, etc.

$P_{Lc}$ is a measured value of a downlink path loss calculated by the UE 120 with respect to the serving cell (c) and is determined by Equation "$P_{Lc}$=(reference signal transmission power−Reference Signal Received Power (RSPR))".

$h(n_{CQI}, n_{HARQ}, N_{SR})$ is a power offset by $n_{CQI}$ corresponding to the number of information bits for Channel Quality Information (CQI), $n_{HARQ}$ corresponding to the number of HARQ bits transmitted to the sub-frame (i), and $N_{SR}$ indicating whether the sub-frame (i) is configured by a Scheduling Request for a UE or not. $\Delta_{F\_PUCCH}(F)$ is an offset determined by a PUCCH format (F). $\Delta_{TxD}(F')$ is an offset obtained considering a case where the UE 120 transmits a PUCCH using two antenna ports.

g(i) is a value for directly adjusting PUCCH transmission power through an explicit transmission power control command. g(i) is a cumulative value and increases or decreases by a particular amount. g(i) may be included in downlink scheduling allocation or may be provided as a particular form of a PDCCH by which a transmission power control command is simultaneously transmitted to various UEs. For example, g(i) may correspond to a DCI format 3/3A. g(i) may be used to compensate for uplink multi-path fading which is not reflected with respect to a downlink path loss or to compensate for a change in uplink interference which is not reflected with respect to $P_{0\_PUCCH}$.

(2) PUSCH Transmission Power

In a wireless communication system, when each UE 120 does not simultaneously transmit a PUSCH and a PUCCH to a serving (c), transmission power $P_{PUSCH,c}(i)$ of the PUSCH in a sub-frame (i) may be determined by Equation (11) as follows.

In Equations (11) and (12), $P_{CMAX,c}(i)$ is maximum transmission power of the UE 120 in the sub-frame (i), $\hat{P}_{CMAX,c}(i)$ is a linear value of $P_{CMAX,c}(i)$ and $\hat{P}_{PUCCH,c}(i)$ is a linear value defined in Equation (10). Referring to Equation (11), when the PUSCH and the PUCCH are not simultaneously transmitted, the PUSCH transmission power is restrained by the maximum transmission power of the UE 120. Referring to Equation (12), when the PUSCH and the PUCCH are simultaneously transmitted, the PUSCH transmission power is restrained by a restraint value corresponding to the transmission power of the PUCCH within the maximum transmission power.

$M_{PUSCH,c}(i)$ is a bandwidth of PUSCH resource allocation represented by the number of resource blocks effective with respect to the serving cell (c) and the sub-frame (i). Allocation of more resource blocks requires higher transmission power.

$P_{0\_PUSCH,c}(j)$ is a factor for reception power which should be ensured for transmitting the PUSCH. $P_{0\_PUSCH}$ is a factor for reception power required for obtaining a reception SINR required by a transmission/reception point, and is determined by a PUSCH format, etc. P0_PUSCH is a value determined on the basis of an interference level at the transmission/reception point, and interference may change according to a system building situation and may change according to a time because a load in a network changes according to the time. j=0 with respect to PUSCH (re)transmission for a semi-persistent grant, j=1 with respect to PUSCH (re)transmission for a dynamically-scheduled grant, and j=2 with respect to PUSCH (re)transmission for a random access response grant.

$\alpha_c(j)$ denotes a degree to which a path loss is compensated for. When $\alpha_c(j)$ is 1, the value "1" implies that the path loss is completely compensated for, and when $\alpha_c(j)$ is lower than 1, the value, which is lower than 1, implies that the path loss is not completely compensated for. When j=0 or 1, $\alpha_c(j)\in\{0, 0.4, 0.5, 0.6, 0.7, 0.8, 0.9, 1\}$, and when j=2, $\alpha_c(j)$=1.

$PL_c$ is a measured value of a downlink path loss calculated by the UE 120 with respect to the serving cell (c), and is

[Equation 11]

$$P_{PUSCH,c}(f) = \min\begin{cases} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(t) + f_c(t) \end{cases} \quad (11)$$

In a wireless communication system, when each UE 120 simultaneously transmits a PUSCH and a PUCCH to a serving cell (c), transmission power $P_{PUSCH,c}(i)$ of the PUSCH in a sub-frame (i) may be determined by Equation (11) as follows.

determined by Equation "$P_{LC}$=(reference signal transmission power−Reference Signal Received Power (RSPR))".

$\Delta TF,c(i)$ is an offset determined by the Modulation and Coding Scheme (MCS) with respect to the serving cell (c).

[Equation 12]

$$P_{PUSCH,c}(f) = \min\begin{cases} 10\log_{10}(\hat{P}_{CMAX,c}(i) - \hat{P}_{PUCCH(i)}), \\ 10\log_{10}(M_{PUSCH,c}(i)) + P_{O\_PUSCH,c}(j) + \alpha_c(j) \cdot PL_c + \Delta_{TF,c}(i) + f_c(i) \end{cases} \quad (12)$$

$f_c(i)$ is a value for directly adjusting PUSCH transmission power through an an explicit transmission power control command. $f_c(i)$ is a cumulative value and increases or decreases by a particular amount. $f_c(i)$ is included in an uplink scheduling grant.

In more detail, an equation "$f_c(i)=f_c(i-1)+\delta_{PUSCH,c}(i-K_{PUSCH})$" is represented. $\delta_{PUSCH,c}(i-K_{PUSCH})$ is signaled to DCI format 0 or 3/3A from a sub-frame $i-K_{PUSCH}$. When the accumulation is not possible, an equation "$f_c(i)=\delta_{PUSCH,c}(i-K_{PUSCH})$" is satisfied.

When the serving cell (c) is a primary cell, the transmission power $P_{PUCCH}(i)$ of the PUCCH in the sub-frame (i) is represented by Equation (13) as follows.

[Equation 13]

$$P_{PUCCH}(i) = \min\begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix}[dBm] \quad (13)$$

In Equation (13), $P_{CMAX,c}(i)$ is the maximum transmission power of the UE 120 in the sub-frame (i) with respect to the serving cell (c), and the PUCCH transmission power is limited thereto.

$P_{0\_PUCCH}$ is configured by a common power level $P_{0\_NOMINAL\_PUCCH}$ and a UE-specific power level $P_{0\_UE\_PUSCH}$.

In other words, $P_{0\_PUCCH}$ is a factor for the reception power which should be ensured for transmitting the PUCCH. $P_{0\_PUCCH}$ is a factor for the reception power required for obtaining a reception SINR required by a base station and is determined by the PUCCH format, etc.

$PL_C$, is a measured value of a downlink path loss calculated by the UE 120 with respect to the serving cell (c), and is determined by Equation "$P_{Lc}=$(reference signal transmission power−Reference Signal Received Power (RSPR))".

$h(n_{CQI}, n_{HARQ}, n_{SR})$ is a power offset by $n_{CQI}$ corresponding to the number of information bits for CQI, $n_{HARQ}$ corresponding to the number of HARQ bits transmitted to the sub-frame (i), and $N_{SR}$ indicating whether the sub-frame (i) is configured by a Scheduling Request for a UE or not. $\Delta_{F\_PUCCH}(F)$ is an offset determined by a PUCCH format (F).

With respect to PUCCH formats 1, 1a and 1b, an equation "$h(n_{CQI}, n_{HARQ}, n_{SR})=0$" is satisfied.

With regard to a PUCCH format 1b, when a UE is configured by one or more serving cells, an equation $$"h(n_{CQI}, n_{HARQ}, n_{SR}) = \frac{(n_{HARQ} - 1)}{2}"$$

is satisfied, and otherwise, an equation "$h(n_{CQI}, n_{HARQ}, n_{SR})=0$" is satisfied.

In a case of PUCCH formats 2, 2a and 2b and a normal cyclic prefix, an equation "$h(n_{CQI}, n_{HARQ}, n_{SR})=0$" is satisfied.

In a case of PUCCH format 2 and an extended cyclic prefix, an equation $$"h(n_{CQI}, n_{HARQ}, n_{SR}) = \begin{cases} 10\log_{10}\left(\frac{n_{CQI} + n_{HARQ}}{4}\right) & \text{if } n_{CQI} + n_{HARQ} \geq 4 \\ 0 & \text{otherwise} \end{cases}"$$

is satisfied.

With regard to PUCCH format 3, when a UE is configured by a higher layer to transmit a PUCCH to two antenna ports or the UE transmits a HARQ-ACK having 11 bits or more, an equation $$"h(n_{CQI}, n_{HARQ}, n_{SR}) = \frac{n_{HARQ} + n_{SR} - 1}{3}"$$

is satisfied.

With regard to PUCCH format 3, in the other cases an equation $$"h(n_{CQI}, n_{HARQ}, n_{SR}) = \frac{n_{HARQ} + n_{SR} - 1}{2}"$$

is satisfied.

$\Delta_{F\_PUCCH}(F)$ is an offset determined by a PUCCH format (F).

$\Delta_{TxD}(F)$ is an offset obtained by considering that the UE 120 transmits a PUCCH from two antenna ports.

g(i) is a value for directly adjusting the PUCCH transmission power through an explicit power control command. g(i) is a cumulative value and increases or decreases by a particular amount. g(i) may be included in downlink scheduling allocation (DCI formats 1A/1B/1D/1/2A/2/2B) and may be provided as a form of a special PDCCH which provides a power control command to a plurality of UEs at the same time (DCI formats 3/3A). g(i) may be used to compensate for uplink multi-path fading which is not reflected with respect to a downlink path loss or to compensate for a change in uplink interference which is not reflected with respect to $P_{0\_PUCCH}$.

In more detail, an equation is $$"g(i) = g(i-1) + \sum_{m=0}^{M-1} \delta_{PUCCH}(i - k_m)"$$

satisfied. g(i) corresponds to a current PUCCH power control adjustment state, and g(0) is an initial value after reset.

(3) SRS Transmission Power

A UE transmission power $P_{SRS}$, which is transmitted from the sub-frame (i) for the serving cell (c), is defined by Equation (14) as follows.

[Equation 14]

$$P_{SRS,c}(i) = \min\{P_{CMAX,c}(i), P_{SRS\_OFFSET,c}(m) + 10\log_{10}(M_{SRS,c}) + P_{0\_PUSCH,c}(j) + \alpha_c(j) \cdot PL_c + f_c(j)\}[dBm] \quad (14)$$

In Equation (14), PCMAX,c(i) is the maximum transmission power of the UE 120 in the sub-frame (i) for the serving cell (c), and SRS transmission power is limited thereof.

$P_{SRS\_OFFSET,c}(m)$ is an offset value and is a semi-static 4-bit factor defined by a higher layer with respect to m=0 and m=1 in the serving cell (c). In a case of SRS transmission in which trigger type 0 is given, m=0, and in a case of SRS transmission in which trigger type 1 is given, m=1. When Ks=1/25, $P_{SRS\_OFFSET,c}(m)$ is in a range of [−3,12]dB with an interval of 1 dB. When Ks=0, $P_{SRS\_OFFSET,c}(m)$ is in a range of [−10.5,12]dB with an interval of 1.5 dB. Meanwhile, $P_{SRS\_OFFSET,c}(0)$ and $P_{SRS\_OFFSET,c}(1)$ are in a range of, for example, [−18,28.5]dB, which is larger than the aforementioned range, with an interval which is equal to, larger than, or smaller than 1 dB or 1.5 dB.

Meanwhile, a power offset for aperiodic SRS power control may be P_SRS_offset(2) (m=2). The power offset P_SRS_offset(2) for aperiodic SRS power control may be the specific number of bits, for example, a 5-bit parameter.

When Ks=1.25, P_SRS_offset(2) is in a range of [−3,28] dB with an interval of 1 dB. When Ks=0, P_SRS_offset(2) is in a range of [−18,28.5]dB with an interval of 1.5 dB or in a range of [−10.5,28.5]dB with an interval of 1.5 dB.

$M_{SRS,c}$ is a bandwidth of the SRS transmission in the sub-frame (i) for the serving cell (c), which is represented by the number of resource blocks.

$f_c(i)$ has been defined by Equations (11) and (12).

Meanwhile, $h_c(i)$, which is adjusted through a new TPC command, may be used for the SRS power control. $h_c(i)$ is a value for adjusting the SRS transmission power through a UE-specific SRS TPC. $h_c(i)$ is a cumulative value, increases or decreases by a particular amount, or a non-cumulative value. At a time of SRS power control, $h_c(i)$ may be substituted for $f_c(i)$ or may be added to $f_c(i)$.

At the time of the SRS power control, when $h_c(i)$ is substituted for $f_c(i)$, the UE transmission power $P_{SRS}$ of an SRS transmitted from the sub-frame (i) for the serving cell (c) may be represented by Equation (15) as follows.

[Equation 15]

$$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_c(j)\cdot PL_c+h_c(i)\} \quad (15)$$

At the time of the SRS power control, when $h_c(i)$ is added to $f_c(i)$, the UE transmission power $P_{SRS}$ of an SRS transmitted from the sub-frame (i) for the serving cell (c) may be represented by Equation (16) as follows.

[Equation 16]

$$P_{SRS,c}(i)=\min\{P_{CMAX,c}(i), P_{SRS\_OFFSET,c}(m)+10\log_{10}(M_{SRS,c})+P_{O\_PUSCH,c}(j)+\alpha_c(j)\cdot PL_c+h_c(i)+f_c(i)\} \quad (16)$$

$h_c(i)$ may be included in a response message for a preamble for a random access (PRACH), may be included in downlink scheduling, may be included in uplink grant of DCI formats 0 or 4, or may be signaled by a higher layer, for example, an RRC. For example, when $h_c(i)$ is included in the downlink scheduling, $h_c(i)$ can be signaled by a downlink scheduling DCI formats, e.g., DCI formats 3/3A, which are scrambled by a SRS-specific RNTI.

The aperiodic SRS transmission may use a new power control method in which $h_c(i)$ is used or may use the existing power control method in which $f_c(i)$ is used. In particular, aperiodic SRS parameter sets can be implemented while including a new power control in which $h_c(i)$ is used. For example, the new SRS power control can be linked to the aperiodic SRS configurations triggered by DCI formats 1a/2b/2c.

$P_{O\_PUSCH,c}(j)$ and $a_c(j)$ are defined in Equations (2) and (3), and j is equal to 1.

Next, when transmission power for an uplink physical channel is controlled, the UE 120 generates an uplink physical channel having the corresponding transmission power, and then transmits Uplink signal to each transmission/reception point through the generated uplink physical channel (S1130, S1132, S1134).

Although not limited thereto, the control of the transmission power for the uplink physical channel can be performed in a frequency region before IFFT. In this case, the control of the transmission power can be performed in a sub-carrier wave unit, and as an example, the control can be performed by multiplying a weight point and a modulation value. The weight value can be multiplied using a diagonal matrix (power diagonal matrix) indicating a value corresponding to a degree to which each element is related to the transmission power. In a case of Multiple Input Multiple Output (MIMO) system, the transmission power can be controlled using a pre-coding matrix on which the weight point is reflected or can be controlled by multiplying the power diagonal matrix and the pre-coded modulation value. Thus, even when a plurality of physical channels are included in a frequency bandwidth to which the same IFFT is applied, the transmission power of each physical channel can be easily controlled.

Further, together with/separately from the power control on the frequency region, the control of the transmission power for an uplink physical channel can be performed on a time region after the IFFT. In detail, the control of the transmission control on the time region can be performed in various function blocks. As an example, the control of the transmission power can be performed in a DAC block and/or an RF block.

In the present specification, the simultaneous or same time region includes the same TTI or the same sub-frame.

Meanwhile, in LTE/LTE-A system, use of a Component Carrier (CC) corresponding to a plurality of unit carrier-waves is defined as a method of expanding a bandwidth for satisfying a system requirement, i.e., a high data transmission rate. Here, one CC may maximally have a bandwidth of 20 MHz and can allocate a resource within 20 MHz according to the corresponding service. However, the resource allocation is merely an embodiment according to a processing of implementing a system, and can be configured to have a bandwidth of 20 MHz or more according to the implementation of the system. Further, use of a Carrier Aggregation (CA) technology in which a plurality of component carrier waves are banded and the banded component carrier waves are used as one system bandwidth.

As an example, when 5 component carrier waves having the maximum bandwidth of 20 MHz are used, a service quality can be supported by expanding the bandwidth up to 100 MHz. The allocable frequency bandwidth, which can be determined by the component carrier waves, may be continuous or non-continuous according to the scheduling of an actual CA.

In a CA environment, in order to efficiently manage a plurality of component carrier waves, the plurality of component carrier waves can be classified into one Primary Component Carrier (PCC) and one or more Secondary Component Carriers (SCCs). Otherwise, the PCC may be called a primary cell or the SCC may be called a secondary cell.

The PCC can serve as a core carrier wave which manages the integrated entire component carrier waves, and the other SCCs can serve to provide an additional frequency resource for providing a higher transmission rate. For example, in an uplink, the PUCCH and the PUSCH including a UCI for controlling the uplink can be transmitted only through the PCC, and the PUCCH and the PUSCH including the UCI may not be transmitted through the SCC.

Otherwise, in order to efficiently manage a plurality of component carrier waves, an index (a serving cell index) can be designated to the plurality of component carrier waves. For example, when 5 component carrier waves (CC0, CC1, CC2, CC3, CC4) are integrated, serving cell indexes of component carrier waves can be designated from 0 to 4. For example, in the above example, CC0 having a serving cell index of 0 may be the PCC, and CC1 to CC4 having serving cell indexes of 1 to 4 may be the SCCs.

Next, a case where an SRS is transmitted together with a PUCCH, a PUSCH, and/or another SRS from a plurality of component carrier waves and a single sub-frame at the same time will be considered.

A priority of power allocation may be in an order of a PUCCH, a PUSCH, and an SRS. The PUCCH is for uplink control, and may have the highest priority. The PUSCH may have the second highest priority. Among the PUSCH, a PUSCH having a UCI has a priority higher than that of a PUSCH not having a UCI. The SRS is used for scheduling of a resource block in a subsequent uplink, and has a priority lower than that of the PUCCH and the PUSCH. In summary, these contents will be represented by Table 12 as follows.

TABLE 12

| PUCCH | PUSCH | | SRS |
|---|---|---|---|
| | With UCI | Without UCI | |
| Top | ← priority | | bottom |

Figure 12:
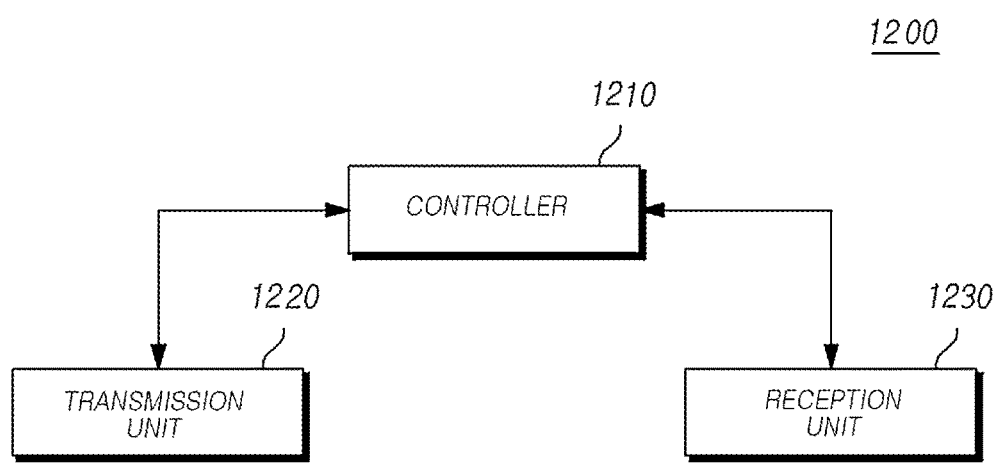
FIG. 12 illustrates a configuration of a transmission/reception point according to yet another embodiment.

FIG. 12 is a view illustrating a transmission/reception point according to yet another embodiment.

Referring to FIG. 12, a transmission/reception point 1200 according to yet another embodiment includes a controller 1210, a transmission unit 1220, and a reception unit 1230. The transmission/reception point 1200 may be the aforementioned transmission/reception point, e.g., the eNB 110 and/or the RRH 112, or the base station or the cell, which is described with reference to FIG. 1.

The controller 1210 controls an overall operation of the transmission/reception point according to a CoMP operation required for performing the aforementioned present invention. The controller 1210 controls the transmission unit 1220 and the reception unit 1230 to process an uplink demodulation reference signal.

The transmission unit 1220 and the reception unit 1230 are used for transmitting/receiving, to/from a UE, a signal, a message and data required for performing the aforementioned present invention.

The transmission unit 1220 can transmit, through higher layer signaling, two or more parameters for determining a time-frequency resource by which an aperiodic sounding reference signal is transmitted, can transmit an index for designating a parameter set including some of the parameters, through at least one of the PDCCH and the EPDCCH, and can transmit a signal which triggers an aperiodic sounding reference signal, through at least one of the PDCCH and the EPDCCH.

The reception unit 1230 can perform frequency-hopping to a part of a frequency region among the entire concerned frequency bandwidth through a time-frequency resource according to a parameter received through higher layer signaling and a parameter included in a parameter set received through at least one of a PDCCH and an EPDCCH, thereby receiving an aperiodic sounding reference signal.

Figure 13:
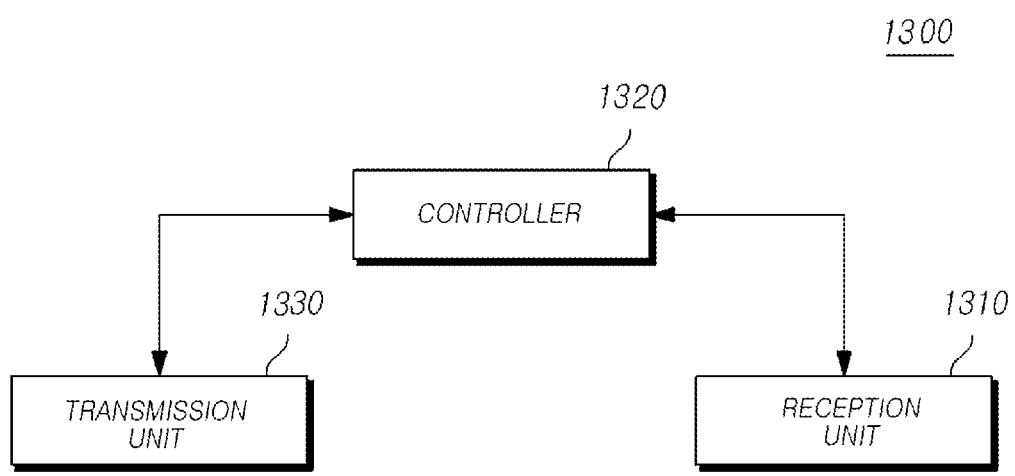
FIG. 13 illustrates a configuration of a user UE according to yet another embodiment.

FIG. 13 illustrates a configuration of a user UE according to yet another embodiment.

Referring to FIG. 13, a user terminal 1300 according to yet another embodiment includes a reception unit 1310, a controller 1320, and a transmission unit 1330. The user terminal 1300 may be the UEs 120 and 122, which have been described with reference to FIGS. 1 and 11, but is not limited thereto.

The reception unit 1310 receives downlink control information and data, and a message from a transmission/reception point through the corresponding channel.

Further, the controller 1320 controls an overall operation of the base station according to a CoMP operation which is required for performing the aforementioned present invention.

The controller 1320 may include the OFDM modulation unit 710, the resource element mapper 720, and the not-illustrated SC FDMA generator, which have been described with reference to FIG. 7.

The transmission unit 1330 transmits downlink control information and data, a message to the transmission/reception point through the corresponding channel.

In detail, the reception unit 1310 can receive two or more parameters for determining a time-frequency resource through which the aforementioned aperiodic sounding reference signal is transmitted, through higher layer signaling, can receive an index, which designates a parameter set including some of the parameters, through at least one of a PDCCH and an EPDCCH, and can receive a signal, which triggers an aperiodic sounding reference signal, through at least one of the PDCCH and the EPDCCH.

The reception unit 1330 can perform frequency-hopping to a part of a frequency region among the entire concerned frequency bandwidth through a time-frequency resource according to a parameter received through the aforementioned higher layer signaling and a parameter included in a parameter set received through at least one of a PDCCH and an EPDCCH, thereby transmitting the aperiodic sounding reference signal.

Enhanced Physical Control Channel (EPDCCH)

One radio-frame or one wireless-frame is configured by 10 sub-frames, and one sub-frame is configured by 2 slots. The wireless frame has a length of 10 ms, and the sub-frame has a length of 1.0 ms. In general, a basic unit of data transmission is a sub-frame unit, and scheduling of downlink or uplink is performed in a sub-frame unit.

One slot has a plurality of OFDM symbols in a time region and includes at least one sub-carrier wave in a frequency region. For example, the slot includes 7 OFDM symbols (in a case of Normal Cyclic Prefix) or 6 OFDM symbols (in a case of Extended Cyclic Prefix) in a time region, and includes 12 sub-carrier waves in a frequency region. In this way, a time-frequency region defined by one slot is called a Resource Block (RB), but is not limited thereto.

Figure 14:
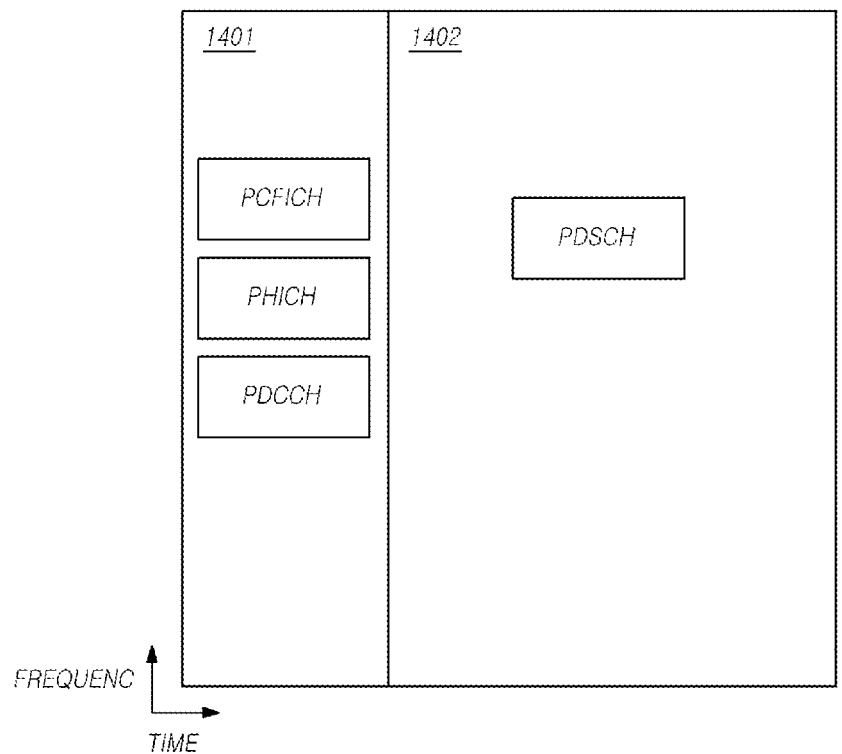
FIG. 14 illustrates a control region to which a control channel including a PDCCH, a PCFICH, and a PHICH is transmitted and a data region to which a data channel including a PDSCH is transmitted, in one sub-frame.

FIG. 14 illustrates a control region 1401 to which a control channel including a PDCCH, a PCFICH, and a PHICH is transmitted and a data region 1402 to which a data channel including a PDSCH is transmitted, in one sub-frame. In FIG. 14, a horizontal axis denotes a time, and a vertical axis denotes a frequency. FIG. 14 illustrates one sub-frame (1 ms) in a time axis and one channel (e.g., 1.4, 3, 5, 10, 15 or 20 MHz) in a frequency axis.

The PCFICH is configured by information having 2 bits corresponding an OFDM symbol, which is the size of the control region 1401, and is encoded to a codeword having 32 bits. The encoded bits are scrambled using a cell-specific and sub-frame-specific scrambling code in order to randomize inter-cell interference, are modulated using Quadrature Phase Shift Keying (QPSK), and are mapped to 16 resource elements. The PCFICH is always mapped to a first OFDM symbol of each sub-frame. When the PCFICH is mapped to the first ODFM symbol of the sub-frame, the PCFICH is divided into 4 groups and the groups are separated and mapped in a frequency region.

The PDCCH (control information) is used for transmitting Downlink Control Information (DCI) such as scheduling determination and a power control command. As an example, in the LTE/LTE-A, DCI format 0 and DCI format 4 are used for an uplink grant. DCI formats 1/1A/1B/1C/1D/2/2A/2B/2C are used for downlink scheduling allocation. Further, DCI formats 3/3A are used for power control A Cyclic Redundancy Check (CRC) is attached to each DCI message payload, and an Radio Network Temporary Identifier (RNTI) for identifying a UE is included in a process of calculating a CRC. After the CRC is attached, bits are encoded to a tail-biting convolutional code, and are matched with an amount of resources used for PDCCH transmission through rate matching.

The PDCCH can be transmitted within a common search space or a UE-specific search space of the control region 1401. Each UE can search for a PDCCH through blind decoding within the common search space commonly allocated to UEs within a cell and the UE-specific search space allocated to itself, and when it is identified that the PDCCH is received, the control can be performed on the basis of control information transmitted through the PDCCH.

Meanwhile, in LTE/LTE-A system, use of a Component Carrier (CC) corresponding to a plurality of unit carrierwaves is defined as a method of expanding a bandwidth for satisfying a system requirement, i.e., a high data transmission rate. Here, one CC may maximally have a bandwidth of 20 MHz and can allocate a resource within 20 MHz according to the corresponding service. However, the resource allocation is merely an embodiment according to a processing of implementing a system, and can be configured to have a bandwidth of 20 MHz or more according to the implementation of the system.

Meanwhile, in order to improve a data transmission rate, technologies such as Multiple-Input Multiple-Output (MIMO), Coordinated Multi-Point Transmission/Reception (CoMP), a wireless relay node, etc. have been proposed. In order to apply such technologies, it is required that more pieces of control information are transmitted from a transmission port such as a base station.

However, when the size of a control region to which the PDCCH is transmitted is limited, a method of transmitting control information to be transmitted through a PDCCH within a data region to which a PDSCH is transmitted may be considered as a method of increasing a transmission capacity of a PDCCH. Such a method can support a large PDCCH capacity while not decreasing a reception reliability of the PDCCH. Control information corresponding to the PDCCH transmitted from a data region, e.g., the PDSCH may be called extended control information (extended PDCCH, EPDCCH, X-PDCCH) and PDCCH-Advanced (PDCCH-A). Hereinafter, the description will be made in which the control channel is called EPDCCH. The EPDCCH is equally used in an R-PDCCH which is control channel for relay. That is, the EPDCCH is a concept including both a control channel for a relay and a control channel for adjusting inter-cell interference. According to an embodiment of the present invention, the EPDCCH can allocate a resource to a predetermined data region (data channel region) of a sub-frame.

The aforementioned EPDCCH is a new type of the PDCCH which is considered in an Rel-11 LTE system, and resource allocation of uplink control information (i.e., the PUCCH) which can be caused by the introduction of the EPDCCH is required.

Figure 15:
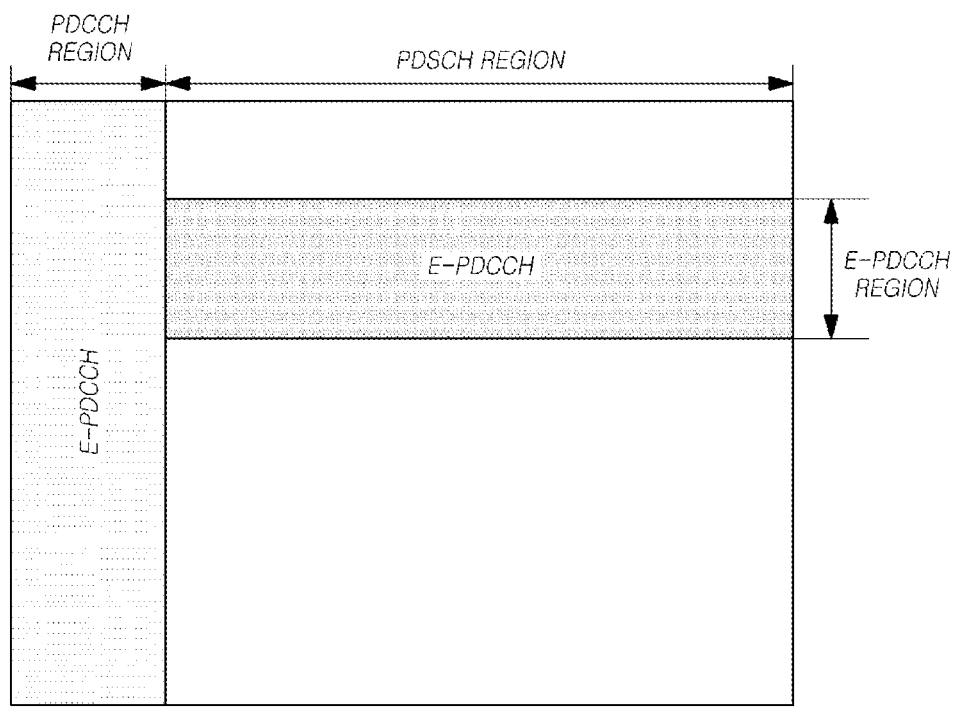
FIG. 15 illustrates an EPDCCH implementation scheme to which an embodiment of the present invention is applied.

FIG. 15 illustrates an EPDCCH implementation scheme to which an embodiment of the present invention is applied.

A legacy PDCCD for the existing Rel-8/9/10 UE is transmitted to the existing PDCCH region. A mode in which only an EPDCCH region is blind-decoded from Rel-11 UE through higher layer signaling or System Information (SI) can be considered.

According to embodiments, in 3GPP LTE/LTE-Advanced, at a time of Carrier Aggregation (CA), an EPDCCH for a New Type Carrier (NTC), a CoMP, and a downlink MIMO can be allocated to a PDSCH corresponding to a data region.

In the present specification, the allocation of the control information is used with the same meaning as the allocation of the control channel. In other words, in the present specification, the allocation of the control channel implies the allocation of the control information to the resource element.

At this time, the allocation of the control channel is performed in 2 slots, that is, in a Physical Resource Block (PRB) unit corresponding to one sub-frame, and the PDSCH and the EPDCCH cannot be allocated to one PRB pair at the same time. In other words, the PDSCH and the EPDCCH cannot be multiplexed to one PRB pair.

Meanwhile, pieces of control information or control channels of two or more UEs can be allocated to two or more PRB pairs or one PRB pair, so that the pieces of the control information of the UEs can be multiplexed.

Figure 16:
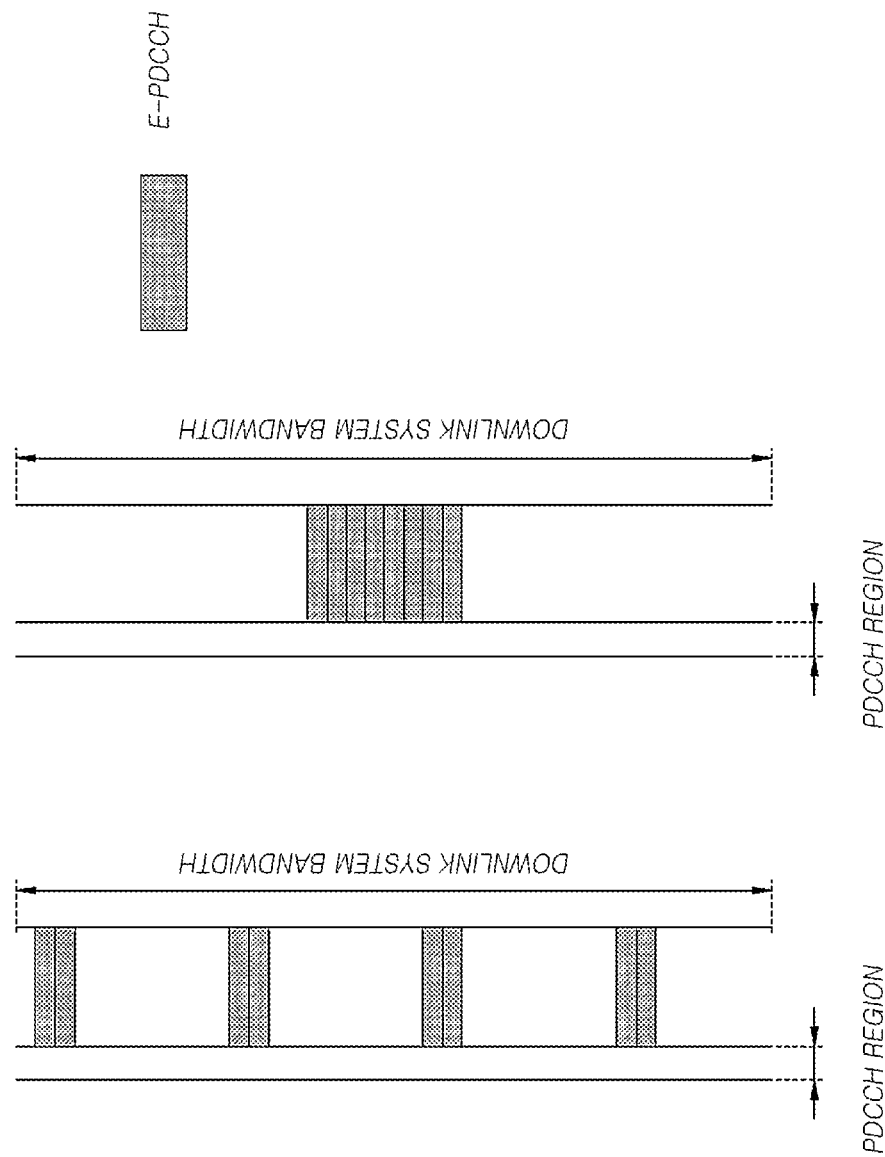
FIGS. 16A and 16B illustrate distributed transmission and localized transmission of an EPDCCH.

FIG. 16 illustrates distributed transmission and localized transmission of an EPDCCH.

Referring to FIG. 16, when the pieces of the control information of the UEs are multiplexed, one eCCE is allocated to two or more PRB pairs in a distributed scheme or to one PRB pair in a localized scheme. The former case is called distributed transmission or a distributed type (FIG. 16A), and the latter case is called localized transmission or a localized type (FIG. 16B).

The pieces of the control information of the UEs are multiplexed so that both the localized transmission and the distributed transmission can be supported. The performance of the localized transmission is improved during low speed movement, and the performance of the distributed transmission is improved beyond that of the existing PDCCH through which the control information is transmitted to the control region during high speed movement.

Meanwhile, a Common Search Space (CSS) can be supported with regard to a search space. At this time, when a common RNTI is transmitted, an SI-RNTI, a P-RNTI, a RA-RNTI, a TPC-PUCCH-RNTI, and a TPC-PUSCH-RNTI can be used.

1. EPDCCH Set

An EPDCCH set can be defined by a group of N PRB pairs (N is a natural number larger than 0 and smaller than the number of PRBs of an entire bandwidth). For example, N may be 1 or $2^n$ (n=1, 2, 3, 4, 5) in the localized transmission, but is not limited thereto. Further, the localized EPDCCH may be transmitted from an EPDCCH set.

Meanwhile, N may be 2, 4, 8, 16 in the distributed transmission, but is not limited thereto. In other words, a distributed EPDCCH can be transmitted using N PRB pairs in an EPDCCH set.

K EPDCCH sets (K≥1) may be configured UE-specifically. At this time, the maximum value of K may be one of 2, 3, 4, and 6, but is not limited thereto. K EPDCCH sets may not have the same N PRB pairs. At this time, the total number of blind decoding of the EPDCCH may be unrelated to or independent of K. The total number of blind decoding of the EPDCCH for a UE may be distributed to K configured EPDCCH sets. In other words, as described above, since the total number of EPDCCH USS blind decoding for each component carrier wave may be 32 or 48 according to a configuration of an uplink MIMO, the total number of the blind decoding of the EPDCCH for the UE can be distributed to K configured EPDCCH sets.

Each EPDCCH set can be configured with respect to a localized EPDCCH or a distributed EPDCCH. That is, each EPDCCH set cannot be configured while being mixed with the localized EPDCCH and the distributed EPDCCH. For example, K EPDCCH sets may be configured by KL localized EPDCCH sets and KD distributed EPDCCH sets. At this time, KL and KD may be 0.

Meanwhile, K EPDCCH sets may be allocated for one UE, and each EPDCCH set is a distributed type or a localized type. Thus, KL localized EPDCCHs and KD distributed EPDCCHs can be allocated for one UE. That is, KL+KD=K.

PRB pairs of EPDCCH sets having other logical EPDCCH set indexes may entirely overlap each other, may partially overlap each other, or may not overlap each other.

In K EPDCCH sets (K≥1), K may be maximally 2. Meanwhile, combinations of KL and KD may be {KL=1, KD=0}, {KL=0, KD=1}, {KL=1, KD=1}, {KL=0, KD=2}, and {KL=2, KD=0}.

In N PRB pairs constituting one EPDCCH set, N may be {2, 4, 8}. Meanwhile, when a system bandwidth is smaller than 8 PRBs, "N=8" may not be supported. Meanwhile, a restraint related to the system bandwidth may be added to a valid combination of N and K. In a case of the distributed type, "N=16" may be included.

2. RE Mapping for EPDCCH

Figure 17:
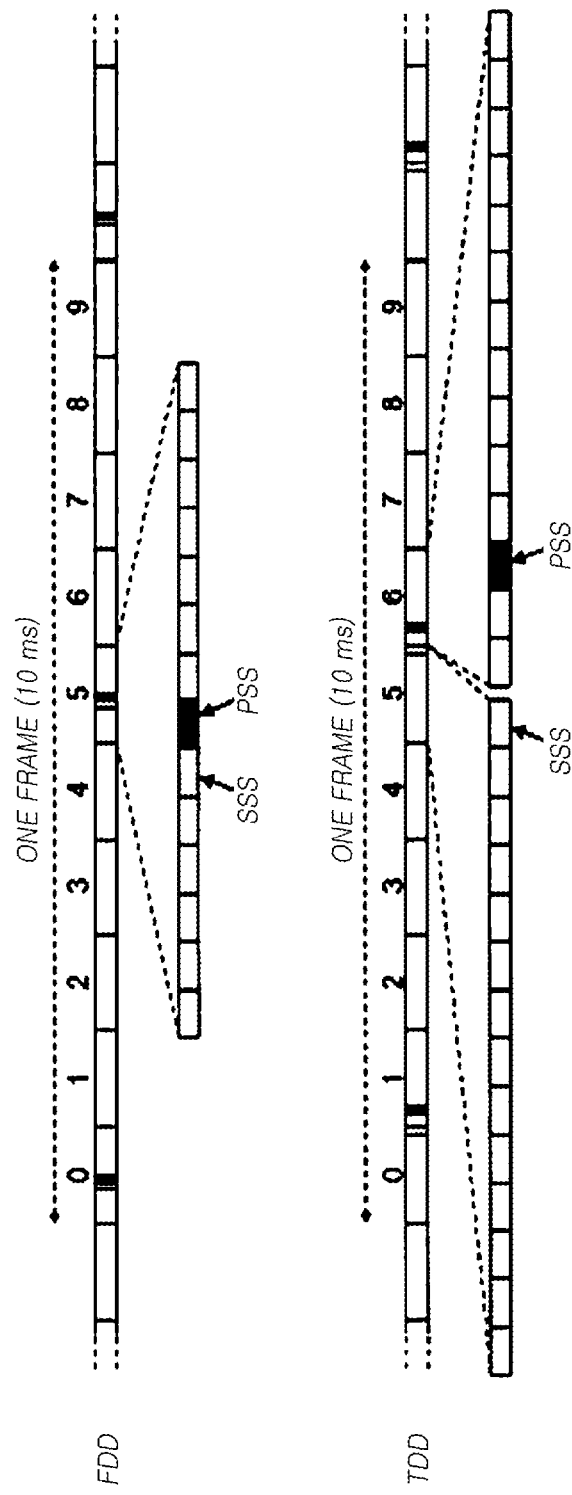
FIG. 17 illustrates locations of PSS/SSS on a symbol of an OFDM in a case of an FDD and a TDD.

FIG. 17 illustrates locations of PSS/SSS on a symbol of an OFDM in a case of an FDD and a TDD.

Referring to FIG. 17, in a case of the FDD, the PSS is transmitted to the last symbol of the first slot of sub-frames 0 and 5, and SSS is transmitted to the second last symbol of the same slot.

In a case of the TDD, the PSS is transmitted to the third symbol (i.e., DwPTS) of the sub-frames 1 and 6, and the SSS is transmitted to the last symbol of the sub-frames 0 and 5.

Figure 18:
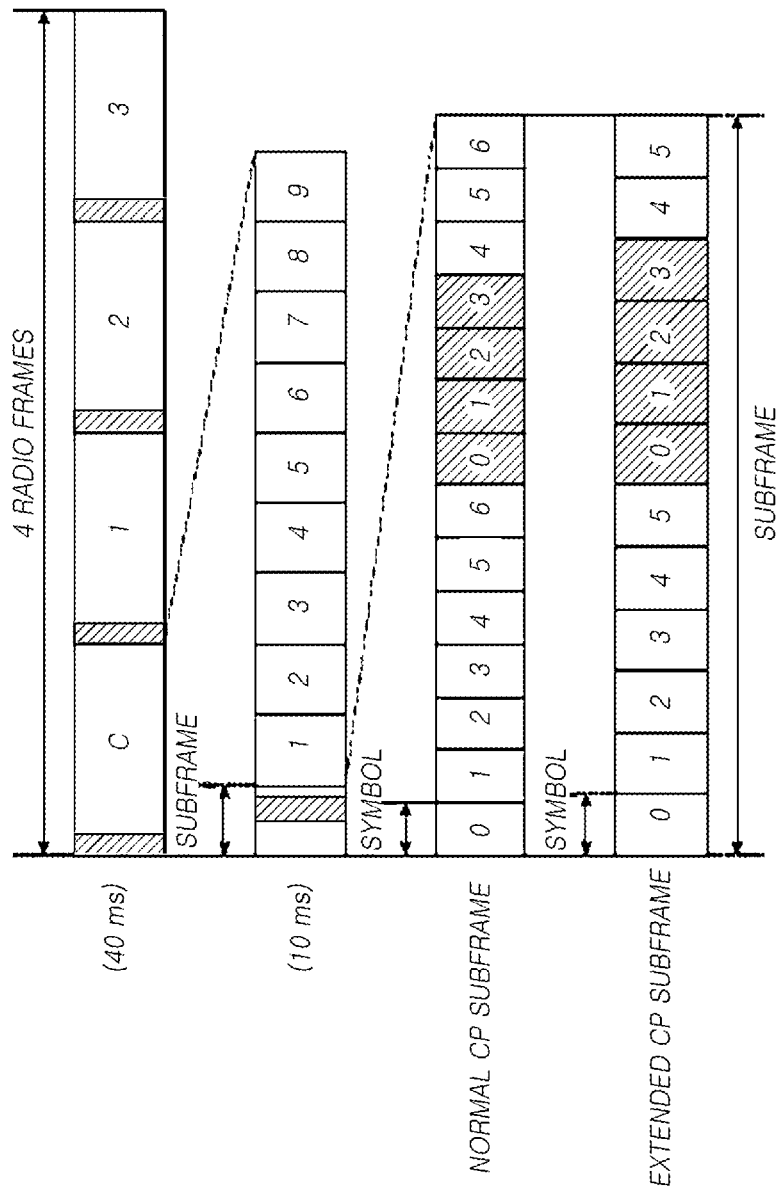
FIG. 18 illustrates locations of PBCHs on a symbol of an OFDM.

FIG. 18 illustrates locations of PBCHs on a symbol of an OFDM.

Referring to FIG. 18, the PBCHs are mapped to 4 sub-frames. The PBCHs are mapped to the first 4 symbols of the second slot of the sub-frame 0 of each radio frame.

Figure 19:
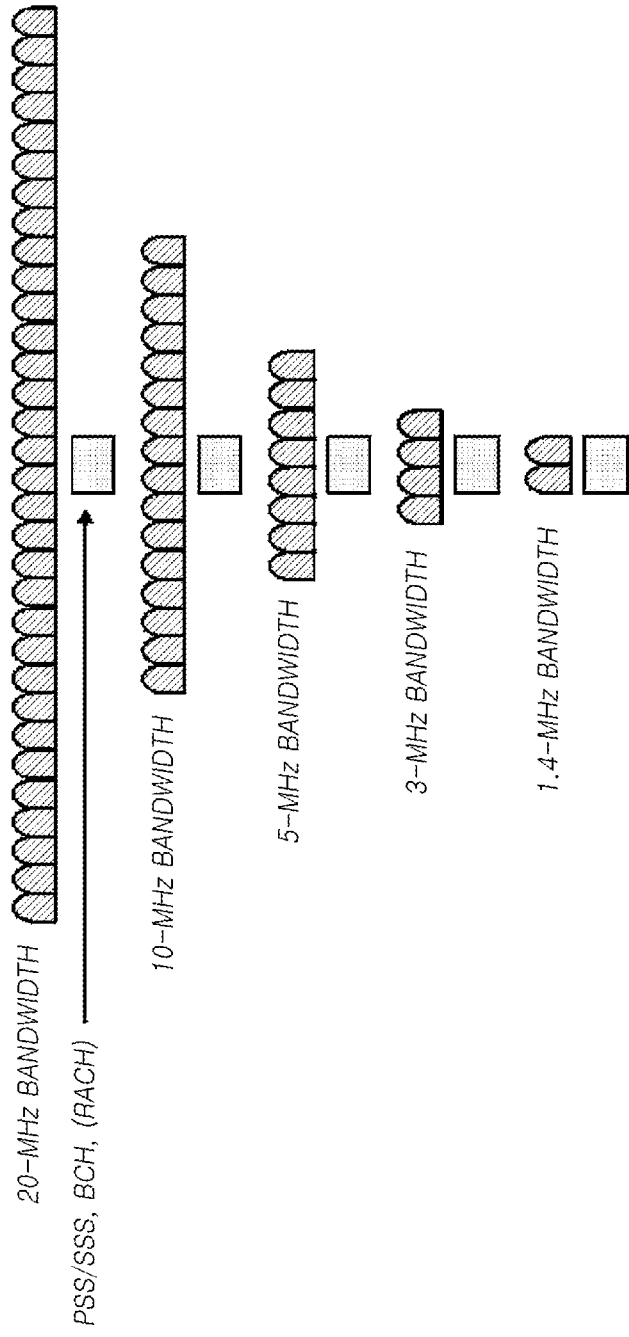
FIG. 19 illustrates locations of sub-carriers (resource elements) of a PSS/SSS and a PBCH when the entire bandwidths are 20 MHz, 10 MHz, 5 MHz, 3 MHz, and 1.4 MHz, respectively.

FIG. 19 illustrates locations of sub-carriers (resource elements) of a PSS/SSS and a PBCH when the entire bandwidths are 20 MHz, 10 MHz, 5 MHz, 3 MHz, and 1.4 MHz, respectively.

Referring to FIGS. 17 and 19, in a case of the FDD, the PSS is matched to 72 sub-carriers from among the entire bandwidth. Thus, the PSS occupies 72 central resource elements except for a DC sub-carrier in sub-frames 0 and 5. The SSS occupies 72 central resource elements except for a DC sub-carrier in the sub-frames 0 and 5.

In a case of the TDD, the PSS occupies 72 central resource elements except for a DC sub-carrier in sub-frames 1 and 6. Similar to the FDD, even in a case of the TDD, the SSS occupies 72 central resource elements except for a DC sub-carrier in the sub-frames 0 and 5.

Referring to FIGS. 18 and 19, the PBCHs are transmitted from the 4 foremost symbols of the second slot of the sub-frame 0 via the 72 central sub-carriers of the entire bandwidth.

At this time, the EPDCCH is not transmitted to PRB pairs including the PSS/SSS or the PBCH. In other words, in a case of the FDD, the PSS occupies 72 central resource elements except for a DC sub-carrier in sub-frames 0 and 5 and the SSS occupies 72 central resource elements except for a DC sub-carrier in the sub-frames 0 and 5, so that the EPDCCH is not transmitted to the PRB pairs including 72 central resource elements except for a DC sub-carrier in sub-frames 0 and 5.

Identically, in a case of the TDD, the PSS occupies 72 central resource elements except for a DC sub-carrier in sub-frames 1 and 6 and the SSS occupies 72 central resource elements except for a DC sub-carrier in the sub-frames 0 and 5, so that the EPDCCH is not transmitted to the PRB pairs including 72 central resource elements except for a DC sub-carrier in sub-frames including the PSS and the SSS.

Meanwhile, the PBCH is transmitted from the 4 foremost symbols of the second slot of the sub-frame via 72 central sub-carriers of the entire bandwidth, so that the EPDCCH is not transmitted from a sub-frame 0 to PRB pairs including 72 resource elements of the entire bandwidth.

Meanwhile, the transmission port does not transmit the EPDCCH from a special sub-frame corresponding to special sub-frame configurations 0 or 5 in a normal CP and special sub-frame configurations 0, 4, 7 in an extended CP, and the reception port does not expect to receive the EPDCCH from the special sub-frame.

The mapping of an eREG to a RE may be fixed according to a frame structure type, a sub-frame configuration, and a CP length, or may be identical regardless thereof.

Meanwhile, the special sub-frames having the same DM-RS locations can identically map the eREG to the RE. The mapping of the eREG to the RE does not depend on the number of PRB pairs, the number of sub-frames, the size of a control region, the length of DwPS, and existence of other signals such as a CRS, a CSI-RS, and a PRS.

At this time, indexes of the eREG may be mapped to each PRB pair on the basis of a frequency priority and then may be sequentially mapped to REs except for REs for a DM-RS in a time order.

The total number of EPDCCH USS blind coding per a component carrier may be 32 or 48 according to a configuration of the uplink MIMO, but is not limited thereto.

Each OFDM symbol can support a cyclic shift of indexes of an allocated eREG. Further, the OFDM symbols, which carry a DM-RS, can support additional rearrangements.

Figure 20:
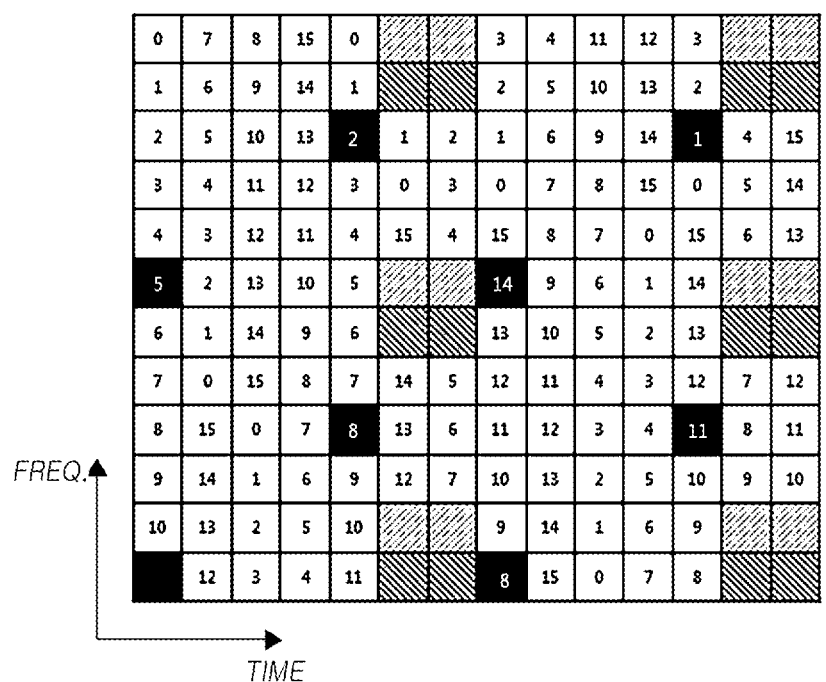
FIG. 20 illustrates symbol-based cyclic shifted eREG indexing for a PRB pair when CRS port 0 is configured.

FIG. 20 illustrates symbol-based cyclic shifted eREG indexing for a PRB pair when CRS port 0 is configured.

Even when another CRS port is configured, the symbol-based cyclic shifted eREG indexing for a PRB pair may be performed irrelevant to the location or the number of REs of the CRS and identically to FIG. 19.

Figure 21:
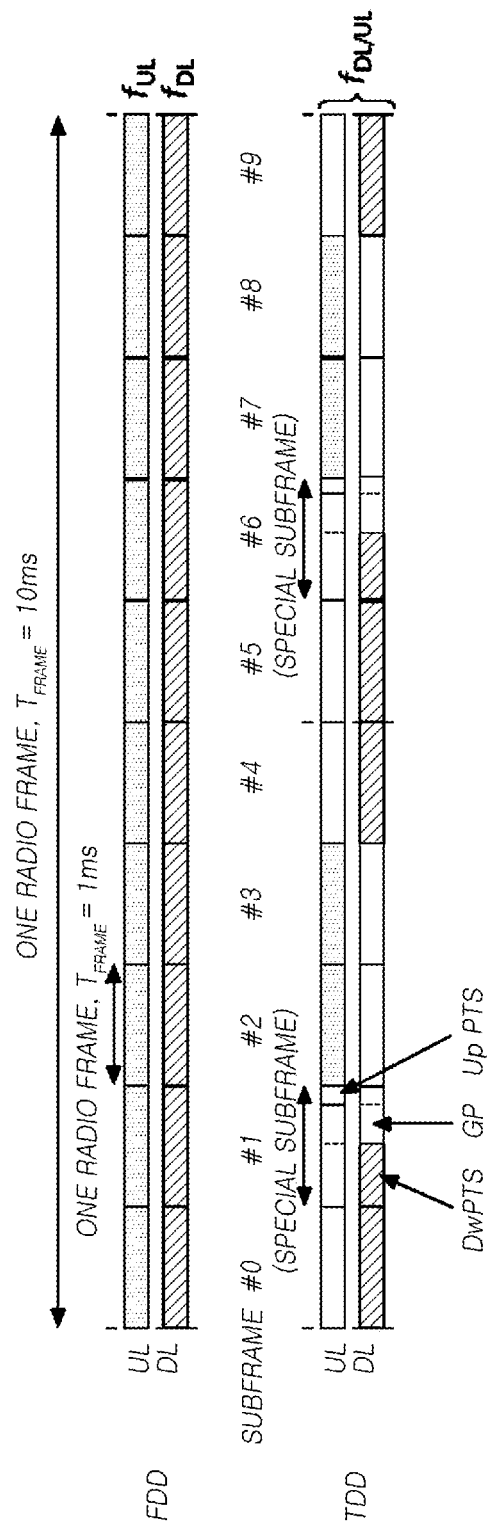
FIG. 21 illustrates structures of sub-frames of one radio frame in a case of an FDD and a TDD.
Figure 22:
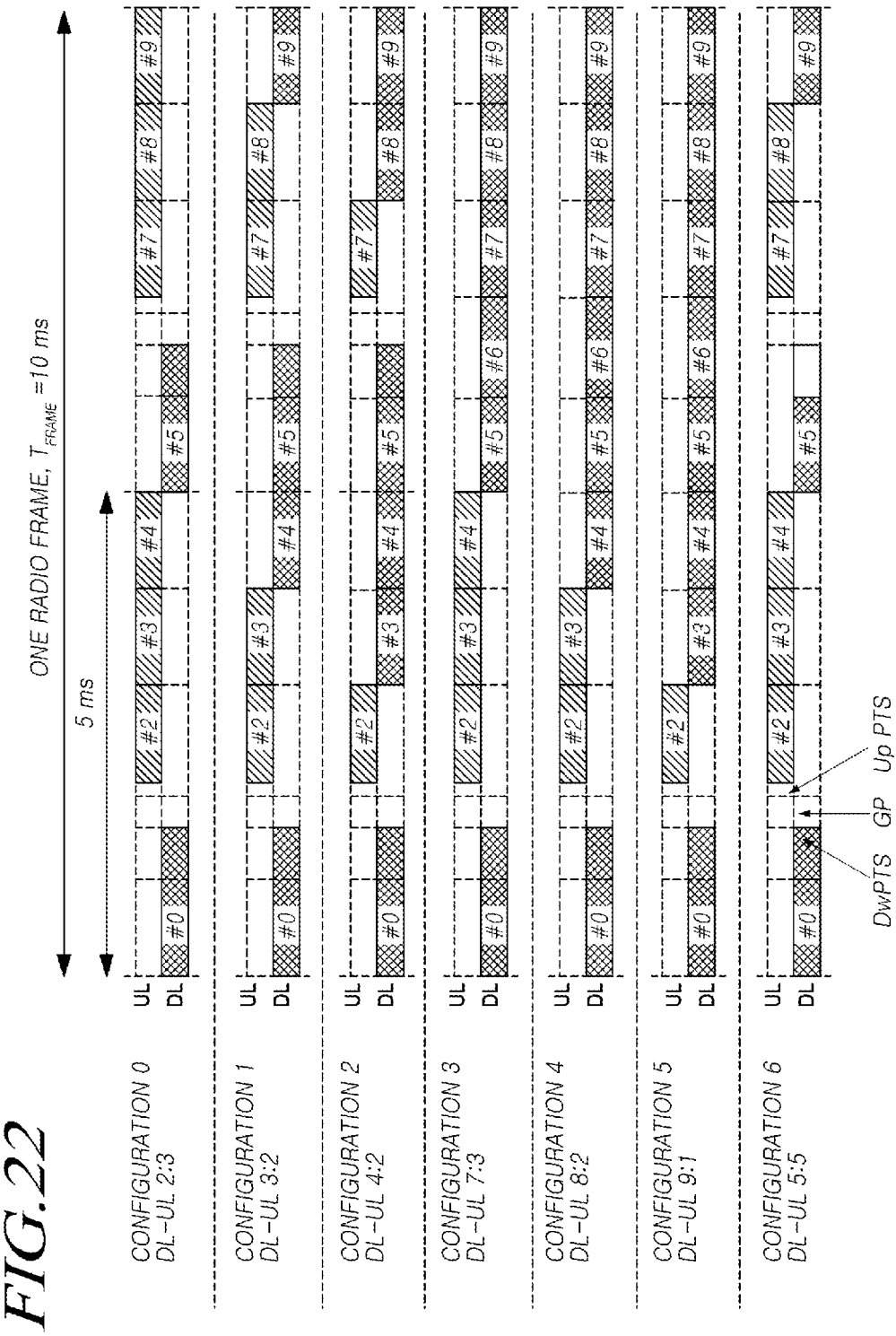
FIG. 22 illustrates structures of uplink sub-frames and downlink sub-frames according to TDD configurations in a case of a TDD.

FIG. 21 illustrates structures of sub-frames of one radio frame in a case of an FDD and a TDD. FIG. 22 illustrates structures of uplink sub-frames and downlink sub-frames according to TDD configurations in a case of a TDD.

Referring to FIGS. 21 and 22, in a case of the TDD, there are special sub-frames according to TDD configurations. For example, in a case of a TDD configuration 6, special sub-frames of sub-frames 1 and 6 are divided into a downlink part DwPTS, a Guard Period (GP), and an uplink part UpPTS. The locations of the special sub-frames of other TDD configurations are illustrated in FIG. 22 and are represented in Table 13.

TABLE 13

| Uplink-downlink configuration | Downlink-to-uplink Switch-point periodicity | Subframe number | | | | | | | | |
|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

Meanwhile, configurations of the special sub-frames may include totally 10 types as represented in Table 14, but are not limited thereto.

TABLE 14

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | 6592 · $T_s$ | 2192 · $T_s$ | 2560 · $T_s$ | 7680 · $T_s$ | 2192 · $T_s$ | 2560 · $T_s$ |
| 1 | 19760 · $T_s$ | | | 20480 · $T_s$ | | |
| 2 | 21952 · $T_s$ | | | 23040 · $T_s$ | | |
| 3 | 24144 · $T_s$ | | | 25600 · $T_s$ | | |
| 4 | 26336 · $T_s$ | | | 7680 · $T_s$ | | |
| 5 | 6592 · $T_s$ | 4384 · $T_s$ | 5420 · $T_s$ | 20480 · $T_s$ | 4384 · $T_s$ | 5120 · $T_s$ |
| 6 | 19760 · $T_s$ | | | 23040 · $T_s$ | | |
| 7 | 21952 · $T_s$ | | | 12800 · $T_s$ | | |
| 8 | 24144 · $T_s$ | | | — | — | — |
| 9 | 13168 · $T_s$ | | | — | — | — |

Meanwhile, the EPDCCH is not mapped to a GP or a UpPTS of a special sub-frame. In other words, as represented in Table 14, the EPDCCH may not be mapped to GPs or UpPTSs of sub-frames 1 and 6 of the TDD configurations 0 to 2 and 6 and a sub-frame 1 of TDD configurations 3 to 6.

Figure 23:
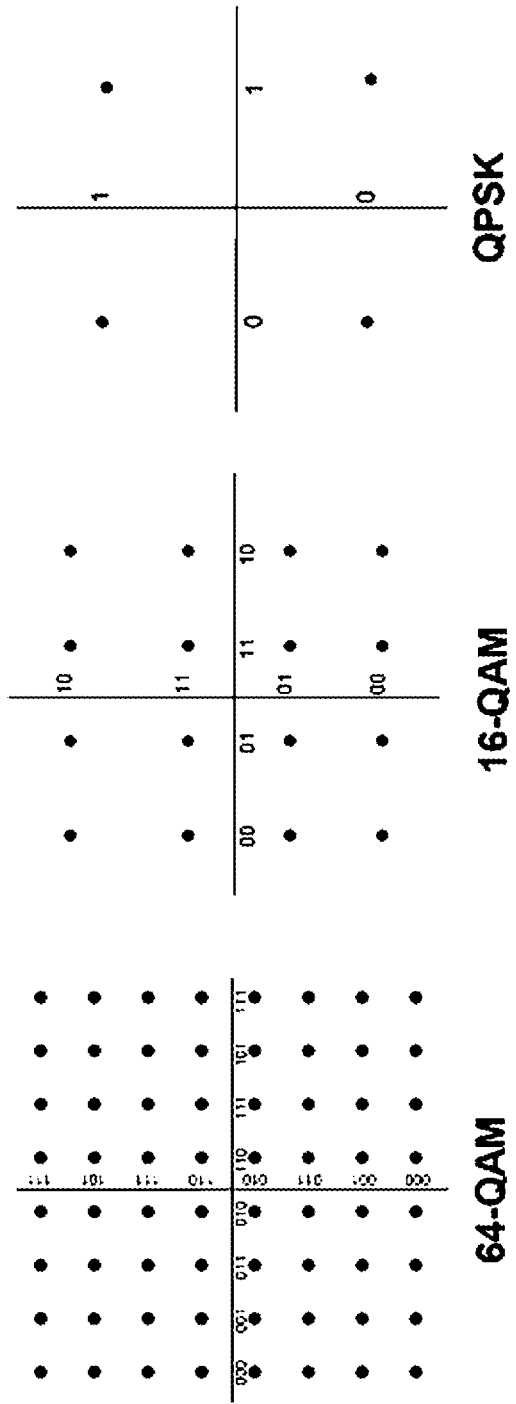
FIG. 23 illustrates modulations schemes during downlink transmission.

FIG. 23 illustrates modulation schemes during downlink transmission.

Referring to FIG. 23, with regard to modulation, QPSK, 16QAM, and 64QAM may be used with respect to the PDSCH, but only QPSK may be used with respect to the EPDCCH. An EPDCCH scrambling sequence may be UE-specified. At this time, an X or an RNTI may be used.

Meanwhile, an EPDCCH data scrambling sequence initialization point may be expressed by an equation "$c_{init} = \lfloor n_s/2 \rfloor 2^9 + n_{ID,i}^{EPDCCH}$". In the equation, Ns is a slot number, and the latter is an ID for an EPDCCH.

Figure 24:
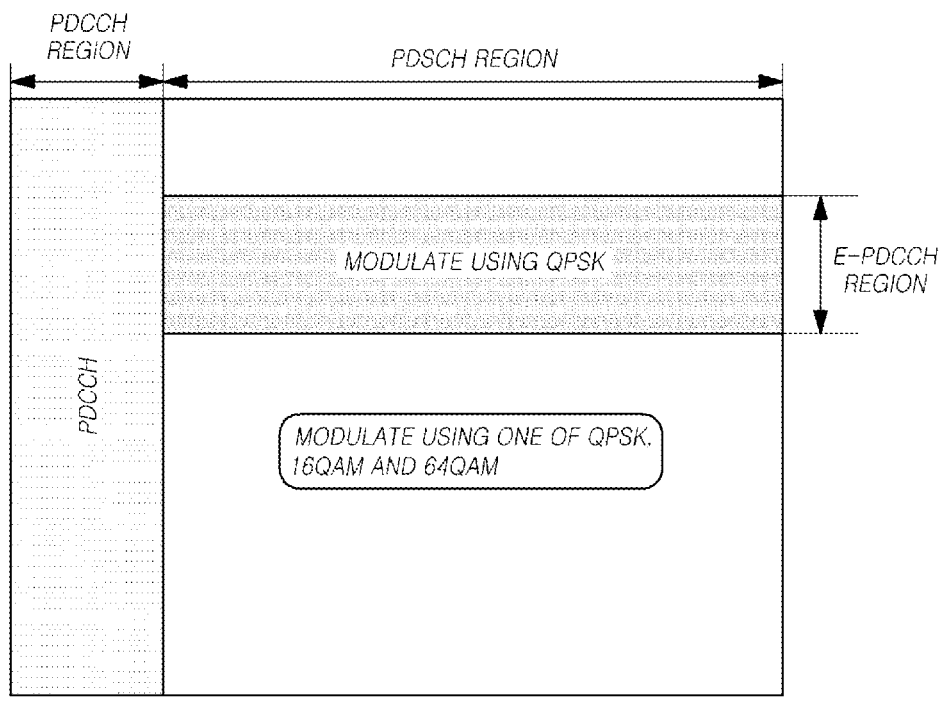
FIG. 24 illustrates a modulation method of a PDSCH and an EPDCCH of a data region (PDSCH region)

FIG. 24 illustrates a modulation method of a PDSCH and an EPDCCH of a data region (PDSCH region).

Referring to FIG. 24, in the data region (the PDSCH region), QPSK, 16QAM, and 64QAM are used with respect to the PDSCH, and only QPSK is used with respect to the EPDCCH, so that, with regard to the same sub-frame, modulation schemes of both cases may be identical to each other or may not be identical.

Meanwhile, with regard to a localized EPDCCH, the EPDCCH (e.g., a coded DCI message) is mapped to possible REs belonging to all EREGs relating to the EPDCCH. At this time, the EPDCCH is firstly mapped in all PRB pairs used for the EPDCCH in a frequency direction and is then mapped within a sub-frame in a time direction. Meanwhile, a zero padding bit for ambiguity resolution is not included in DC's carried on the EPDCCH.

The Number of eREGs of eCCE

An eCCE may be formed by M eREGs (M is a natural number larger than 0 and smaller than 16) in the localized transmission and the distributed transmission. In the localized transmission, M may be equal to 4 in a normal sub-frame or special sub-frame configurations 3, 4, and 8 of a normal CP. That is, in the localized transmission, 4 eCCEs can be included in each PRB pair.

In the localized transmission, M may be equal to 8 in special sub-frame configurations 1, 2, 6, 7 and 9 (normal CP), normal sub-frame (extended CP), and special sub-frame configs 1, 2, 3, 5, and 6 (extended CP). That is, in the localized transmission, two eCCEs may be included in each PRB pair.

Table 15 represents the numbers of sub-carriers and OFDM symbols of a normal CP and an extended CP.

TABLE 15

| Configuration | | $N_{sc}^{RB}$ | $N_{symb}^{DL}$ |
|---|---|---|---|
| Normal cyclic prefix | Δf = 15 kHz | 12 | 7 |
| Extended cyclic prefix | Δf = 15 kHz | | 6 |
| | Δf = 7.5 kHz | 24 | 3 |

The eREGs are grouped to an eREG group #0 {eREG#0, 4, 8, 12}, an eREG group #1 {eREG#1, 5, 9, 13}, an eREG group #2 {eREG#2, 6, 10, 14}, and an eREG group #3 {eREG#3, 7, 11, 15} in an EPDCCH set regardless of the distributed EPDCCH set or the localized EPDCCH set. When the eCCEs are configured by 4 eREGs, one eCCE is configured by one eREG group. When the eCCEs are configured by 8 eREGs, one eCCE is configured by two eREG groups. Two eREG groups may be an eREG group #0/2 and an eREG group #1/3. In the distributed type, the eREGs are located within a possible range in different PRB pairs. In other words, in the distributed type, when one eCCE is configured by an eREG group #0 {eREG#0, 4, 8, 12}, the eREGs #0, 4, 8, 12 may be located in different PRB pairs.

In other words, when the eCCEs are configured by 4 eREGs, the eREGs are grouped to an eREG group #0 {eREG#0, 4, 8, 12}, an eREG group #1 {eREG#1, 5, 9, 13}, an eREG group #2 {eREG#2, 6, 10, 14}, and an eREG group #3 {eREG#3, 7, 11, 15} in an EPDCCH set regardless of the distributed EPDCCH set or the localized EPDCCH set. When the eCCEs are configured by 8 eREGs, the eREGs are grouped to an eREG group #0 {eREG#0, 2, 4, 6, 8, 10, 12, 14} and an eREG group #1 {eREG#1, 3, 5, 7, 9, 11, 13, 15} in an EPDCCH set regardless of the distributed EPDCCH set or the localized EPDCCH set.

ECCE Index

With regard to the localized EPDCCH, ECCE indexes are firstly numbered within a PRB pair. Meanwhile, with regard to the distributed EPDCCH, when the EPDCCH set has 8 PRB pairs and the ECCE is formed by 4 REGs, candidates having an AL larger than 1 span 8 PRB pairs.

With regard to the distributed EPDCCH, the ECCE indexes are firstly numbered within an EREG group. The numbering is performed in consideration of the PUCCH resource allocation.

Aggregation Levels

Aggregation levels, which support the EPDCCH, are 1, 2, 4 in a case of the localized transmission and are 1, 2, 4, and 8 in a case of the distributed transmission.

Meanwhile, when REs, which correspond to a normal sub-frame of a normal CP or special sub-frame configurations 3, 4, (normal CP) and can be used in a PRB pair, are equal to or smaller than $X_{thresh}$ ($X_{thresh}$=104), the aggregation levels, which support the EPDCCH, may be 2, 4, 8 in a case of the localized transmission and may be 2, 4, 8, 16 in a case of the distributed transmission, but are not limited thereto, and may be 32 and 64, which are larger than 16. "$X_{thresh}$=104" is included to maintain the worst coding rate, which is approximately 0.8.

An ALL candidate can be configured by L consecutive ECCEs.

When the EPDCCH set includes 8 PRB pairs and the ECCE is configured by 4 REGs, the ECCE can be mapped to adjacent PRB pairs available on a frequency (e.g., PRB pairs #{0, 1, 2, 3} or #{4, 5, 6, 7} when being indexed in an ascending order of a frequency domain within the EPDCCH) or can be mapped to PRB pairs, which maximizes a frequency diversity (e.g., PRB pairs #{0, 2, 4, 6} or #{1, 3, 5, 7} when being indexed in an ascending order of a frequency domain within the EPDCCH).

A localized AL 16 is supported when the REs, which can be used in the normal sub-frames (normal CP), the special sub-frame configurations 3, 4, 8 (normal CP) and one PRB pair, are smaller than $X_{thresh}$.

A localized AL 8 is supported in all cases and the ECCEs are formed in 4 RGEGs. A localized AL 8 is supported in all cases and the ECCEs are formed in 8 RGEGs.

A distributed AL 32 is supported when the REs, which can be used in the normal sub-frames (normal CP), the special sub-frame configurations 3, 4, 8 (normal CP) and one PRB pair, are smaller than $X_{thresh}$. A distributed AL 16 is supported in all cases and the ECCEs are formed by 4 RGEGs. The distributed AL 16 is supported in all cases and the ECCEs are formed by 8 RGEGs.

$X_{thresh}$ may be 104 REs and may be a code rate thresh with respect to "AL=1".

The total number of blind decoding can be split to two sets in accurate or approximate proportion to the number N of PRB pairs. Otherwise, the total number of bind decoding can be split to two sets to be equal to the number N of PRB pairs or to be proportional to another size of the PRBs. Otherwise, a small AL is mapped to a small EPDCCH set and a large AL is mapped to a large EPDCCH. When two EPDCCH sets are configured, the large AL is located only in one EPDCCH set or is located mainly in one EPDCCH set.

Meanwhile, when one among the two EPDCCH sets is a distributed type and the other one is a localized type, the distributed type has a priority, the localized type has a priority, or the distributed type has a priority with respect to a large AL and the localized type has a priority with respect to a small AL.

Meanwhile, 2 bits may indicate the number N with respect to N PRB sets constituting a set (N={2, 4, 8}). Meanwhile, in the EPDCCH set, signaling of the PRB pair corresponds to a bitmap scheme and a combination index r $$\left( r = \sum_{i=0}^{N-1} \left( \begin{array}{c} N_{RB}^{DL} - k_i \\ N - i \end{array} \right) \right)$$

which corresponds to a PRB index ($\{k_i\}_{i=0}^{N-1} 1 \leq k_i \leq N_{RB}^{DL}$, $k_i < k_{i+1}$). The latter scheme is a scheme which is identical to the CQI sub-band allocation scheme or a resource allocation scheme of two discontinuous sub-carriers in an uplink grant.

In the above equation, $N_{RB}^{DL}$ denotes the number of PRB pairs relating to a downlink bandwidth, and $$"\left( \begin{array}{c} x \\ y \end{array} \right) = \begin{cases} \left( \begin{array}{c} x \\ y \end{array} \right) & x \geq y \\ 0 & x < y \end{cases}"$$

is an extended binomial coefficient and causes a unique level $$r \in \left\{ 0, \dots, \left( \begin{array}{c} N_{RB}^{DL} \\ N \end{array} \right) - 1 \right\}".$$

In the EPDCCH set, in a case of the bitmap scheme, the signaling of the PRB pair can express the number $N_{RB}^{DL}$ of the PRB pairs relating to a downlink bandwidth as a bitmap. However, since an amount of information increases, the scheme may be partially modified.

For example, in the EPDCCH set, the signaling of the PRB pair can divide the $N_{RB}^{DL}$ PRB pairs relating to the downlink bandwidth into some groups, and PRB pairs, which are numbered in an ascending order of a frequency, can be expressed as a bitmap.

For example, when the $N_{RB}^{DL}$ PRB pairs relating to the downlink bandwidth are divided into an even group and an odd group, in the even group, PRB indexes can be sequentially designated using a bitmap. For example, when $N_{RB}^{DL}$=20, N=4, and PRB pairs are 4, 8, 14, 16, the group of even PRB pairs may be "0010100110". In this case, whether the PRB pairs are even groups or odd groups can be indicated by 1 bit (in a case of 0, a PRB pair is even or in a case of 1, a PRB pair is odd) or 2 bits (in a case of 01, a PRB pair is even or in a case of 01, a PRB pair is odd), and the PRB indexes can be sequentially indicated using a 10-bit bitmap per the corresponding group. Even in a case of the odd group, the same scheme can be used to perform the indication.

Meanwhile, the group of the $N_{RB}^{DL}$ PRB pairs relating to the downlink bandwidth may be PRB pairs having the same remainder by modulo-A-calculating indexes of the PRB pairs (A is one of natural numbers from 2 to 10). For example, PRB pairs having the same remainder are designated as one group by performing modulo-4-calculation, and the index of the PRB pair of the corresponding group can be indicated using a bitmap. In this case, the group can be indicated by 2 bits (00=PRB pairs having remainder 0 of modulo 4 calculation, 01=PRB pairs having remainder 1 of modulo 4 calculation, 10=PRB pairs having remainder 2 of modulo 4 calculation, 11=PRB pairs having remainder 3 of modulo 4 calculation) or by 4 bits (bitmap scheme).

In summary, an embodiment of the present invention is a resource indication method which configures an EPDCCH set of control information allocated to a data region, the resource indication method comprising: indicating a value of N (N={2, 4, 8}) of N PRB pairs constituting an EPDCCH set with respect to a specific UE; modulo-A-calculating indexes of $N_{RB}^{DL}$ PRB pairs relating to a downlink bandwidth allocated to the specific UE (A is one of natural numbers from 2 to 10), dividing PRB pairs having the same remainder into groups, and indicating one of the groups; and indicating PRB indexes ($\{k_i\}_{i=0}^{N-1} 1 \le k_i \le N_{RB}^{DL}, k_i < k_{i+1}$) of the N PRB pairs constituting an EPDCCH set in the indicated group in an ascending order or a descending order of a frequency as a bitmap.

Meanwhile, adjacent PRB pairs among the indexes of the $N_{RB}^{DL}$ PRB pairs relating to the downlink bandwidth allocated to a specific UE can be divided into A groups. For example, when there are 20 PRB pairs and A is equal to 4, PRB pairs 0 to 4, PRB pairs 5 to 9, PRB pairs 10 to 14, and PRB pairs 15 to 19 can be designated as one group, respectively. In addition, the indexes of the PRB pairs constituting an EPDCCH set in one group can be indicated/designated/configured in a bitmap scheme.

3. Blind Decoding of EPDCCH and EPDCCH Search Space

As described above, the total number of EPDCCH USS blind decoding per each component carrier may be 32 or 48 according to a configuration of an uplink MIMO.

Figure 25:
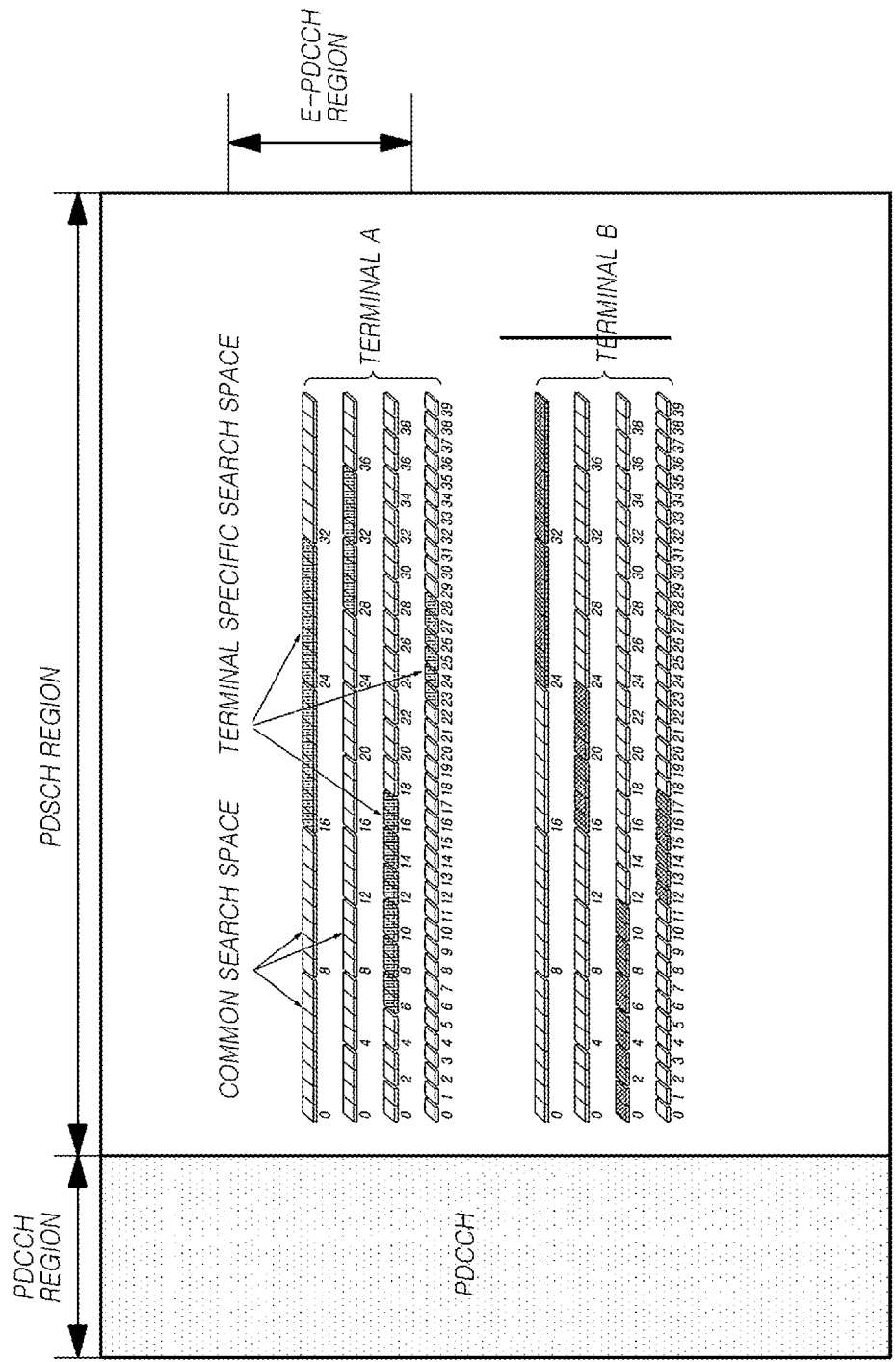
FIG. 25 is a concept view of a search space for an EPDCCH USS and a CSS, which is mapped to a data region (PDSCH region)

FIG. 25 is a concept view of a search space for an EPDCCH USS and a CSS, which is mapped to a data region (PDCCH region).

Referring to FIG. 25, with regard to a sub-frame in which a UE monitors an EPDCCH USS in a given carrier, the UE may not monitor a PDCCH USS of the same carrier.

The UE can be implemented by monitoring localized or distributed EPDCCH candidates in the given sub-frame. Meanwhile, the UE can all the localized and distributed EPDCCH candidates in the given sub-frame. When all the localized and distributed EPDCCH candidates are monitored in the given sub-frame, the total number of USS blind decoding for a carrier may not increase.

Meanwhile, the UE may not monitor an EPDCCH USS with respect to at least special sub-frame configurations 0 and 5 of the normal CP and special sub-frame configurations 0 and 4 of the extended CP. However, the present invention is not limited thereto, and the UE can indicate a sub-frame configuration, which does not monitor an EPDCCH USS, by higher layer signaling.

Meanwhile, the UE monitors a CSS in a PDCCH. Meanwhile, when an EPDCCH CSS is configured, the UE can monitor only the EPDCCH CSS, can monitor both the PDCCH CSS and the EPDCCH CSS, can monitor one of them, or can monitor at least one of them according to an instruction of a serving cell.

Meanwhile, the UE can monitor the PDCCH UCC and the CSS with respect to a sub-frame, which is configured not to monitor the EPDCCH, equally to the existing scheme.

The higher layer signaling can be used to indicate sub-frames which monitor the EPDCCH or do not monitor the EPDCCH.

The higher layer signaling can be configured by a new bitmap having the same period as a period used in an eICIC. When the new bitmap is not provided, if the EPDCCH is configured, the UE configures, as a default, that the USS for the EPDCCH is monitored in all sub-frames. When the UE knows that a sub-frame includes a PMCH but higher layer signaling is received which indicates that the sub-frame is to be monitored for the EPDCCH, the UE monitors a USS not for the EPDCCH but for the PDCCH with respect to the sub-frame.

32 blind-decoding attempts have 16 or more blind-decoding candidates for DCI formats 0/1A as in DCI formats 2/2a/2b/2c/2d and have 16 or more blind-decoding candidates for a TM-dependent DCI as in DCI formats 2/2a/2b/2c/2d with regard to that the dispersion is identically or uniformly performed between the TM-dependent DCI and the DCI formats 0/1A. When a format 4 is configured, 16 or more additional blind-decoding candidates are provided. In contrast, the number of the blind-decoding candidates may be independent of a DCI format.

Meanwhile, when the sizes of the EPDCCH sets are different from each other, the first EPDCCH set may be an EPDCCH having the size larger than that of the second EPDCCH set or may not be. At this time, when two EPDCCH sets are configured, the first EPDCCH set is always a distributed EPDCCH set and the other EPDCCH set may be a distributed type or a localized type. In contrast, the first EPDCCH set may always be a localized EPDCCH set and the other EPDCCH set may be a distributed type or a localized type.

With regard to each serving cell, the higher layer signaling can configure one or two EPDCCH sets to one UE. The PRB pairs corresponding to the EPDCCH sets may be indicated by higher layers. Each EPDCCH set is numbered from 0 to $N_{ECCH,p,k} - 1$. At this time, $N_{ECCH,p,k}$ is the number of ECCEs in an EPDCCH set P of a sub-frame k. Each EPDCCH set can be configured with respect to localized EPDCCH transmission or distributed EPDCCH transmission.

The UE monitors a set of EPDCCH candidates on one or more activated serving cells configured by higher layer signaling with respect to control information. Here, the monitoring implies a process/attempt of decoding each of EPDCCHs within a set according to the monitored DCI formats. The set of the monitored EPDCCH candidates is defined by a EPDCCH USS.

In AL (L∈{1, 2, 4, 8, 16, 32}), the EPDCCH USS $ES_k^{(L)}$ is defined by the set of the EPDCCH candidates.

A search space function for a localized EPDCCH may be equal to the following equation.

$$L\{(Y_{p,k}+m')\bmod \lfloor N_{ECCE,p,k}/L \rfloor\}+i$$

With regard to an EPDCCH set P configured for distributed transmission,

ECCEs corresponding to an EPDCCH candidate of a search space are given by the above equation. ECCEs corresponding to an EPDCCH candidate of a search space with respect to an EPDCCH set P configured for localized transmission are given the above equation.

When i=0, . . . , L−1 and the UE is configured to have a carrier indicator for a serving cell which is to monitor an EPDCCH, m'=m+$M_p^{(L)}$·$n_{CI}$, else m'=m. Here, $N_{CI}$ denotes a CIF value, m=0, 1, . . . , Mp−1, and Mp(L) denotes the number of EPDCCH candidates monitored in the EPDCCH set P by AL. The CIF value is identical to ServCellIndex.

$$Y_{p,k}=(A \cdot Y_{p,k-1}) \bmod D$$

The variable $Y_{p,k}$ is defined by the above equation. Yp,−1 is $n_{RNTI}$, A=39827, D=65537, k=[$n_s$/2], and $n_s$ is a slot number within a wireless frame. A value of RNTI used in $n_{RNTI}$ is defined for downlink and uplink. DCI formats monitored by the UE relay on a Transmission Mode (TM) configured for each serving cell.

Candidates of AL given in this equation try to be spaced (located or mapped) in as possible many PRB pairs, and the total number of CCEs is substituted for $N_{ECCE}^{set}$.

Meanwhile, the search space function for the distributed EPDCCH may be identical to the above equation except that Yk is different for each EPDCCH set.

4. Indication to UE of ePDCCH PRB Pair

When a predetermined ePDCCH is transmitted through downlink scheduling for a specific UE through PRB #1 and PDSCH PRB allocation information included in the corresponding downlink scheduling includes the PRB #1 (e.g., when PRB #0 to PRB #3 are allocated), the UE performs ePDCCH transmission at PRB #1 and the PDSCH transmission can be performed only though remaining PRBs (PRB #0, #2, #3).

This implies that, even when the corresponding PDSCH transmission is performed in a form of spatial multiplexing (i.e., layer 2 transmission), the PDSCH transmission is not performed through all layers in the PRB (PRB #1), through which the ePDCCH is transmitted. In other words, the spatial multiplexing of the ePDCCH and the PDSCH may not be allowed.

The PDSCH cannot be scheduled to a UE given on a cell given from one or more cells within the given sub-frame. When cross-carrier scheduling is configured with respect to a UE given on a given SCell, the ePDCCH cannot be used on the cross-carrier-scheduled SCell in order to schedule the PDSCH to the same UE on the same SCell in the same sub-frame.

When the UE is not configured by TM 10, per-cell higher layer signaling can be transmitted in order to indicate some ePDCCHs on the cell and an OFDM starting symbol for a PDSCH on the cell scheduled by the ePDCCH.

When the signaling is not provided, the OFDM starting symbol of the ePDCCH and the PDSCH scheduled by the ePDCCH can be induced by the PCFICH. A unique value of the OFDM starting symbol can be transmitted to two ePDCCH sets when the two ePDCCH sets are configured. The firstly-configured OFDM starting symbol can be continuously and identically applied to the SPS PDSCH in the sub-frame in which the GE monitors the ePDCCH. Meanwhile, there may be some sub-frames to which the higher layer signaling is not applied, e.g., sub-frames for RACH/paging.

5. PUCCH Resource Allocation

Figure 26:
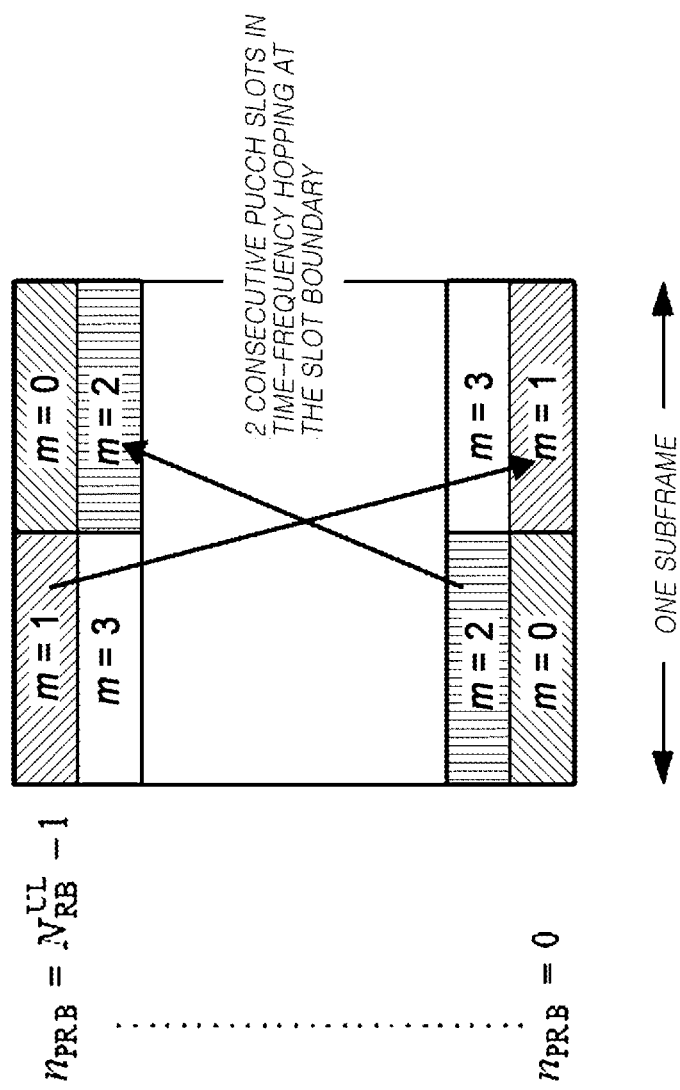
FIG. 26 illustrates mapping of a PRB for a PUCCH.

FIG. 26 illustrates mapping of a PRB for a PUCCH.

Referring to FIG. 26, a PUCCH resource is located at the outmost edge of the entire available bandwidth. Each PUCCH resource is configured by 12 sub-carriers (one RB) within two slots of one uplink sub-frame. That is, one PUCCH resource, which is configured by 12 sub-carriers, is located at the uppermost edge of a spectrum in the first slot of one sub-frame, and a resource having the same size is located at the lowermost edge of a spectrum in the second slot of the sub-frame.

Meanwhile, the resource allocation $n_{PUCCH}^{(e)}$ of PUCCH formats 1a/1b for ePDCCH-based HARQ-ACKs can be implicitly induced by Equation (17) as follows.

[Equation 17]

$$N_{PUCCH}^{(e)} = n_{eCCE} + N_{PUCCH}^{(1)} + M_{PUCCH\text{-}EPDCCH} \qquad (17)$$

$n_{eCCE}$ is the lowest eCCE index of the corresponding ePDCCH, $n_{PUCCH}^{(1)}$ is a semi-static PUCCH parameter, and $M_{PUCCH\ EPUCCH}$ is a semi-static PUCCH resource starting offset for each ePDCCH set.

As can be seen by Equation (17), the lowest eCCE index of the corresponding ePDCCH may be an element for PUCCH resource determination.

The PUCCH resource determination can be implemented by a semi-static PUCCH resource starting offset with respect to each ePDCCH set. At this time, the eCCE may be indexed for each ePDCCH set.

Meanwhile, a PUCCH resource offset, which is dynamically signaled to the ePDCCH, may be used or may not be used.

Meanwhile, with regard to the distributed ePDCCH, an antenna port index may be used, an antenna port index of the ePDCCH may be used, or an antenna port index of the PDSCH may be used.

When the PUCCH resource offset, which is dynamically signaled to the ePDCCH, is used, the resource allocation $n_{PUCCH}^{(e)}$ of PUCCH formats 1a/1b for ePDCCH-based HARQ-ACKs can be PUCCH induced by Equation (18) as follows.

[Equation 18]

$$n_{PUCCH}^{(e)} = n_{eCCE} + N_{PUCCH}^{(1)} + M_{PUCCH\text{-}EPDCCH} + m_{EPDCCH\text{-}dynamic\_offset} \qquad (18)$$

In Equation (18), $m_{EPDCCH\ dynamic\_offset}$ is a PUCCH resource offset, which is dynamically signaled to the ePDCCH for implicit mapping between the eCCE and the PUCCH. This value can be provided to the UE by bits of a specific field with respect to a DCI or a dynamic modifier, e.g., an ARI.

As another embodiment, the PUCCH resource $N_{PUCCH}^{(1)}$ can be expressed by the following equation.

$$n_{PUCCH}^{(1)} = \Delta_{ARO} + f(n_{eCCE}, p) + N_{PUCCH,j}^{(1)}$$

At this time, $\Delta_{ARO}$ is {−2, −1, 0, 2} and $N_{PUCCH}^{(1)}$ is a PUCCH resource offset relating to an EPDCCH set having an index j. When the minimum AL of EPDCCHs in the EPDCCH set is 1 ECCE, $f(n_{eCCE},p)$ can be determined with respect to localized and distributed EPDCCHs as follows.

$$f(n_{eCCE}, p) = \begin{cases} \text{Localized:} & \lfloor n_{eCCE,j}/N \rfloor \cdot N + k_p \\ \text{Distributed:} & n_{eCCE,j} \end{cases}$$

At this time, $n_{eCCE,j}$ is the first ECCE index of EPDCCH transmission in the EPDCCH set having the index j, N is the number of ECCEs per each PRB, and $k_p$ is determined on the basis of a DM-RS port used for demodulating the EPDCCH. When N=4, $k_p$={0, 1, 2, 3}, and when N=2, k={0, 1}.

At this time, explicit 2-bit ACK/NACK resource offset (ARO) indication may always exist on all downlink DCI formats carried by the EPDCCH. The resource allocation scheme for the EPDCCH transmitted to the SCell uses an ARI, which is identical to Rel-10. Thus, all the ARC fields, which indicate an ARO, are configured to be "0" or the fields may not exist. Meanwhile, the ARC field is not included in DCI formats 0 or 4 of the uplink grant.

When the UE is configured to monitor the EPDCCH in all sub-frames within the same bundling window, $$\sum_{i=0}^{m-1} N_{eCCE,i,j}$$

may be additionally included in items which exist in a resource determination scheme for the FDD. At this time, m(0 . . . M−1) is a relative index of a downlink sub-frame of the PDSCH scheduled by the EPDCCH. In the TDD, the ARO field having 2 bits exists. At this time, a value of the ARC field may be identical to that of the FDD, and may be one of {0, 2, −NeCCE, m, j, NeCCE, m, j}, {0, 2, N(1) PUCCH, 0, N(1)PUCCH, j, N(1)PUCCH, 1−N(1)PUCCH, j}, {0, −NeCCE, 0, j−(NeCCE, 0, j+NeCCE, 1, j), −(NeCCE, 0, j+NeCCE, 1, j+NeCCE, 2, j)}.

6. ePDCCH DCI Formats

As represented in Table 16, DCI formats 0 and 5 relate to an uplink grant, DCI formats 3 and 3A relate to uplink power control, and the other DCI formats relate to downlink scheduling.

TABLE 16

DCI Formats

| Size | Usage | | |
|---|---|---|---|
| | Uplink Grant | Downlink Assignment | Power Control |
| Small | — | 1C Special purpose compact assignment | — |
| | 0 Single layer | 1A Contiguous allocations only | 3. 3 A |
| . . . | — | 1B Codebook-based beam-forming using CRS | — |
| | — | 1D Multi-user MIMO using CRS | — |
| | 4 Spatial multiplexing | — | — |
| | — | 1 Flexible allocations | — |
| | — | 2A Open-loop spatial multiplexing using CRS | — |
| | — | 2B Dual-layer transmission using DM-RS | — |
| | — | 2C Multi-layer transmission using DM-RS | — |
| Large | — | 2 Closed-loop spatial multiplexing using CRS | — |

DCI formats 0, 1A, 4, 2C can be supported with respect to the ePDCCH. Meanwhile, all USS DCI formats can be provided to the ePDCCH, and in this case, all downlink transmission modes can be supported by the ePDCCH. Meanwhile, a specific DCI format cannot be supported with respect to the ePDCCH.

With regard to the DM-RS for the ePDCCH, nSCID=2 is configured. Meanwhile, a DM-RS scrambling sequence initialization parameter X can be configured by UE-specific higher layer signaling. One value can be used for each ePDCCH. A default value of the parameter X for the second ePDCCH set may be identical to that of the first ePDCCH set.

Figure 27:
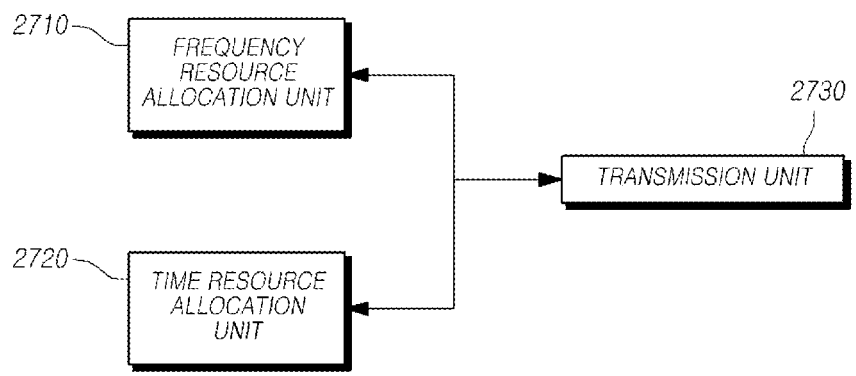
FIG. 27 is a block diagram illustrating a configuration of a base station according to yet another embodiment.

FIG. 27 is a block diagram illustrating a configuration of a base station according to yet another embodiment.

Referring to FIG. 27, a base station 2700 includes a frequency resource allocation unit 2710, a time resource allocation unit 2720, and a transmission unit 2730. The frequency resource allocation unit 2710 and the time resource allocation unit 2720 may be configured by one resource allocation unit which allocates a frequency-time resource.

The frequency resource allocation unit 2710 allocates a frequency resource for a control channel located in a data region, using the scheme which is described with reference to FIGS. 14 to 26.

The time resource allocation unit 2720 allocates a time resource of a resource for a control channel located in a data region, using the scheme which is described with reference to FIGS. 14 to 26.

The transmission unit 2730 performs transmission through the existing channel (e.g., the PDCCH and the PDSCH) for control and data and performs transmission of control information through a control channel configured by the frequency resource allocation unit 2710 and the time resource allocation unit 2720. Further, the transmission unit can transmit control channel configuration information, which is configured by the frequency resource allocation unit 2710 and the time resource allocation unit 2720, to the UE.

The frequency resource allocation unit 2710 and the time resource allocation unit 2720, which are a frequency-time resource allocation unit, can sequentially map an index of an EREG to resource elements except for resource elements for a DM-RS in a time order on the basis of a frequency priority in each physical resource block pair for each sub-frame, can form one ECCE using 4 or 8 EREGs from one physical resource block pair or two or more physical resource block pairs, and can allocate a downlink control channel located in a data region, which is configured by at least one ECCE.

The transmission unit 2730 can transmit a downlink control channel located in the data region, to the base station.

Meanwhile, the transmission unit 2730 can indicate a value of N of N PRB pairs constituting a EPDCCH set for a specific UE (N={2, 4, 8}, and can transmit, to a specific UE, a combination index r of the following equation corresponding to PRB indexes $\{k_i\}_{i=0}^{N-1}$ $1 \leq k_i \leq N_{RB}^{DL}$, $k_i < k_{i+1}$ of the N PRB pairs constituting the EPDCCH set.

$$r = \sum_{i=0}^{N-1} \binom{N_{RB}^{DL} - k_i}{N - i}$$

In the above equation, $N_{RB}^{DL}$ denotes the number of PRB pairs relating to a downlink bandwidth, and $$"\binom{x}{y} = \begin{cases} \binom{x}{y} & x \geq y \\ 0 & x < y \end{cases}"$$

is an extended binomial coefficient and causes a unique level $$"r \in \left\{0, \ldots, \binom{N_{RB}^{DL}}{N} - 1\right\}".$$

Figure 28:
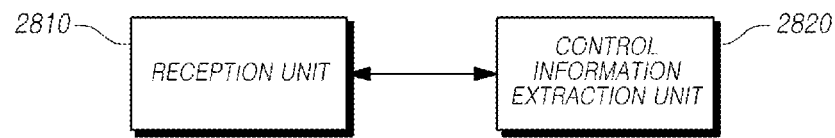
FIG. 28 is a block diagram illustrating a configuration of a base station according to yet another embodiment.

FIG. 28 is a block diagram illustrating a configuration of a base station according to yet another embodiment.

Referring to FIG. 28, a UE 2800 includes a reception unit 2810 and a control information extraction unit 2820.

The reception unit 2810 receives a downlink signal including a control channel.

The control information extraction unit 2820 extracts a control channel, which is located in a data region, from the downlink signal.

The reception unit 2810 can sequentially map an index of an EREG to resource elements except for resource elements for a DM-RS in a time order on the basis of a frequency priority in each physical resource block pair for each sub-frame, can form one ECCE using 4 or 8 EREGs from one physical resource block pair or two or more physical resource block pairs, and can receive a downlink control channel located in a data region, which is configured by at least one ECCE.

The control information extraction unit 2820 can acquire control information from a downlink control channel located in the data region.

Figure 29:
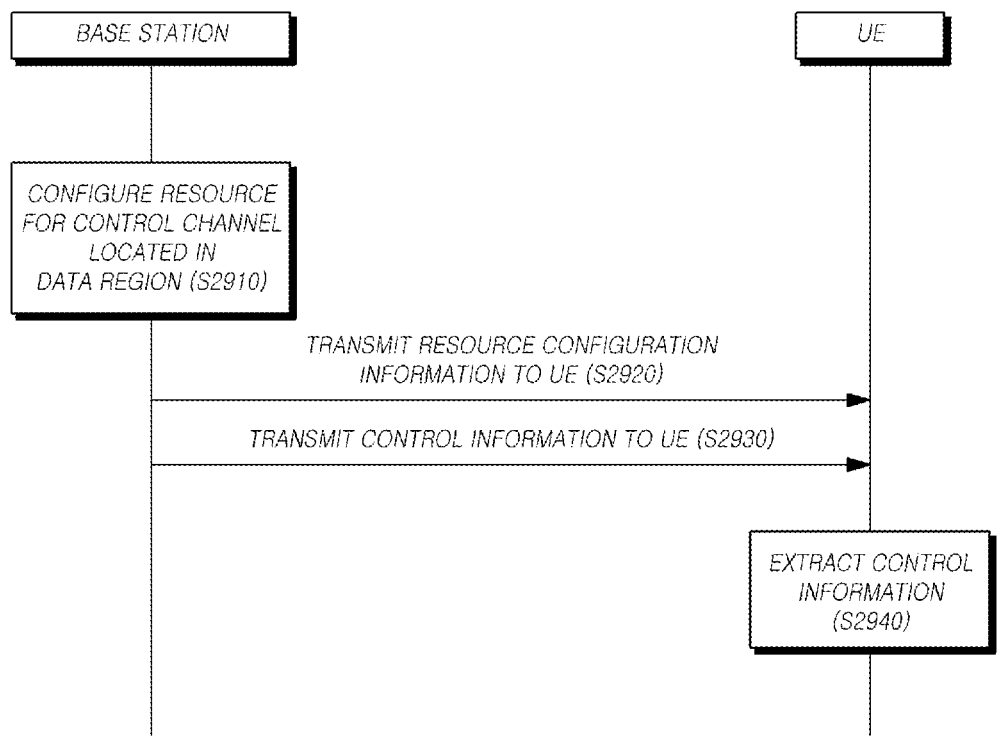
FIG. 29 is a flowchart illustrating a control channel transmission/reception method according to yet another embodiment.

FIG. 29 is a flowchart illustrating a control channel transmission/reception method according to yet another embodiment.

Referring to FIG. 29, the frequency resource allocation unit 2710 and the time resource allocation unit 2720 of the base station 2700 configures a resource for a control channel, which is located in a data region, in consideration of a system bandwidth and the average number of UEs which are providing an inter-cell communication service (S2910). The resource configuration for a control channel may include a configuration for a resource block in which a control channel is located in the data region and a configuration for a time resource (OFDM symbol) in the configured resource block, in which a control channel is located in the data region.

Next, the transmission unit 2720 of the base station 2700 transmits resource configuration information for the control channel to the UE 2800 (S2920). Information can be transmitted to the UE 2800 through RRC signaling, a broadcast channel, etc. Resource configuration information, which is configuration information for a resource block and which the base station 2700 transmits to the UE 2800, may be the size of each group, an interval between groups, or an interval between resource blocks. Resource configuration information, which is configuration information for a time resource and which the base station transmits to the UE 2800, may be the relative size of a control region, the size of an OFDM symbol unit, or the size of a slot unit.

Next, the transmission unit 2730 of the base station 2700 maps a CCE to a resource for the configured control channel so as to transmit control information (S2930).

Further, the control information extraction unit 2820 of the UE 2800 extracts control information thereof from downlink data received from the reception unit 2810 through a control channel located in the data region on the basis of a resource for the control channel located in the data region (S2940).

For example, in step S2910, the base station can sequentially map an index of an EREG to resource elements except for resource elements for a DM-RS in a time order on the basis of a frequency priority in each physical resource block pair for each sub-frame, can form one ECCE using 4 or 8 EREGs from one physical resource block pair or two or more physical resource block pairs, and can allocate a downlink control channel located in a data region, which is configured by at least one ECCE.

Next, in step S2930, the base station can transmit a downlink control channel located in the data region to the UE. In step S2930, the UE can sequentially map an index of an EREG to resource elements except for resource elements for a DM-RS in a time order on the basis of a frequency priority in each physical resource block pair for each sub-frame, can form one ECCE using 4 or 8 EREGs from one physical resource block pair or two or more physical resource block pairs, and can receive a downlink control channel located in a data region, which is configured by at least one ECCE.

In step S2940, the UE can acquire the control information from the downlink control channel located in the data region.

Although a preferred embodiment of the present invention has been described for illustrative purposes, those skilled in the art will appreciate that various modifications, additions, and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

CROSS-REFERENCE TO RELATED APPLICATION

This application claims priority from and the benefit under 35 U.S.C. §119(a) of Korean Patent Application Nos. 10-2012-0109710, filed on Oct. 2, 2012, 10-2012-0113306, filed on Oct. 12, 2012, and 10-2012-0143438, filed on Dec. 11, 2012 which are hereby incorporated by reference for all purposes as if fully set forth herein. Also, when this application claims the priority benefit of the same Korean Patent Applications from countries in addition to the U.S., the disclosure will be incorporated herein by reference.

The invention claimed is:

1. A method of transmitting an aperiodic sounding reference signal by a user equipment (UE), the method comprising:
   receiving, through higher layer signaling, two or more parameters for determining a time-frequency resource with which an aperiodic sounding signal is transmitted, the two or more parameters including a virtual cell identifier parameter;
   receiving, through at least one of a Physical Downlink Control Channel (PDCCH) and an Enhanced Physical Downlink Control Channel (EPDCCH), an index designating a parameter set including a part of the parameters;
   receiving, through at least one of the PDCCH and the EPDCCH, a signal triggering the aperiodic sounding reference signal; and
   transmitting the aperiodic sounding reference signal by frequency-hopping to a part of a frequency region within an entire frequency bandwidth of interest, by the time-frequency resource according to the two or more parameters received through the higher layer signaling and the parameter included in the parameter set received through at least one of the PDCCH and the EPDCCH.

2. The method of claim 1, wherein in the transmitting of the aperiodic sounding reference signal by frequency-hopping to the part of the frequency region within the entire frequency bandwidth, the aperiodic sounding reference signal is transmitted to the part of the frequency region one time.

3. The method of claim 1, wherein in the transmitting of the aperiodic sounding reference signal by frequency-hopping to the part of the frequency region within the entire frequency bandwidth, the aperiodic sounding reference signal is independently transmitted, through a Physical Uplink Shared Channel (PUSCH) and a Physical Uplink Control Channel (PUCCH), to a base station, which is different from a base station having received the parameter.

4. A method of receiving an aperiodic sounding reference signal by a base station, the method comprising:
    transmitting, through higher layer signaling, two or more parameters including a virtual cell identifier parameter for determining a time-frequency resource with which an aperiodic sounding reference signal is transmitted;
    transmitting, through at least one of a PDCCH and an EPDCCH, an index which designates a parameter set including a part of the parameters;
    transmitting, through at least one of the PDCCH and the EPDCCH, a signal which triggers the aperiodic sounding reference signal; and
    receiving the aperiodic sounding reference signal by frequency-hopping to a part of a frequency region within an entire frequency bandwidth of interest, by the time-frequency resource according to the parameter received through the higher layer signaling and the parameter included in the parameter set received through at least one of the PDCCH and the EPDCCH.

5. A method of transmitting a control channel located in a data region by a base station, the method comprising:
    sequentially mapping an index of an Enhanced Resource Element Group (EREG) to resource elements except for resource elements for a DeModulation Reference Signal (DM-RS) in a time order on the basis of a frequency priority in each physical resource block pair for each sub-frame, forming one Enhanced Control Channel Element (ECCE) using 4 or 8 EREGs from one physical resource block pair or two or more physical resource block pairs, and allocating a downlink control channel located in the data region, which is configured by 1, 2, 4, 8 or 16 ECCEs; and
    transmitting the downlink control channel located in the data region, to a base station.

6. The method of claim 5, wherein the index of the EREG corresponds to EREG#0 to 15, when the ECCE is configured by 4 EREGs, the EREGs are grouped into an EREG group #0 {EREG#0, 4, 8, 12}, an EREG group #1 {EREG#1, 5, 9, 13}, an EREG group #2 {EREG#2, 6, 10, 14}, and an EREG group #3 {EREG#3, 7, 11, 15}, and one ECCE is configured by one of the EREG groups #0 to #3, and when the ECCE is configured by 8 EREGs, the EREGs are grouped into an EREG group #0 {EREG#0, 2, 4, 6, 8, 10, 12, 14} and an EREG group #1 {EREG#1, 3, 5, 7, 9, 11, 13, 15}, and one ECCE is configured by one of the EREG groups #0 to #1.

7. A method of receiving a control channel located in a data region by a User Equipment (UE), the method comprising:
    sequentially mapping an index of an EREG to resource elements except for resource elements for a DeModulation Reference Signal (DM-RS) in a time order on the basis of a frequency priority in each physical resource block pair for each sub-frame, forming one Enhanced Control Channel Element (ECCE) using 4 or 8 Enhanced Resource Element Groups (EREGs) from one physical resource block pair or two or more physical resource block pairs, and receiving a downlink control channel located in the data region, which is configured by 1, 2, 4, 8 or 16 ECCEs; and
    acquiring control information from the downlink control channel located in the data region.

8. The method of claim 7, wherein the index of the EREG corresponds to EREG#0 to 15, when the ECCE is configured by 4 EREGs, the EREGs are grouped into an EREG group #0 {EREG#0, 4, 8, 12}, an EREG group #1 {EREG#1, 5, 9, 13}, an EREG group #2 {EREG#2, 6, 10, 14}, and an EREG group #3 {EREG#3, 7, 11, 15}, and one ECCE is configured by one of the EREG groups #0 to #3, and when the ECCE is configured by 8 EREGs, the EREGs are grouped into an EREG group #0 {EREG#0, 2, 4, 6, 8, 10, 12, 14} and an EREG group #1 {EREG#1, 3, 5, 7, 9, 11, 13, 15}, and one ECCE is configured by one of the EREG groups #0 to #1.

9. A method of indicating a resource configuration of an Enhanced Physical Downlink Control Channel (EPDCCH) set of control information allocated to a data region in a cellular telecommunications network, the method comprising:
    transmitting, from a cellular base station, an RF signal indicating a value of N in N Physical Resource Block (PRB) pairs constituting the EPDCCH set, to a specific User Equipment (UE); and
    transmitting, from the cellular base station to the specific UE, an RF signal indicating a combination index r in an equation $$"r = \sum_{i=0}^{N-1} \left( \begin{array}{c} N_{RB}^{DL} - k_i \\ N - i \end{array} \right)",$$

which corresponds to PRB indexes $(\{k_i\}_{i=0}^{N-1} 1 \leq k_i \leq N_{RB}^{DL}, k_i < k_{i+1})$ of the N PRB pairs constituting the EPDCCH set,
    wherein in the above equation, $N_{RB}^{DL}$ is the number of PRB pairs relating to a downlink bandwidth, and $$"\left( \begin{array}{c} x \\ y \end{array} \right) = \begin{cases} \left( \begin{array}{c} x \\ y \end{array} \right) & x \geq y \\ 0 & x < y \end{cases}",$$

is an extended binomial coefficient and causes a unique level $$"r \in \left\{ 0, \ldots , \left( \begin{array}{c} N_{RB}^{DL} \\ N \end{array} \right) - 1 \right\}".$$

10. The method of claim 9, wherein the EPDCCH set forms one enhanced control channel element (ECCE) by 4 or 8 Enhanced Resource Element Groups (EREGs) from one physical resource block pair or two or more physical resource block pairs.

* * * * *